United States Patent
Kondo et al.

(10) Patent No.: US 6,748,113 B1
(45) Date of Patent: Jun. 8, 2004

(54) NOISE DETECTING METHOD, NOISE DETECTOR AND IMAGE DECODING APPARATUS

(75) Inventors: Satoshi Kondo, Kyoto (JP); Eiji Iwasaki, Osaka (JP); Hiroshi Taniuchi, Hyogo (JP); Hideya Takahashi, Osaka (JP)

(73) Assignee: Matsushita Electric Insdustrial Co., Ltd., Osaka (JP)

( * ) Notice: Subject to any disclaimer, the term of this patent is extended or adjusted under 35 U.S.C. 154(b) by 614 days.

(21) Appl. No.: 09/645,579

(22) Filed: Aug. 25, 2000

(30) Foreign Application Priority Data

| Aug. 25, 1999 | (JP) | 11-238884 |
| Aug. 26, 1999 | (JP) | 11-239606 |
| Sep. 1, 1999 | (JP) | 11-247536 |
| Nov. 12, 1999 | (JP) | 11-322569 |

(51) Int. Cl.$^7$ .................................................. G06K 9/36
(52) U.S. Cl. ............................... 382/232; 375/240.23
(58) Field of Search ........................... 382/232–253, 382/275; 375/240–242; 348/409–416

(56) References Cited

U.S. PATENT DOCUMENTS

| 5,850,294 A | * | 12/1998 | Apostolopoulos et al. ..... 382/250 |
| 5,969,777 A | * | 10/1999 | Mawatari ..................... 348/409 |
| 6,343,097 B2 | * | 1/2002 | Kobayashi et al. ............ 375/240 |
| 6,539,060 B1 | * | 3/2003 | Lee et al. |

FOREIGN PATENT DOCUMENTS

| JP | 05-308623 | 11/1993 |
| JP | 05-316361 | 11/1993 |
| JP | 06-311499 | 11/1994 |
| JP | 07-177521 | 7/1995 |
| JP | 08-172628 | 7/1996 |
| JP | 11-98505 | 4/1999 |
| JP | 11-98510 | 4/1999 |

OTHER PUBLICATIONS

Choy et al. "Reduction of Block–Transform Image Coding Artifacts by Using Local statistics of Transform Coefficients" IEEE Signal Processing Letters, vol. 4 No. 1, pp 5–7, Jan. 1997.*

* cited by examiner

*Primary Examiner*—Jingge Wu
(74) *Attorney, Agent, or Firm*—Nixon Peabody, LLP

(57) ABSTRACT

A block boundary where blocking artifact occurs or a lock where ringing artifact occurs is definitely detected. The noise detecting method includes the steps of: extracting coding information, including orthogonal transformation coefficients and a motion vector of each of multiple blocks of an image, from a bitstream that has been encoded through motion compensation of the image, orthogonal transformation and quantization, where the orthogonal transformation is performed on each said block; obtaining a reference area of each said block from a reference frame using the motion vector of the block; and detecting coding noise to be eliminated according to frequency component distributions of the orthogonal transformation coefficients of each said block and another one of the blocks within the reference frame overlapping the reference area of the block.

9 Claims, 42 Drawing Sheets

PTN1

PTN2

PTN3

PTN4

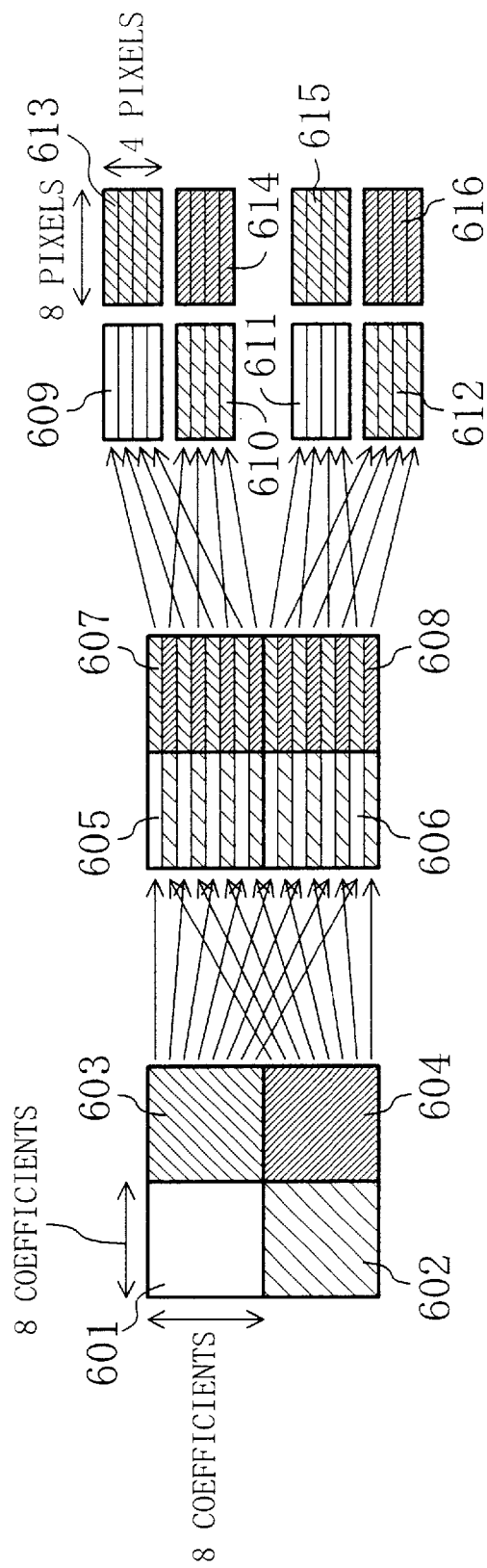

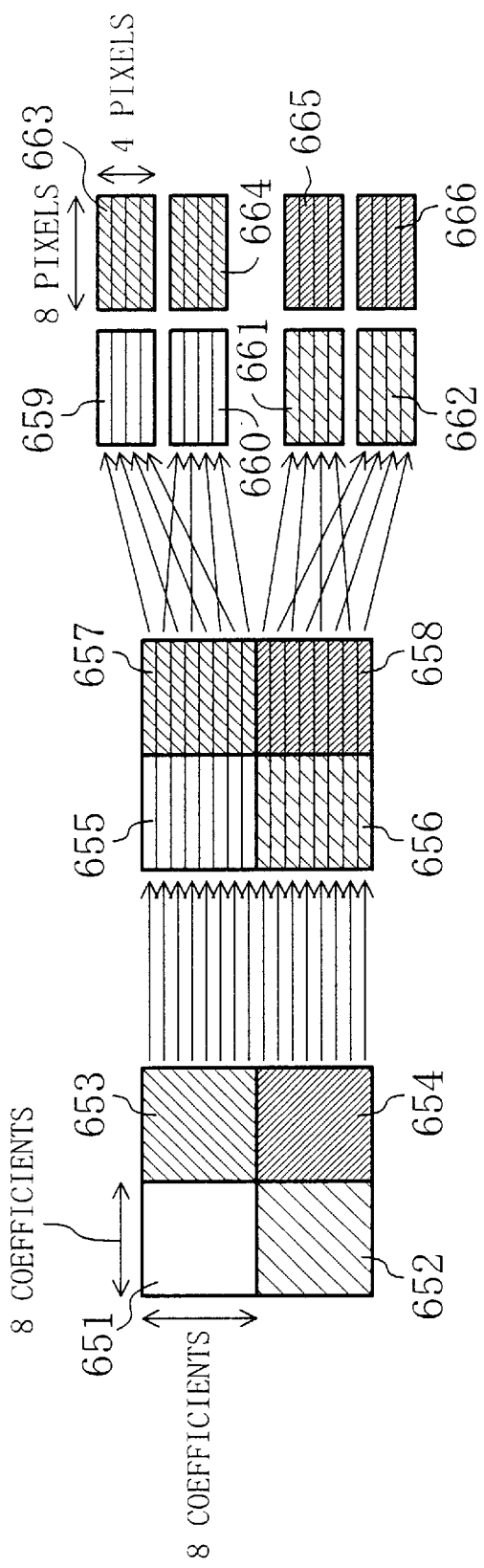

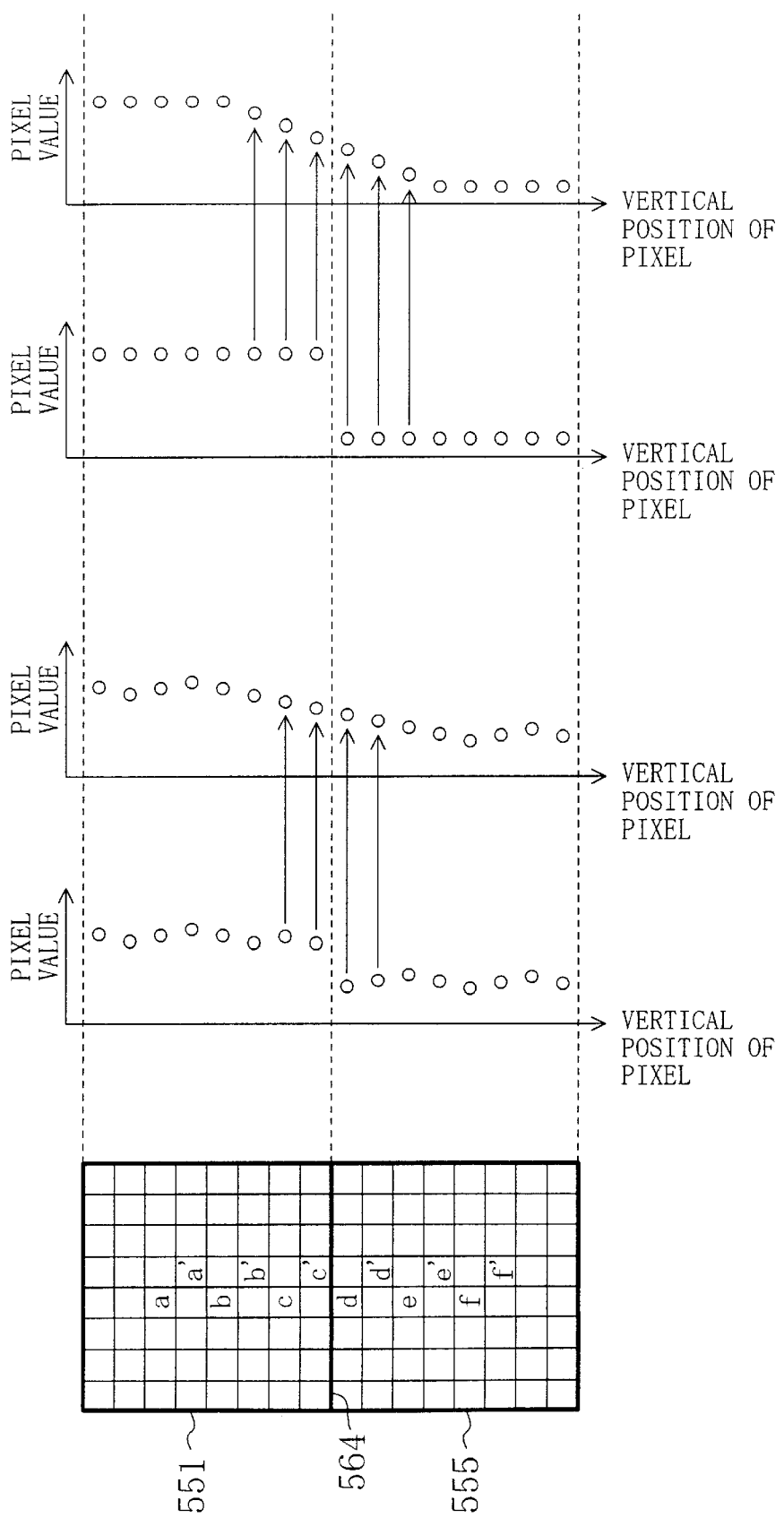

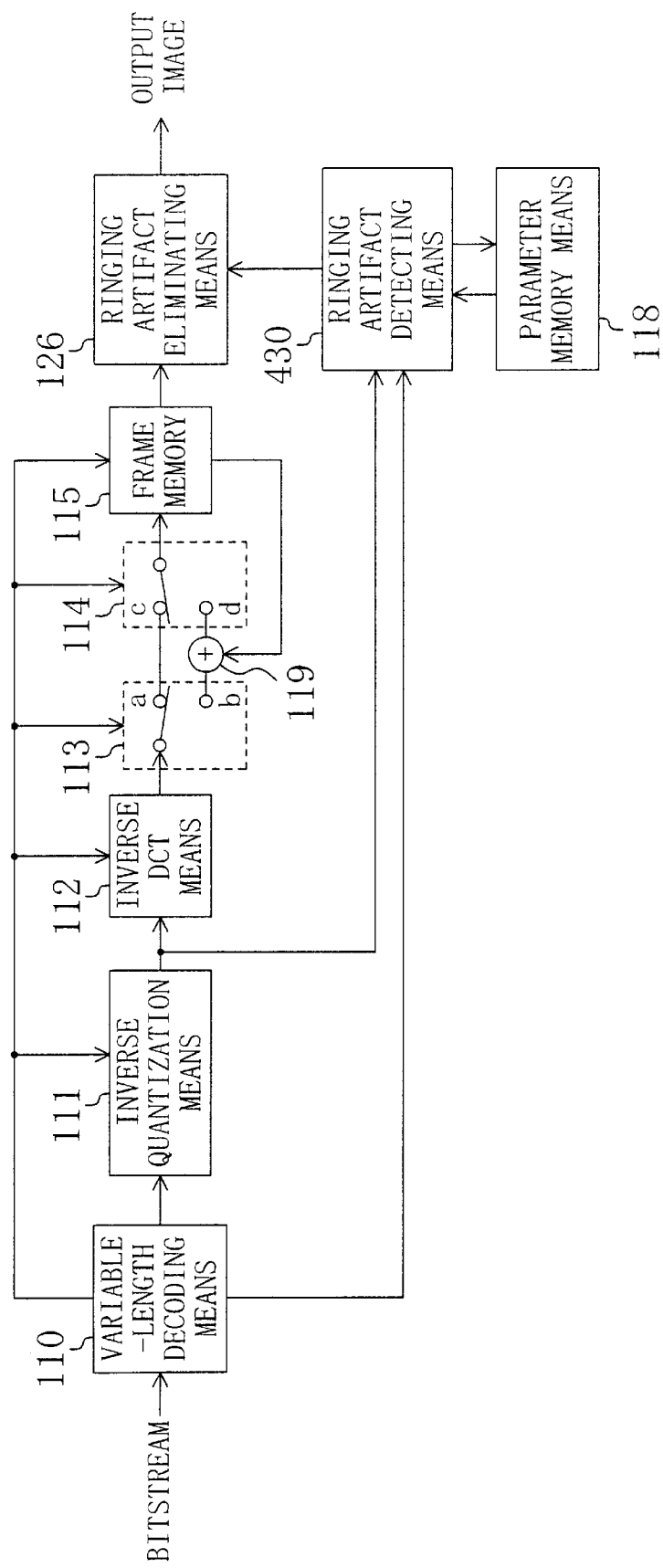

PTN11

PTN12

PTN13

PTN14

543   544

NOISE DETECTING METHOD, NOISE DETECTOR AND IMAGE DECODING APPARATUS

BACKGROUND OF THE INVENTION

The present invention relates to technique of decoding a coded image, and more particularly relates to technique of detecting and eliminating coding noise derived from encoding.

Recently, the MPEG (Moving Picture Experts Group) standards are widely used to code a picture with high compression efficiency in the fields of broadcasting, communications and storage. According to the MPEG, an image is encoded by removing spatial and temporal redundancy.

In order to remove spatial redundancy, discrete cosine transform (hereinafter referred to as DCT) and quantization are employed. First, an image is divided into units each designated as a block including 8×8 pixels, each block is converted through the DCT into coefficients of a frequency domain (hereinafter referred to as DCT coefficients), and the DCT coefficients are subjected to the quantization.

The quantization is an operation for dividing a DCT coefficient by both a quantizer matrix having a value corresponding to each frequency of a DCT region and a quantizer scale. Through the quantization, a value of a frequency component with a small DCT coefficient becomes zero. In general, energy is collected in a low frequency region in an image signal, and hence, a high frequency component is eliminated through this operation. However, the visual characteristic of a human being is poorer in a higher frequency region, and therefore, degradation in picture quality is less conspicuous as the quantizer scale used in the quantization is smaller (i.e., a step in the quantization is smaller).

In order to remove temporal redundancy, motion compensation is employed. In the motion compensation, an area closest to a macroblock in coding within a reference frame is selected with a macroblock of 16×16 pixels used as a unit, so as to encode difference values from the reference frame. When motion is not very fast, the difference values are substantially zero, and thus, temporal redundancy can be removed.

In general, when the bit rate of a code is high (i.e., the compression rate is low), the degradation in picture quality is very inconspicuous in the MPEG. When the bit rate is lower (i.e., the compression rate is higher), however, coding noise becomes more conspicuous and the picture quality is degraded. Typical coding noise occurring in the MPEG are blocking artifact (sometimes designated as block distortion or block noise) and ringing artifact (sometimes designated as ringing noise, corona noise or mosquito noise).

Blocking artifact is a phenomenon where a block boundary can be obviously seen in a tile-like shape. This noise is caused when an image signal within a block has merely low frequency components and the frequency component values are different from those of an adjacent block.

Ringing artifact is noise occurring in the vicinity of the edge of an image like a flying mosquito. This noise is caused because a high frequency component inherent to an image signal has been eliminated through the quantization.

Blocking artifact and ringing artifact are greatly remarkable types of degradation in picture quality unlike analog noises, and hence, several methods have been proposed for eliminating these coding noises.

An example of the method of eliminating blocking artifact is disclosed in Japanese Laid-Open Patent Publication No. 5-308623 (first conventional method). In this conventional method, a filter whose frequency characteristic is determined depending upon the maximum frequency of DCT coefficients and motion activity obtained based on a motion vector is applied.

Also, Japanese Laid-Open Patent Publication No. 7-177521 discloses a method in which a filter characteristic is determined by a quantizer scale and the size of a motion vector so that blocking artifact can be eliminated by applying a filter with the determined characteristic to a block boundary of a decoded image (second conventional method). In this conventional method, in the case where the quantizer scale is large and the motion vector is small, the filter characteristic is determined based on the quantizer scale alone. Alternatively, in the case where the quantizer scale is small and the motion vector is large, the filter characteristic is determined based on the size of the motion vector alone. Furthermore, in the case where both the quantizer scale and the size of the motion vector are medium, the filter characteristic is determined based on both of them.

On the other hand, an example of the method of eliminating ringing artifact is disclosed in Japanese Laid-Open Patent Publication No. 6-311499 (third conventional method). In this conventional method, an absolute sum of specific DCT coefficients of each block is obtained, so as to change the threshold value of a filter in accordance with the obtained absolute sum. Furthermore, in a frame that has been inter-frame coded, elimination of ringing artifact is carried out on a difference image, and then, reference frames where ringing artifact has been eliminated are added to the difference image so as to obtain a decoded image.

In general, occurrence of blocking artifact depends not on the maximum frequency of DCT coefficients but on the frequency component distribution of DCT coefficients and a difference in the frequency component distribution of DCT coefficients between adjacent blocks. When the filter characteristic is determined as in the first conventional method by using the high frequency component alone of the DCT coefficients, capability of eliminating blocking artifact is lowered.

The first conventional method further has the following problems: Since the filter characteristic is determined individually in the horizontal direction and the vertical direction, the operation required for the filter determination becomes numerous in volume. Furthermore, when the filter characteristic is determined based on DCT coefficients, capability of detecting blocking artifact is lowered in employing inter-frame coding (non-intra coding). In addition, in the case where the operation is controlled so that a strong filter is applied when the motion activity is large, no consideration is paid to the property of the reference frame. For example, in the case where motion compensation is accurately carried out even though the motion activity is large, a filter is still applied even if the pixel values in the difference image are all zero. As a result, the image can be degraded in the quality, for example, blurred. Accordingly, this method degrades the picture quality when applied to a non-intra coded image.

Moreover, even when the motion vector is large, a decoded image may include a high frequency component. Furthermore, with respect to a frame that has been inter-frame coded, even when the quantizer scale is large, a reference frame may include a high frequency component. In such a case, a decoded image may include a high frequency component. In this case, when a filter is applied to the decoded image as in the second conventional method, the picture quality is degraded.

Furthermore, the third conventional method has the following problems: Since the absolute sum of specific DCT coefficients of each block is obtained, calculation of the absolute sums of the DCT coefficients requires numerous processing. Moreover, since a decoded image is obtained by adding reference frames where ringing artifact has been eliminated, reference frames used in decoding are different from those used in coding. Accordingly, errors are accumulated on the decoded image, which makes the degradation in the picture quality conspicuous.

SUMMARY OF THE INVENTION

The present invention was devised to overcome the aforementioned conventional problems. An object of the present invention is providing a noise detecting method and a noise detector capable of definitely detecting a block boundary where blocking artifact occurs or a block where ringing artifact occurs so as to accurately detect such coding noise even in a non-intra coded block, and providing an image decoding apparatus capable of definitely eliminating coding noise with degradation in picture quality minimized.

Specifically, the noise detecting method of this invention includes the steps of: extracting coding information, including orthogonal transformation coefficients and a motion vector of each of multiple blocks of an image, from a bitstream that has been encoded through motion compensation of the image, orthogonal transformation and quantization, where the orthogonal transformation is performed on each said block; obtaining a reference area of each said block from a reference frame using the motion vector of the block; and detecting coding noise to be eliminated according to frequency component distributions of the orthogonal transformation coefficients of each said block and another one of the blocks within the reference frame overlapping the reference area of the block.

According to the noise detecting method of this invention, coding noise is detected according to not only the frequency component distribution of the orthogonal transformation coefficients obtained from a bitstream but also the frequency component distributions of the orthogonal transformation coefficients of blocks overlapping a reference area within a reference frame obtained by using the motion vector. Accordingly, coding noise can be definitely detected in a non-intra coded block and erroneous detection can be minimized.

In one embodiment the noise detecting method, blocking artifact is detected as the coding noise, and the coding noise detecting step includes the sub-steps of: classifying each said block into any of a plurality of classes according to the frequency component distribution of the orthogonal transformation coefficients of the block; obtaining new classes of a target one of the blocks and another one of the blocks, which is adjacent to the target block, according to classes of the target and adjacent blocks and classes of other ones of the blocks that overlap reference areas of the target and adjacent blocks within the reference frame; and detecting magnitude of blocking artifact occurring between the target and adjacent blocks according to the new classes.

In this embodiment, noise is detected according to not only the class of a target block for noise elimination but also the classes of the blocks overlapping the reference region within the reference frame obtained by using the motion vector. Accordingly, a block boundary where blocking artifact occurs can be definitely detected in a non-intra coded block. Furthermore, since the classification of the block is carried out not separately in the horizontal and vertical directions, blocking artifact can be detected with the processing operation reduced.

In another embodiment of the noise detecting method, ringing artifact is detected as the coding noise, and the coding noise detecting step includes the sub-steps of: classifying each said block into any of a plurality of classes according to the frequency component distribution of the orthogonal transformation coefficients of the block; obtaining a new class of a target one of the blocks according to a class of the target block and a class of another one of the blocks within the reference frame overlapping a reference area of the target block; and detecting magnitude of ringing artifact occurring in the target block according to the new class.

In this embodiment, noise is detected according to not only the class of the target block for noise elimination but also the classes of the blocks overlapping the reference area within the reference frame obtained by using the motion vector. Accordingly, a block where ringing artifact occurs can be definitely detected in a non-intra coded block. Furthermore, since the classification of a block is carried out not separately in the horizontal and vertical directions, ringing artifact can be detected with the processing operation reduced.

In still another embodiment of the noise detecting method, blocking artifact is detected as the coding noise, and the coding noise detecting step includes the sub-steps of: extracting DC components of the orthogonal transformation coefficients of a target one of the blocks and another one of the blocks, which is adjacent to the target block, from the coding information; and detecting magnitude of blocking artifact occurring between the target and adjacent blocks according to not only the frequency component distribution of the orthogonal transformation coefficients but also an absolute value of a difference in the DC component between the target and adjacent blocks.

In this embodiment, the absolute value of a difference in the DC component between the target and adjacent blocks is checked, so the blocking artifact can be detected very accurately.

In still another embodiment of the noise detecting method, the coding noise detecting step includes the sub-steps of: extracting a quantizer scale of the target block from the coding information; and detecting magnitude of blocking artifact occurring between the target and adjacent blocks according to not only the frequency component distribution of the orthogonal transformation coefficients but also the absolute value of the difference in the DC component and the quantizer scale.

In this embodiment, the absolute value of a difference in the DC component between the target and adjacent blocks is checked in accordance with the quantizer scale of the target block. Accordingly, blocking artifact can be detected very accurately.

In still another embodiment of the noise detecting method, the coding noise to be eliminated is detected according to not only the frequency component distribution of the orthogonal transformation coefficients but also a size of the motion vector of a target one of the blocks or another one of the blocks that is adjacent to the target block.

Since this embodiment uses the size of the motion vector, noise can be appropriately detected. Because, in general, the larger the size of a motion vector is, the greater the magnitude of coding noise is.

In still another embodiment of the noise detecting method, blocking artifact is detected as the coding noise, and the coding noise detecting step includes the sub-steps of: extracting DC components of the orthogonal transformation coefficients of the target and adjacent blocks from the coding information; and detecting magnitude of blocking artifact occurring between the target and adjacent blocks according to not only the frequency component distribution of the orthogonal transformation coefficients and the size of the motion vector but also an absolute value of a difference in the DC component between the target and adjacent blocks.

In this embodiment, the absolute value of a difference in the DC component between the target and adjacent blocks is checked, so the blocking artifact can be detected very accurately.

In still another embodiment of the noise detecting method, the coding noise detecting step includes the sub-steps of: extracting a quantizer scale of the target block from the coding information; and detecting magnitude of blocking artifact occurring between the target and adjacent blocks according to not only the frequency component distribution of the orthogonal transformation coefficients and the size of the motion vector but also the absolute value of the difference in the DC component and the quantizer scale.

In this embodiment, the absolute value of a difference in the DC component between the target and adjacent blocks is checked in accordance with the quantizer scale of the target block. Accordingly, blocking artifact can be detected very accurately.

In still another embodiment of the noise detecting method, blocking artifact and ringing artifact are detected as the coding noise, and one of blocking artifact and ringing artifact is chosen for each said block as the coding noise to be eliminated according to magnitude of the blocking artifact and the ringing artifact.

In this embodiment, one of blocking artifact and ringing artifact is chosen for each said block. Accordingly, the processing operation and a memory capacity required for the noise elimination can be reduced. As a result, blocking artifact and ringing artifact can be both eliminated appropriately.

In still another embodiment of the noise detecting method, the coding noise detecting step is carried out on each of multiple fields in an interlaced image.

In this embodiment, coding noise can also be detected very accurately from an interlaced image.

The noise detector of this invention includes means for receiving coding information as an input, detecting coding noise to be eliminated and outputting a result of the detection. The coding information includes orthogonal transformation coefficients and a motion vector of each of the multiple blocks of an image. The coefficients and vector are obtained from a bitstream that has been encoded through motion compensation of the image, orthogonal transformation and quantization. The orthogonal transformation is performed on each said block. The coding noise is detected according to frequency component distributions of the orthogonal transformation coefficients of each said block and another one of the blocks within a reference frame overlapping a reference area of the block. And the reference area is obtained from the reference frame using the motion vector of each said block.

The noise detector of the invention detects coding noise according to not only the frequency component distribution of the orthogonal transformation coefficients obtained from a bitstream but also the frequency component distributions of the orthogonal transformation coefficients of blocks overlapping a reference area within a reference frame obtained by using a motion vector. Accordingly, coding noise can be definitely detected in a non-intra coded block and erroneous detection can be minimized.

The image decoding apparatus of this invention includes: the aforementioned noise detector; a decoding unit for decoding the bitstream and outputting the coding information including the orthogonal transformation coefficients of each said block and a motion vector of a target one of the blocks; and a coding noise eliminating unit for eliminating the coding noise based on the detection result output by the noise detector.

In the image decoding apparatus of this invention, coding noise can be definitely detected in a non-intra coded block, and degradation in picture quality derived from elimination of coding error detected erroneously can be minimized.

In an embodiment of the image decoding apparatus, the noise detector detects ringing artifact as the coding noise and extracts a quantizer scale of the target block from the coding information, and the coding noise eliminating unit uses a value in accordance with the quantizer scale as a threshold value for detecting an edge pixel not used in eliminating the ringing artifact.

In this embodiment, pixels used in eliminating ringing artifact can be selected in accordance with the quantizer scale. Accordingly, ringing artifact can be definitely eliminated with the degradation in picture quality at the edges minimized.

BRIEF DESCRIPTION OF THE DRAWINGS

FIGS. 24(a), 24(b) and 24(c) are diagrams for illustrating the relationship between a DCT coefficient macroblock and respective fields of a pixel block in the case where a DCT mode is a field mode;

FIGS. 25(a), 25(b) and 25(c) are diagrams for illustrating the relationship between a DCT coefficient macroblock and respective fields of a pixel block in the case where the DCT mode is a frame mode;

FIGS. 27(a), 27(b), 27(c), 27(d) and 27(e) are diagrams for illustrating a vertical filtering process carried out on a block boundary;

FIG. 30 is a block diagram of an image decoding apparatus according to Embodiment 7 of the invention;

DETAILED DESCRIPTION OF THE INVENTION

Preferred embodiments of the invention will now be described with reference to the accompanying drawings. It is assumed, in each of the embodiments described below, that a bitstream of an image is generated, for example, in accordance with the MPEG-2. In the following description, in order to distinguish a set of DCT coefficient values from a set of pixel values, a block consisting of DCT coefficients is designated as a DCT coefficient block and a block consisting of pixels is designated as a pixel block.

EMBODIMENT 1

In an image decoding apparatus of Embodiment 1 of the invention, blocking artifact as coding noise is detected and eliminated in decoding an intra coded frame.

Figure 1:
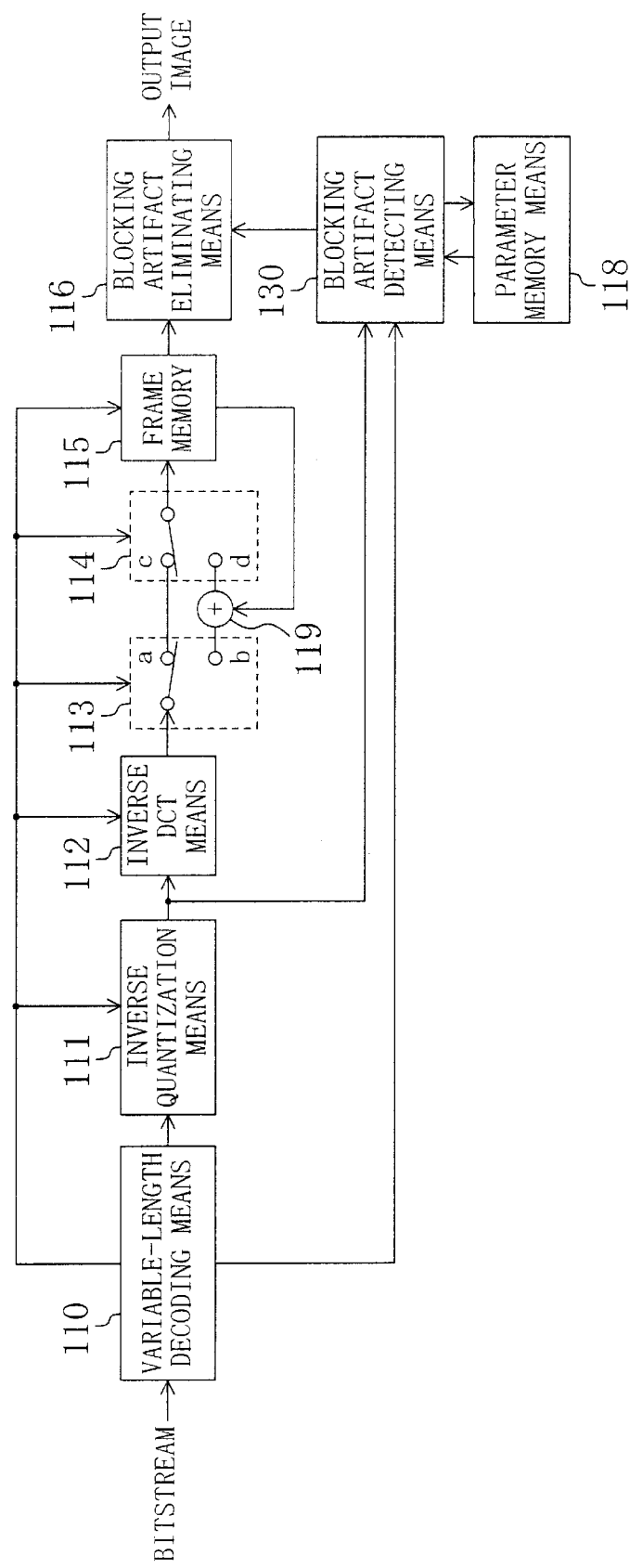
FIG. 1 is a block diagram of an image decoding apparatus according to Embodiment 1 of the invention.

FIG. 1 is a block diagram of the image decoding apparatus of Embodiment 1. The image decoding apparatus of FIG. 1 includes variable-length decoding means 110, inverse quantization means 111, inverse DCT means 112, switches 113 and 114, a frame memory 115, blocking artifact eliminating means 116, blocking artifact detecting means 130, parameter memory means 118 and an adder 119. In this case, the blocking artifact detecting means 130 works as a noise detector.

A bitstream is first input to the variable-length decoding means 110. The bitstream is encoded through motion compensation of an image, DCT performed on every block that includes 8×8 pixels, quantization, and variable-length encoding. The variable-length decoding means 110 decodes a variable-length code of the input bitstream, extracts quantized DCT coefficients and parameters (such as a motion vector and a quantizer scale) used as coding information in coding, and outputs the extracted information. The quantized DCT coefficients are sixty-four coefficients, corresponding to eight horizontal frequencies by eight vertical frequencies, and together form a quantized DCT coefficient block.

Figure 2:
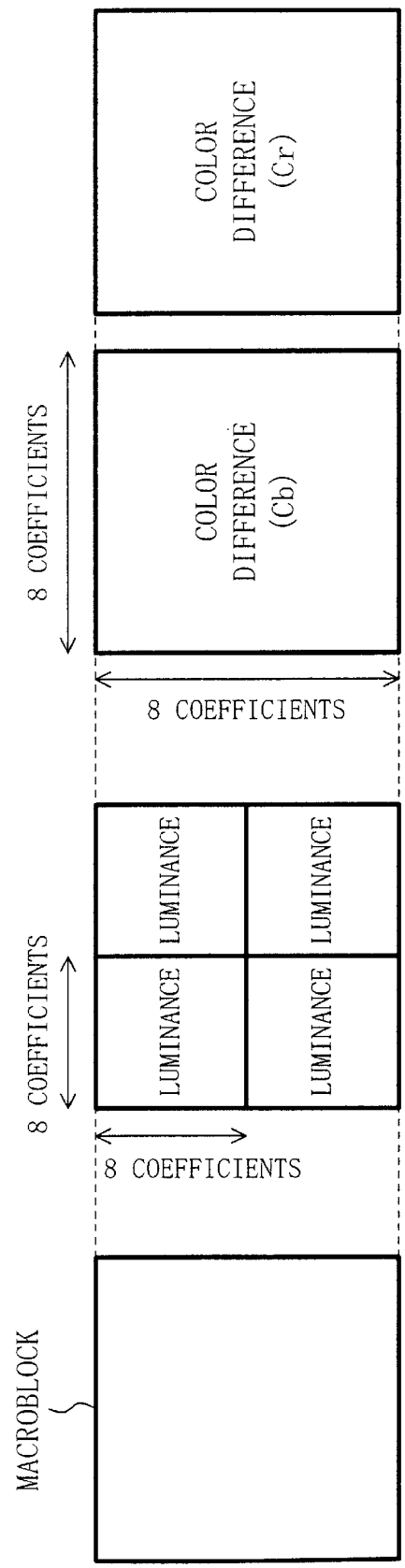
FIG. 2 is a diagram for illustrating the structure of a macroblock used in a 4:2:0 image format.

FIG. 2 is a diagram for illustrating the structure of a macroblock used in a 4:2:0 image format. As is shown in FIG. 2, the macroblock is an area of 16×16 pixels corresponding to a luminance signal, and is represented by four DCT coefficient blocks of a luminance signal and two DCT coefficient blocks of a color difference signals. With respect to the color difference signals, pixels are decimated so that the number of pixels can be halved in both the horizontal and vertical directions as compared with that of the luminance signal.

The quantized DCT coefficients obtained by the variable-length decoding means 110 are input to the inverse quantization means 111 in the order of macroblocks. The inverse quantization means 111 inversely quantizes the quantized DCT coefficients of each block included in the macroblock by using the quantizer scale and a quantizer matrix obtained by the variable-length decoding means 110, so as to obtain a DCT coefficient block. The inverse quantization means 111 outputs the thus obtained DCT coefficient block to the inverse DCT means 112 and the blocking artifact detecting means 130. The inverse DCT means 112 obtains a pixel block by subjecting the DCT coefficient block to inverse DCT. When the inverse DCT means 112 completes conducing the inverse DCT on all the blocks included in the macroblock, it converts the data of the luminance signal into a frame structure in accordance with a DCT mode obtained by the variable-length decoding means 110.

Herein, the DCT mode corresponds to a flag indicating whether the luminance signal data is subjected to the DCT as a frame structure or as a field structure. In the case where the frame is a progressive (sequentially scanned) image, however, the DCT mode is the frame structure alone, and hence, there is no need to convert the luminance signal data into the frame structure.

The pixel block obtained by the inverse DCT means 112 is input to the switch 113. The switches 113 and 114 switch connection in accordance with a macroblock coding mode output by the variable-length decoding means 110. The macroblock coding mode corresponds to information indicating whether the macroblock is intra-frame coded (intra coded) or inter-frame coded by using a reference frame (non-intra coded). When the macroblock is intra coded, the switches 113 and 114 are connected to terminals a and c, respectively. When the macroblock is non-intra coded, the switches 113 and 114 are connected to terminals b and d, respectively.

Accordingly, when the macroblock is intra coded, each pixel block included in the macroblock output by the inverse DCT means 112 is directly stored in the frame memory 115. Alternatively, when the macroblock is non-intra coded, each pixel block included in the macroblock is input to the adder 119. Since the motion compensation is carried out in each macroblock in the MPEG-2, the adder 119 is also supplied by the frame memory 115 with an image within a reference frame corresponding to the macroblock. The image is obtained by using the motion vector output by the variable-length decoding means 110. The adder 119 adds the pixel block input through the switch 113 to the reference frame supplied by the frame memory 115, and stores the result of the addition in the frame memory 115 through the switch 114.

To the blocking artifact detecting means 130, the DCT coefficients are input from the inverse quantization means 111 and the quantizer scale and the macroblock coding mode are input from the variable-length decoding means 110. The blocking artifact detecting means 130 detects coding noise to be eliminated according to the frequency component distribution of the DCT coefficients, and informs the blocking artifact eliminating means 116 of the type of filter to be applied for eliminating the noise. Also, the blocking artifact detecting means 130 extracts the parameters of each block from the input data, and inputs and outputs the parameters to and from the parameter memory means 118 if necessary.

The blocking artifact eliminating means 116 receives the type of filter to be applied to each boundary of the pixel block from the blocking artifact detecting means 130, and applies the filter accordingly to the block boundary in an image output from the frame memory 115, so as to output an image where blocking artifact has been eliminated.

Figure 3:
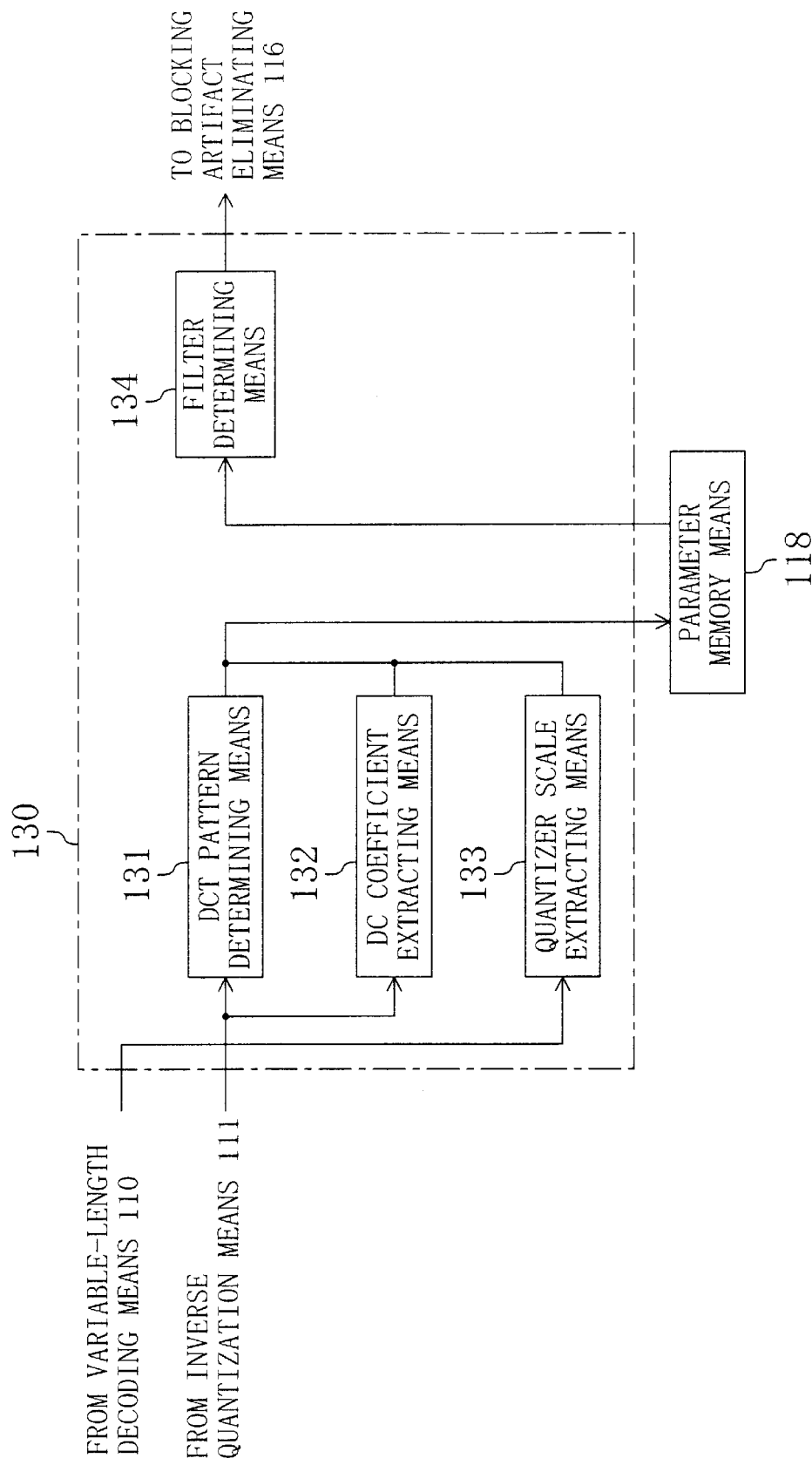
FIG. 3 is a block diagram for showing the structure of blocking artifact detecting means.

FIG. 3 is a block diagram for showing the structure of the blocking artifact detecting means 130. The blocking artifact detecting means 130 of FIG. 3 includes DCT pattern determining means 131, DC component extracting means 132, quantizer scale extracting means 133 and filter determining means 134.

The DCT pattern determining means 131 receives a DCT coefficient block from the inverse quantization means 111 and classifies the DCT coefficient block according to the frequency component distribution thereof. Now, the classification of the block will be described.

FIGS. 4(a) through 4(d) are diagrams of DCT patterns used in classifying the block. In each of these drawings, a hatched area corresponds to a pattern of 8×8 DCT coefficients (DCT pattern), and one square corresponds to one coefficient. A coefficient at upper left indicates a DC component, with a horizontal frequency increasing rightward and a vertical frequency increasing downward. Hereinafter, the DC component of the DCT coefficients is referred to as DC coefficient in each embodiment.

The DCT pattern determining means 131 determines whether or not an input DCT coefficient block satisfies a DCT pattern. Specifically, when the input DCT coefficient block includes a coefficient corresponding to a frequency component included in the DCT pattern of FIG. 4(a), for example, and having an absolute value larger than a predetermined value, it is determined that the input DCT coefficient block satisfies the DCT pattern, and when not, it is determined that the input DCT coefficient block does not satisfy the DCT pattern. For example, when the predetermined value is zero, if at least one of the coefficients associated with the hatched frequency components is not zero in the input DCT coefficient block, the DCT coefficient block is determined to satisfy the DCT pattern.

According to the result of the determination, the DCT pattern determining means 131 classifies the input DCT coefficient block into any of a plurality of DCT classes, and outputs the result of the classification to the parameter memory means 118.

Since a DCT pattern is set so as to include a high frequency component, blocking artifact is generally more difficult to occur in a DCT coefficient block satisfying a given DCT pattern than in a DCT coefficient block not satisfying the DCT pattern.

Figure 4A:
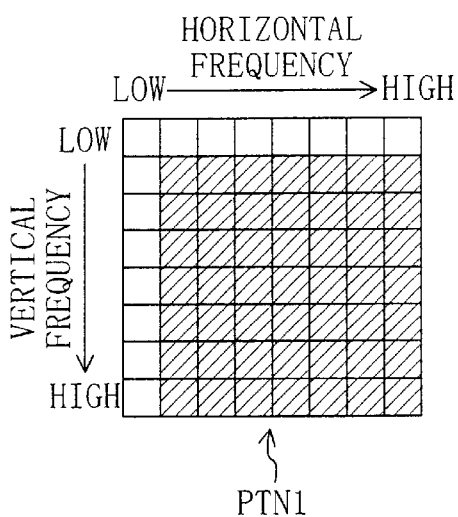
FIGS. 4(a), 4(b), 4(c) and 4(d) are diagrams of DCT patterns used in classification of blocks.
Figure 4B:
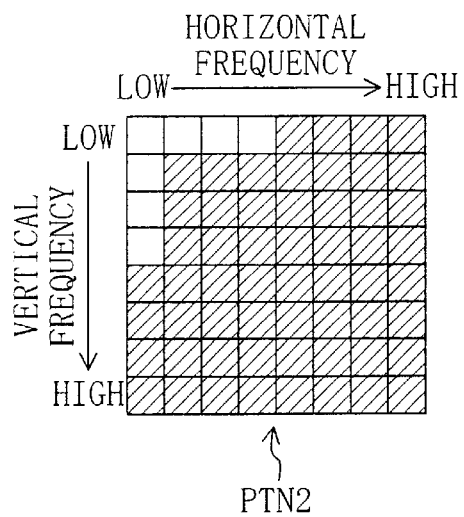

When the macroblock coding mode indicates that the input DCT coefficient block is an intra coded block, the DCT pattern determining means 131 uses the DCT pattern PTN1 of FIG. 4(a) and the DCT pattern PTN2 of FIG. 4(b). Since blocking artifact is more easily caused around a block including DCT coefficients in a low frequency region alone, it can be said that blocking artifact is more easily caused in a block satisfying the DCT pattern PTN2 alone than a block satisfying the DCT pattern PTN1.

Figure 5:
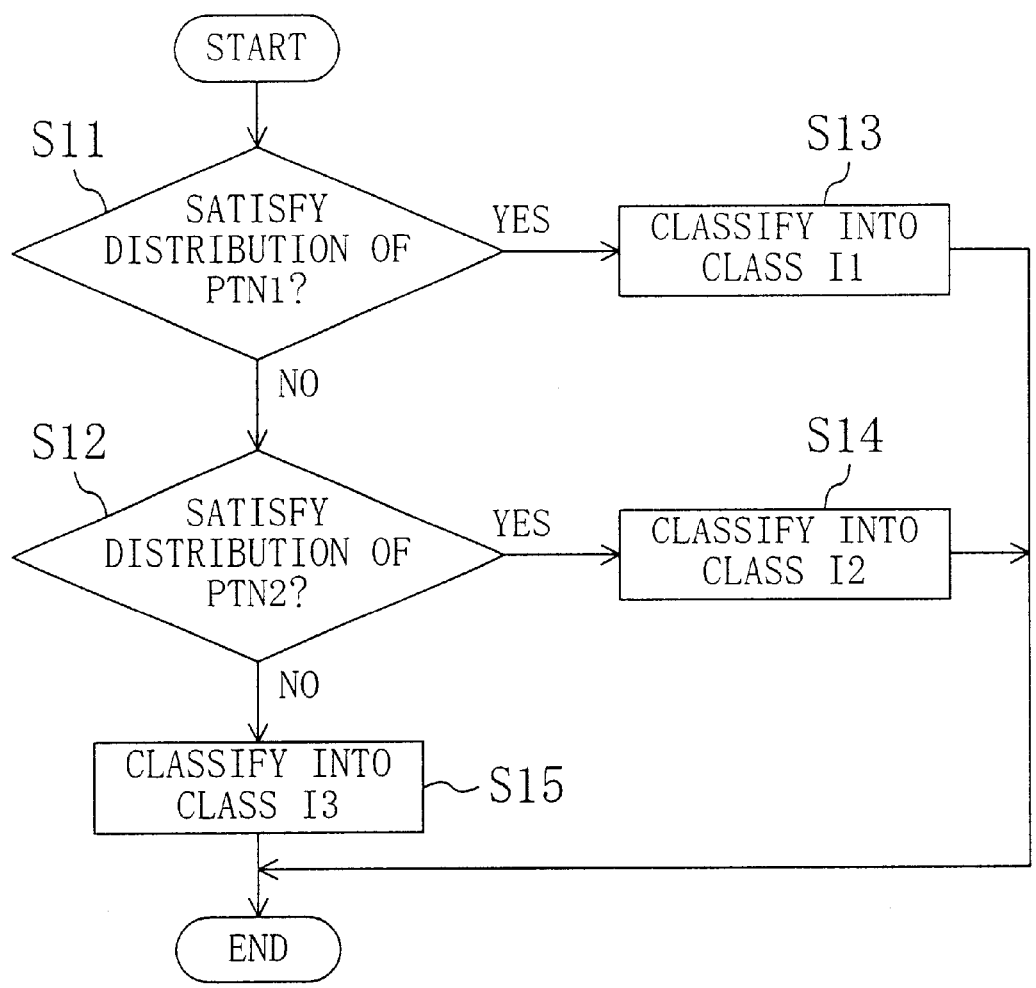
FIG. 5 is a flowchart for showing procedures in classifying an intra coded block.

FIG. 5 is a flowchart for showing procedures in classifying an intra coded block. It is herein assumed that the DCT patterns PTN1 and PTN2 are used for the classification. As is shown in FIG. 5, an input DCT coefficient block is first compared with the DCT pattern PTN1 in step S11. When the input DCT coefficient block satisfies the DCT pattern PTN1, the block is classified into a DCT class I1 (step S13). When the input DCT coefficient block does not satisfy the DCT pattern PTN1, the block is compared with the DCT pattern PTN2 in step S12. When the input DCT coefficient block satisfies the DCT pattern PTN2, the block is classified into a DCT class I2 (step S14). When the input DCT coefficient block does not satisfy the DCT pattern PTN2, the block is classified into a DCT class I3 (step S15). In this manner, the DCT pattern determining means 131 classifies each block into any of the DCT classes I1, I2 and I3, and outputs the result of the classification to the parameter memory means 118.

The DC coefficient extracting means 132 extracts a DC coefficient alone from the input DCT coefficients and outputs the extracted DC coefficient to the parameter memory means 118. The quantizer scale extracting means 133 extracts a quantizer scale from the coding information output from the variable-length decoding means 110, and outputs the extracted quantizer scale to the parameter memory means 118.

Hereinafter, the DCT class, the DC coefficient and the quantizer scale are together designated as blocking artifact parameters. The parameter memory means 118 stores the input blocking artifact parameters.

The blocking artifact parameters of each block are stored in the parameter memory means 118 by conducting the aforementioned operation on each macroblock.

When the blocking artifact parameters of blocks included in one frame are completed to be stored, the filter determining means 134 determines a filter to be applied to each block boundary with reference to the blocking artifact parameters. Now, the operation of the filter determining means 134 will be described.

Figure 6:
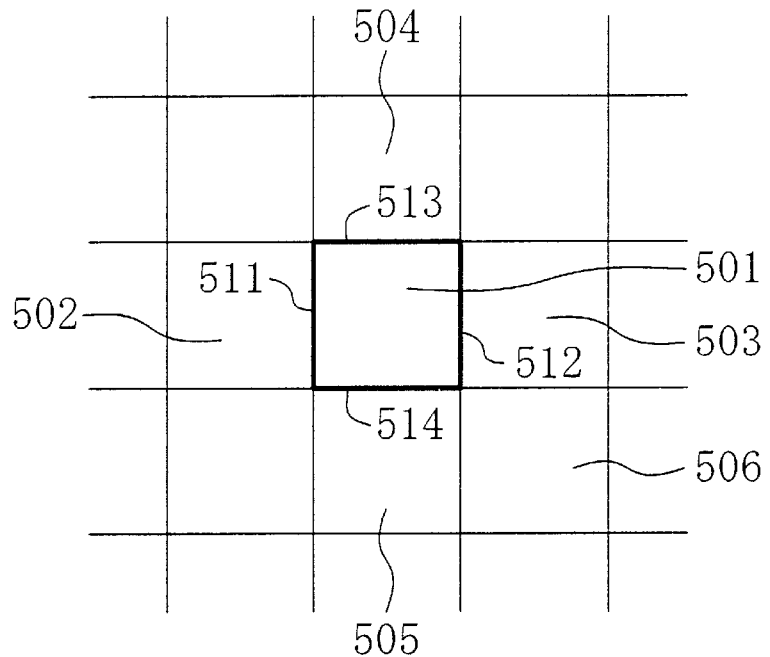
FIG. 6 is a diagram for illustrating arrangement of pixel blocks.
Figure 7:
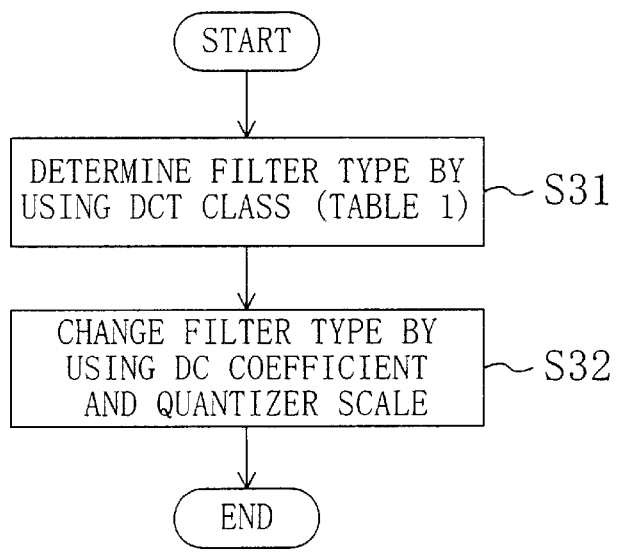
FIG. 7 is a flowchart for. showing procedures in determining the type of filter.
Figure 8A:
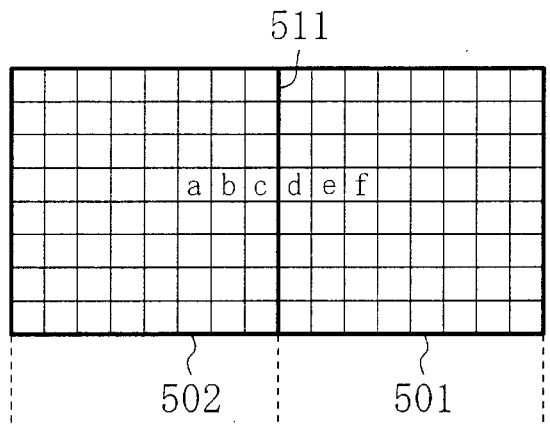
FIGS. 8(a), 8(b), 8(c), 8(d) and 8(e) are diagrams for illustrating a horizontal filtering process on a block boundary.
Figure 8B:
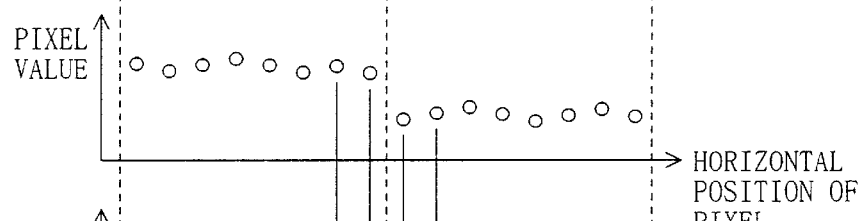
Figure 8C:
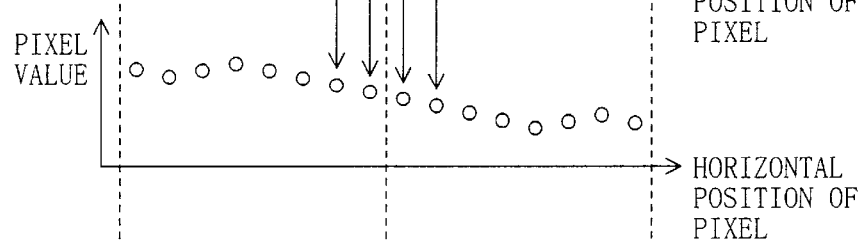
Figure 8D:
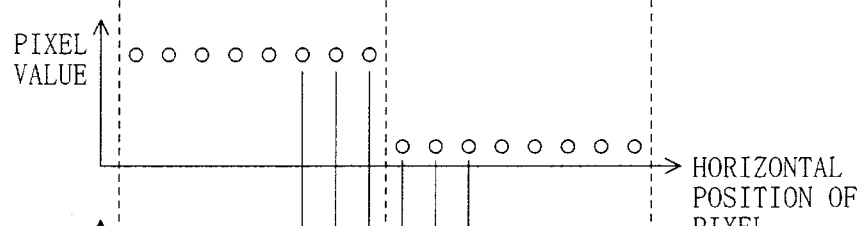
Figure 8E:
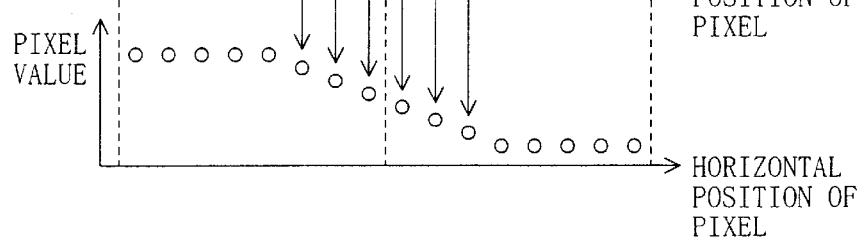

FIG. 6 is a diagram for illustrating arrangement of pixel blocks. In FIG. 6, one square corresponds to one pixel block. Assuming that the pixel blocks are arranged as is shown in FIG. 6, it is herein determined what type of filter is to be applied to a block boundary of a pixel block 501. In this case, the pixel block 501 is a target block to be subjected to noise detection. First, a filter to be applied to the block boundary between the pixel block 501 and a pixel block 502 is determined as follows:

FIG. 7 is a flowchart for showing procedures in determination on the type of filter. In step S31, the filter determining means 134 obtains the blocking artifact parameters of the pixel blocks 501 and 502 from the parameter memory means 118. Among these blocking artifact parameters, the DCT classes are compared, thereby the type of filter is determined in accordance with Table 1 below.

TABLE 1

|  |  | DCT class of block 501 | | |
| --- | --- | --- | --- | --- |
|  |  | I1 | I2 | I3 |
| DCT class of block 502 | I1 | F1 | F1 | F1 |
|  | I2 | F1 | F2 | F2 |
|  | I3 | F1 | F2 | F3 |

Table 1 is an example of the determination employed in the case where three types of filters F1, F2 and F3 are used. In this case, the strength of the filter (namely, the capability of eliminating blocking artifact) is the lowest in the filter F1 and the highest in the filter F3. Next, in step S32, the filter determining means 134 changes the type of filter by using the DC coefficients and the quantizer scales among the blocking artifact parameters. When the DC coefficients of the pixel blocks 501 and 502 are indicated as DC1 and DC2, respectively and the quantizer scales thereof are indicated as QS1 and QS2, respectively, the type of filter is changed to the filter F1 if any of the following formulas (1) and (2) is satisfied:

$$abs(DC1-DC2) > QS1 \times k(QS1 < QS2) \quad \text{Formula (1):}$$

$$abs(DC1-DC2) > QS2 \times k(QS1 \geq QS2) \quad \text{Formula (2):}$$

wherein k is a constant and abs is an absolute-value operation.

Similarly, the filter determining means 134 determines the types of filters to be respectively applied to block boundaries 512, 513 and 514 between the pixel block 501 and pixel blocks 503, 504 and 505 by using the blocking artifact parameters of these blocks. Then, the filter determining means 134 outputs the determined types of filters to the blocking artifact eliminating means 116.

The type of filter thus determined corresponds to the magnitude of detected blocking artifact. Specifically, when the filter F3 is determined to be applied, it can be said that the filter determining means 134 detects strong blocking artifact, and when the filter F1 is determined to be applied, it can be said that the filter determining means 134 detects weak blocking artifact or no blocking artifact. An example of the operation of the blocking artifact eliminating means 116 will now be described.

FIGS. 8(*a*) through 8(*e*) are diagrams for illustrating a horizontal filtering process conducted on a block boundary. In FIG. 8(*a*), the pixel blocks 501 and 502 of FIG. 6 are shown, and one square corresponds to one pixel. Herein, a filter is to be applied to the boundary 511 between the pixel blocks 501 and 502.

In the case where the blocking artifact detecting means 130 determines the type of filter to be applied to the boundary 511 as the filter F1, the blocking artifact eliminating means 116 applies no filter to the boundary 511. In the case where the blocking artifact detecting means 130 determines the type of filter to be applied to the boundary 511 as the filter F2, the blocking artifact eliminating means 116 applies a weak filter to pixels in the vicinity of the boundary 511. In this case, with respect to pixels on the fourth line from top in FIG. 8(*a*), for example, pixels b, c, d and e are filtered. As the filter, a low-pass filter can be used.

Figure 9:
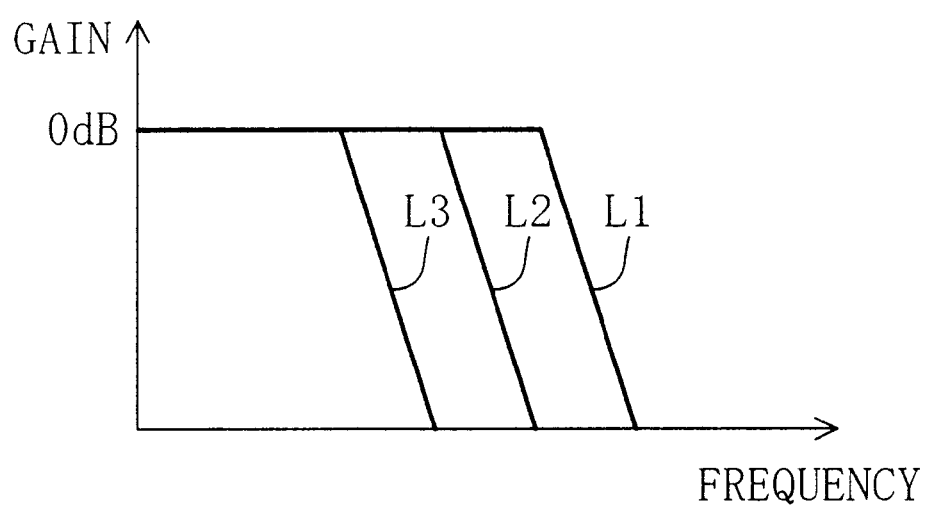
FIG. 9 is a graph for showing examples of the frequency characteristic of a filter.

FIG. 9 is a graph for showing the frequency characteristic of a filter. When the type of filter is determined as F2, for example, a low-pass filter having a frequency characteristic shown as L2 in FIG. 9 is used. By thus filtering, pixel values shown in FIG. 8(*b*) are changed to those shown in FIG. 8(*c*), and thus, blocking artifact is eliminated. At this point, in FIGS. 8(*b*) and 8(*c*), the ordinate indicates the pixel value and the abscissa indicates the position of pixel in the horizontal direction, which corresponds to the position of pixel shown in FIG. 8(*a*).

In the case where the blocking artifact detecting means 130 determines the type of filter to be applied to the boundary 511 as the filter F3, the blocking artifact eliminating means 116 applies a strong filter to pixels in the vicinity of the boundary 511. In this case, the filter is applied to pixels arranged in the same range as or in a wider range than in applying the filter F2. With respect to the pixels on the fourth line from top in FIG. 8(*a*), for example, pixels a, b, c, d, e and f are filtered. As the filter, a low-pass filter or the like can be used as in the case where the type of filter is determined as F2.

When the type of filter is determined as F3, for example, a low-pass filter having a frequency characteristic shown as L3 in FIG. 9 is used. In the case where a low-pass filter is used, the cut-off frequency is set to be lower in the filter F3 (as shown as the characteristic L3) than in the filter F2 (as shown as the characteristic L2). In this manner, the capability of eliminating blocking artifact is higher when the filter F3 is determined to apply than when the filter F2 is determined to apply. By thus applying a filter, pixel values shown in FIG. 8(*d*) are changed to those shown in FIG. 8(*e*), and thus, blocking artifact is eliminated.

Although the filter is herein applied in the horizontal direction, a filter can be similarly applied in the vertical direction to the boundaries 513, 514 and the like of FIG. 6.

The frame in which the filters have been thus applied by the blocking artifact eliminating means 116 is output as an output image.

As described above, in the image decoding apparatus of Embodiment 1, a block is classified into any of a plurality of DCT classes by using DCT coefficients obtained from a bitstream. Furthermore, a filter to be applied to a block boundary is determined by using the DCT classes, the quantizer scales and the DC coefficients of adjacent blocks sandwiching the block boundary. The filter is determined so that the strength of a filter can be stronger as DCT coefficients greater than a predetermined value are distributed in a lower region alone. According to the thus determined filter, pixels in the vicinity of the block boundary in a decoded image are filtered.

In this manner, in the image decoding apparatus of Embodiment 1, a block boundary where blocking artifact occurs can be definitely detected based on the DCT coefficient distributions of adjacent blocks, and erroneous detection of blocking artifact can be avoided by checking an absolute value of a difference in the DC coefficients. Thus, blocking artifact can be definitely eliminated with blur of the image minimized by selectively using a plurality of filters having different strengths previously prepared in accordance with the magnitude of blocking artifact. Moreover, the classification into the DCT classes is carried out not separately in the horizontal and vertical directions, and hence, blocks can be classified with a small processing amount.

In this embodiment, although a DCT coefficient block is classified into any of the three DCT classes by using the two DCT patterns of FIGS. 4(a) and 4(b) with respect to an intra coded block, neither the number of the DCT patterns is limited to two nor the number of the DCT classes are limited to three. Furthermore, the frequency distributions of the DCT patterns are not limited to those shown in FIGS. 4(a) and 4(b).

Furthermore, the right side of each of Formulas (1) and (2) is an expression using a quantizer scale, but the value of the right side may be a fixed value regardless of the quantizer scale.

In addition, the three types of filters are used in the blocking artifact eliminating means 116 of this embodiment, but the number of types of filters is not limited to three.

Moreover, although the filter used in the blocking artifact eliminating means 116 is a low-pass filter in this embodiment, the filter can be any of other filters, such as a median filter, as far as it can eliminate blocking artifact.

Furthermore, although no filter is applied to a block boundary when the type of filter is determined as F1 in this embodiment, a filter weaker than that used when the type of filter is determined as F2 may be applied.

Additionally, four pixels in the vicinity of a block boundary are filtered when the type of filter is determined as F2 and six pixels in the vicinity of the block boundary are filtered when the type of filter is determined as F3, but the range of pixels to be filtered may be different from those described in this embodiment.

Although the filters F2 and F3 are applied to different ranges of pixels in this embodiment, they may be applied to the same range of pixels.

Furthermore, the filter determining means 134 determines the type of filter when the blocking artifact parameters of one frame are completed to be stored in the parameter memory means 118, but the type of filter may be determined at another timing.

EMBODIMENT 2

In an image decoding apparatus of Embodiment 2, a blocking artifact as coding noise is detected and eliminated in decoding a non-intra coded frame.

The image decoding apparatus of this embodiment uses blocking artifact detecting means 140 instead of the blocking artifact detecting means 130 of the image decoding apparatus shown in FIG. 1. Variable-length decoding means 110, inverse quantization means 111, inverse DCT means 112, switches 113 and 114, a frame memory 115, blocking artifact eliminating means 116, parameter memory means 118 and an adder 119 are the same as those used in Embodiment 1, and hence, like reference numerals are used to omit the description. In this case, the blocking artifact detecting means 140 works as a noise detector.

Figure 10:
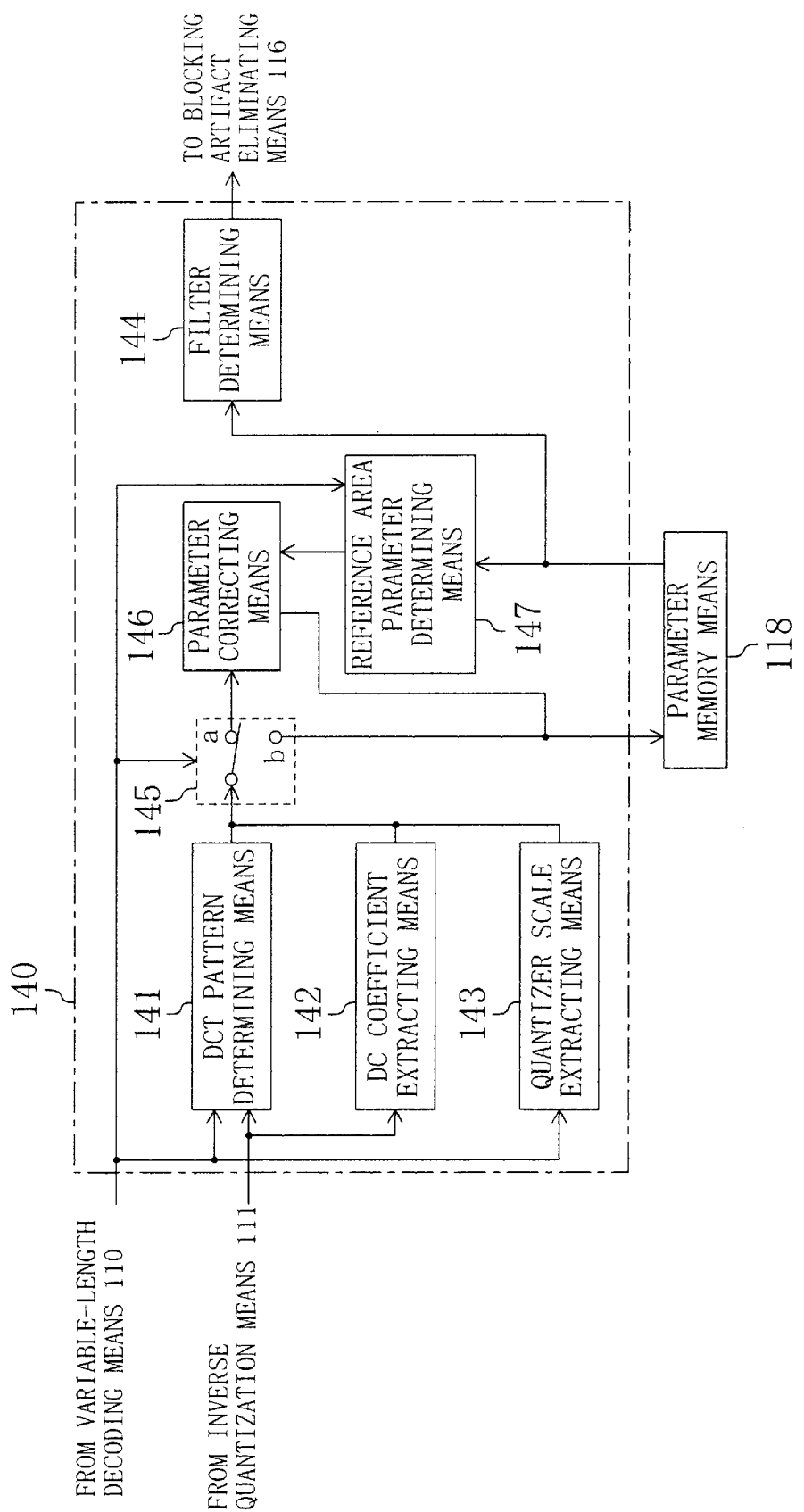
FIG. 10 is a block diagram for showing the structure of blocking artifact detecting means according to Embodiment 2 of the invention.

FIG. 10 is a block diagram for showing the structure of the blocking artifact detecting means 140. The blocking artifact detecting means 140 of FIG. 10 includes DCT pattern determining means 141, DC coefficient extracting means 142, quantizer scale extracting means 143, filter determining means 144, a switch 145, parameter correcting means 146, and reference area parameter determining means 147. The blocking artifact detecting means 140 is supplied with DCT coefficients by the inverse quantization means 111 and with a quantizer scale, a macroblock coding mode and a motion vector by the variable-length decoding means 110. Also, the parameter memory means 118 stores blocking artifact parameters of a previously decoded frame obtained as described in Embodiment 1.

The DCT pattern determining means 141 receives a DCT coefficient block from the inverse quantization means 111, classifies the block according to the frequency component distribution thereof and outputs the result of the classification to the switch 145.

The block is classified as follows: The DCT pattern determining means 141 determines, as described in Embodiment 1, that an input DCT coefficient block satisfies any of the DCT patterns of FIGS. 4(a) through 4(d) when the input DCT coefficient block includes a coefficient associated with a hatched frequency component having an absolute value larger than a predetermined value.

When the macroblock coding mode indicates that the input DCT coefficient block is an intra coded block, the DCT pattern determining means 141 uses the DCT pattern PTN1 of FIG. 4(a) and the DCT pattern PTN2 of FIG. 4(b). On the other hand, when the macroblock coding mode indicates that the input DCT coefficient block is a non-intra coded block, the DCT pattern PTN3 of FIG. 4(c) and the DCT pattern PTN4 of FIG. 4(d) are used.

The classification of an intra coded block is herein omitted because it is described in Embodiment 1. Now, the classification of a non-intra coded block will be described.

Figure 11:
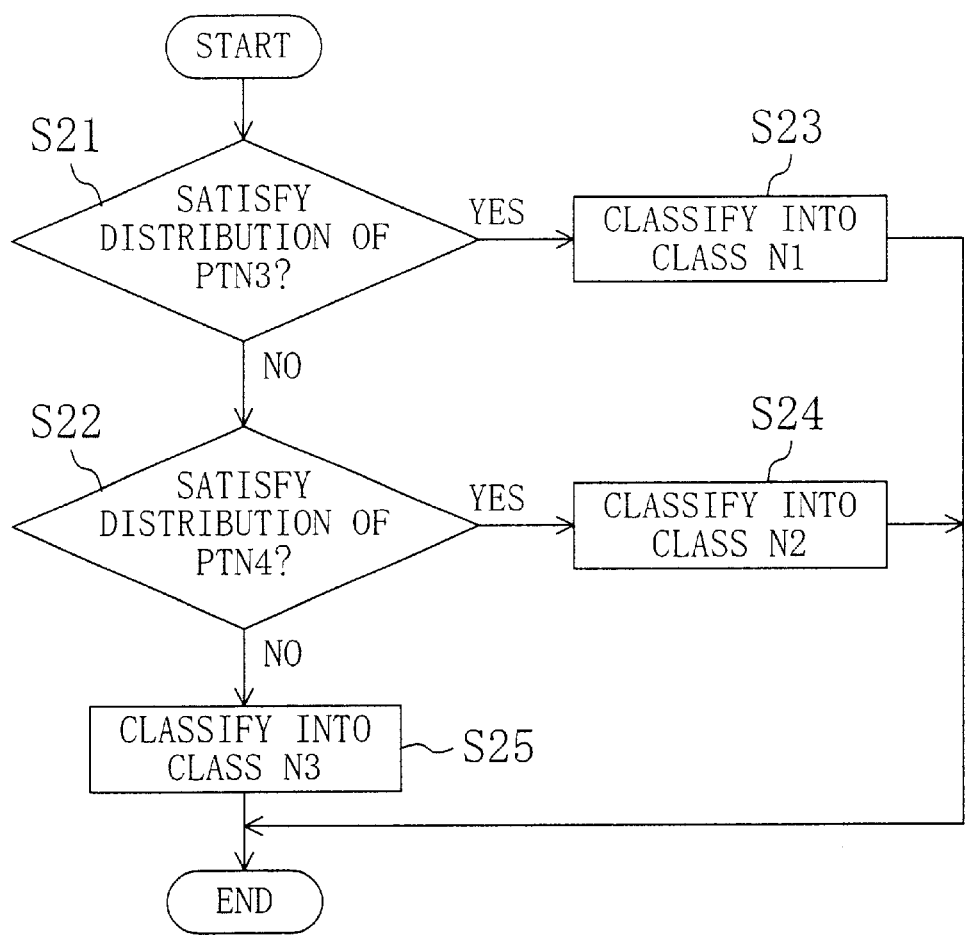
FIG. 11 is a flowchart for showing procedures in classifying a non-intra coded block.

FIG. 11 is a flowchart for showing procedures in the classification of a non-intra coded block. As is shown in FIG. 11, the input DCT coefficient block is first compared with the DCT pattern PTN3 in step S21. When the input DCT coefficient block satisfies the DCT pattern PTN3, the block is classified into a DCT class N1 (step S23). When the input DCT coefficient block does not satisfy the DCT pattern PTN3, the input DCT coefficient block is compared with the DCT pattern PTN4 in step S22. When the input DCT coefficient block satisfies the DCT pattern PTN4, the block is classified into a DCT class N2 (step S24). When the input DCT coefficient block does not satisfy the DCT pattern PTN4, the block is classified into a DCT class N3 (step S25).

In this manner, the DCT pattern determining means 141 classifies each block into any of the DCT classes N1, N2 and N3, and outputs the result of the classification to the switch 145.

The DC coefficient extracting means 142 extracts a DC coefficient alone from the input DCT coefficients and outputs the extracted DC coefficient to the switch 145. The quantizer scale extracting means 143 extracts a quantizer scale from the coding information output from the variable-length decoding means 110 and outputs the extracted quantizer scale to the switch 145.

The switch 145 switches connection in accordance with the macroblock coding mode output from the variable-length decoding means 110. When the macroblock coding mode is the intra coding, the switch 145 is connected to a terminal b. The operation conducted in this case is the same as that described in Embodiment 1. When the macroblock coding mode is the non-intra coding, the switch 145 is connected to a terminal a. Accordingly, the blocking artifact parameters are input to the parameter correcting means 146. The following description is given on the case where the macroblock coding mode is the non-intra coding.

The reference area parameter determining means 147 refers to the blocking artifact parameters of a reference block stored in the parameter memory means 118 by using the motion vector output by the variable-length decoding means 110, so as to determine the blocking artifact parameters of a reference area. Herein, the reference area is a block within the reference frame that is referred to, in decoding the target block from which noise is to be eliminated, based on the motion vector of the target block. The reference block is a pixel block within the reference frame overlapping the reference area. The operation of the reference area parameter determining means 147 will now be described in details.

FIGS. 12(*a*) and 12(*b*) are diagrams for illustrating a target block and its reference area. FIG. 12(*a*) shows a target block 521 as an object for noise elimination, and FIG. 12(*b*) shows a reference area 526 in a reference frame and reference blocks 522 through 525. The reference area 526 is a block to be referred to using the motion vector in decoding the target block 521.

As is shown in FIG. 12(*a*), when the address within the frame of the block 521 (namely, the position in the horizontal and vertical directions of an upper-left pixel of the block represented by using the number of pixels with the upper-left point of the frame regarded as the origin) is indicated as (x, y) and a motion vector is indicated as (MVx, MVy), the address of the reference area 526 is (x+MVx, y+MVy) as shown in FIG. 12(*b*). The reference area parameter determining means 147 searches for a block within a reference frame overlapping the reference area 526 using the address of the reference area 526. In the case shown in FIG. 12(*b*), since the reference area 526 overlaps the blocks 522 through 525, the reference area parameter determining means 147 obtains the blocking artifact parameters of the blocks 522 through 525 from the parameter memory means 118, so as to obtain the blocking artifact parameters of the reference area 526 by using these blocking artifact parameters and to output the obtained blocking artifact parameters to the parameter correcting means 146.

Among the blocking artifact parameters of the reference area 526, the DCT class is obtained as follows: It is herein assumed that the DCT classes of the blocks 522 through 525 are respectively I2, I1, I2 and I3, and that the numbers of pixels present in overlapping areas between the reference area 526 and the blocks 522 through 525 are respectively 36, 12, 12 and 4.

In a first method of obtaining the DCT class of the reference area 526, the DCT class of the reference area 526 is obtained as a mean value of the DCT classes of the blocks 522 through 525 weighted by the numbers of pixels present in the overlapping areas between the reference area 526 and the respective blocks. In this method, the DCT classes I1, I2 and I3 of the blocks 522 through 525 are allowed to correspond to values 0, 1 and 2, respectively, so as to obtain a mean value of these values weighted by the numbers of pixels present in the overlapping areas between the reference area 526 and the blocks belonging to these DCT classes. Then, a DCT class corresponding to a value closest to the obtained mean value is selected as the DCT class of the reference area 526.

In this method, the mean value of the values corresponding to the DCT classes of the blocks weighted by the numbers of pixels is $(1 \times 36 + 0 \times 12 + 1 \times 12 + 2 \times 4)/64 = 0.875$. The mean value, 0.875, rounded to the nearest whole number is 1, and the DCT class I2 corresponds to 1. Accordingly, the DCT class of the reference area 526 is determined as I2.

In a second method of obtaining the DCT class of the reference area 526, the DCT class of a block, including the largest numbers of pixels in the area overlapping with the reference area 526, is selected. According to this method, the DCT class of the reference area 526 is determined as the DCT class I2 corresponding to the DCT class of the block 522.

In a third method of obtaining the DCT class of the reference area 526, the minimum value or the maximum value of the DCT classes of the respective blocks is selected as the DCT class of the reference area 526. According to this method, the DCT class of the reference area 526 is determined as the DCT class I1 in selecting the minimum value and is determined as the DCT class I3 in selecting the maximum value.

Furthermore, in a fourth method of obtaining the DCT class of the reference area 526, the DCT class into which the largest number of blocks is classified among the blocks 522 through 525 is selected as the DCT class of the reference area 526. According to this method, since the number of blocks classified into the DCT class I2 is the largest, the DCT class of the reference area 526 is determined as the DCT class I2.

Next, a method of obtaining the DC coefficient among the blocking artifact parameters of the reference area 526 will be described.

In one method of obtaining the DC coefficient of the reference area 526, a mean value of the DC coefficients of the blocks 522 through 525 weighted by the numbers of pixels present in the overlapping areas between these blocks and the reference area 526 is obtained as the DC coefficient of the reference area 526.

In another method of obtaining the DC coefficient of the reference area 526, an average value of the DC coefficients of the blocks 522 through 525 is obtained as the DC coefficient of the reference area 526.

Next, a method of obtaining the quantizer scale among the blocking artifact parameters of the reference area 526 will be described.

In one method of obtaining the quantizer scale of the reference area 526, a mean value of the quantizer scales of the blocks 522 through 525 weighted by the numbers of pixels present in the overlapping areas between these blocks and the reference area 526 is obtained as the quantizer scale of the reference area 526.

In another method of obtaining the quantizer scale of the reference area 526, the minimum value or the maximum value of the quantizer scales of the blocks 522 through 525 is obtained as the quantizer scale of the reference area 526.

The parameter correcting means 146 receives through the switch 145 the blocking artifact parameters of the target block output from the DCT pattern determining means 141, the DC coefficient extracting means 142 and the quantizer scale extracting means 143 as well as the blocking artifact parameters of the reference area output from the reference area parameter determining means 147. Then, the parameter correcting means 146 corrects the blocking artifact parameters of the target block by using the blocking artifact parameters of the reference area, and outputs the corrected parameters to the parameter memory means 118. The parameter memory means 118 stores the input blocking artifact parameters.

First, the DCT class determined by the DCT pattern determining means 141 is corrected by using the DCT class of the reference area determined by the reference area parameter determining means 147. An example of this correction is shown in Table 2 below.

TABLE 2

|  |  | Output of reference area parameter determining means 147 | | |
|---|---|---|---|---|
|  |  | I1 | I2 | I3 |
| Output of DCT pattern determining means 141 | N1 | I1 | I1 | I1 |
|  | N2 | I1 | I2 | I2 |
|  | N3 | I1 | I2 | I3 |

In the correction shown in Table 2, a DCT class where blocking artifact is more difficult to occur is chosen between the DCT class determined by the DCT pattern determining means 141 and the DCT class of the reference area determined by the reference area parameter determining means 147.

Another example of the correction is shown in Table 3 below.

TABLE 3

|  |  | Output of reference area parameter determining means 147 | | |
|---|---|---|---|---|
|  |  | I1 | I2 | I3 |
| Output of DCT pattern determining means 141 | N1 | I1 | I2 | I2 |
|  | N2 | I2 | I2 | I3 |
|  | N3 | I2 | I3 | I3 |

In the correction shown in Table 3, a DCT class obtained as an average of the DCT class determined by the DCT pattern determining means 141 and the DCT class determined by the reference area parameter determining means 147 is chosen.

Next, the DC coefficient extracted by the DC coefficient extracting means 142 is corrected by using the DC coefficient obtained by the reference area parameter determining means 147. In an example of this correction, the DC coefficient obtained by the reference area parameter determining means 147 is added to the DC coefficient extracted by the DC coefficient extracting means 142.

Then, the quantizer scale extracted by the quantizer scale extracting means 143 is corrected by using the quantizer scale obtained by the reference area parameter determining means 147. In an example of this correction, a smaller one of the quantizer scale extracted by the quantizer scale extracting means 143 and the quantizer scale determined by the reference area parameter determining means 147 is chosen. Alternatively, an average or a larger one of these quantizer scales may be used.

When the blocking artifact parameters of blocks belonging to one frame are completed to be stored, the filter determining means 144 determines a filter to be applied to each boundary of the blocks with reference to the blocking artifact parameters in accordance with Table 1 and Formulas (1) and (2), for example. The filter determining means 144 is the same as the filter determining means 134 of Embodiment 1, and hence, the description is omitted in this embodiment. Herein, it can be said that the type of filter thus determined corresponds to the magnitude of detected blocking artifact.

As described above, in the image decoding apparatus of Embodiment 2, a block is classified into any of a plurality of DCT classes by using the DCT coefficients obtained from a bitstream. When the block is a non-intra coded block, a reference area within a reference frame is obtained by using a motion vector. The DCT classes, the DC coefficients and the quantizer scales of blocks overlapping the reference area are used to obtain the DCT class, the DC coefficient and the quantizer scale of the reference area, so as to correct the DCT class, the DC coefficient and the quantizer scale of the target block obtained from the information of the bitstream. Furthermore, a filter to be applied to a block boundary is determined by using the DCT classes, the quantizer scales and the DC coefficients of the adjacent blocks sandwiching the block boundary. In determining the filter, a stronger filter is applied as DCT coefficients greater than a predetermined value are distributed merely in a lower region.

In this manner, a block boundary where blocking artifact occurs can be definitely detected according to the DCT coefficient distribution in the image decoding apparatus of Embodiment 2=1. At this point, with respect to a non-intra coded block, DCT patterns different from those used with respect to an intra coded block are used, so as to classify the block suitably to the characteristic of the non-intra coding. Furthermore, since the absolute value of a difference in the DC coefficient is checked, erroneous detection of blocking artifact can be avoided. Moreover, since blocking artifact parameters of a non-intra coded block are determined also by using the blocking artifact parameters of a reference frame, blocking artifact can be detected more precisely. By preparing a plurality of filters with different strengths and selectively using them in accordance with the magnitude of blocking artifact, blocking artifact can be definitely eliminated with blur of the image minimized.

Figure 4C:
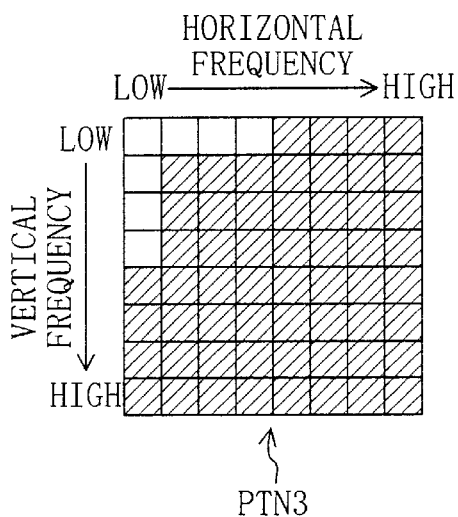
Figure 4D:
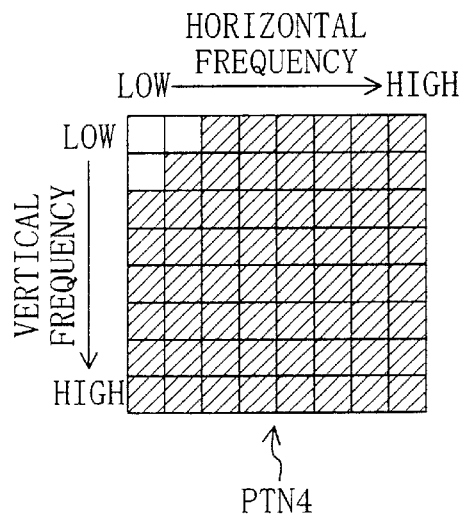

In this embodiment, although a DCT coefficient block is classified into any of the three DCT classes by using the two DCT patterns of FIGS. 4(c) and 4(d) with respect to a non-intra coded block, neither the number of the DCT patterns is limited to two nor the number of the DCT classes is limited to three. Furthermore, the frequency distributions of the DCT patterns are not limited to those shown in FIGS. 4(c) and 4(d).

Furthermore, although several examples are given as the method of determining the blocking artifact parameters of a reference area by the reference area parameter determining means 147, the determining method is not limited to those described above.

In addition, although the blocking artifact parameters are corrected by the parameter correcting means 146 by using Table 2 or 3 in this embodiment, the correcting method is not limited to that using Table 2 or 3.

Moreover, although the DCT class, the DC coefficient and the quantizer scale are corrected by using the reference area parameter determining means 147 and the parameter correcting means 146, any of the parameters may not be corrected.

Furthermore, the filter determining means 144 determines a filter when the blocking artifact parameters of one frame are completed to be stored in the parameter memory means 118, but the filter may be determined at another timing.

Moreover, the DCT pattern determining means 141 uses different DCT patterns with respect to an intra coded block and a non-intra coded block, but the same DCT patterns may be used.

EMBODIMENT 3

In an image decoding apparatus of Embodiment 3, the strength of a filter used for eliminating blocking artifact as coding noise is determined by, in addition to DCT coefficients, the size of a motion vector.

Figure 13:
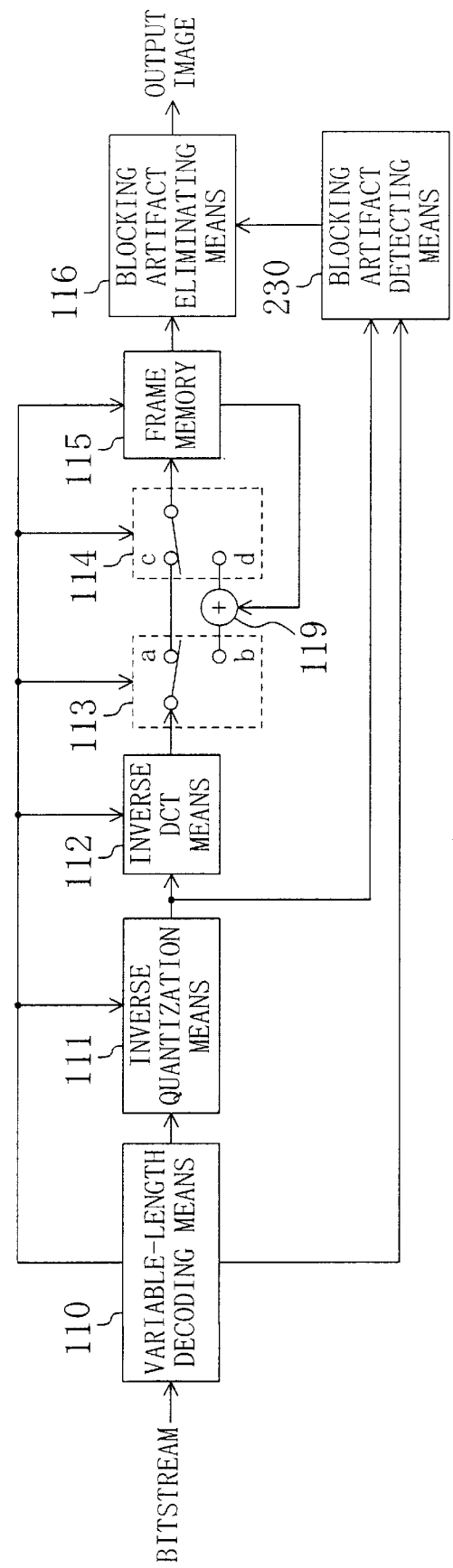
FIG. 13 is a block diagram of an image decoding apparatus according to Embodiment 3 of the invention.

FIG. 13 is a block diagram of the image decoding apparatus of Embodiment 3. The image decoding apparatus of FIG. 13 includes variable-length decoding means 110, inverse quantization means 111, inverse DCT means 112, switches 113 and 114, a frame memory 115, blocking artifact eliminating means 116, blocking artifact detecting means 230 and an adder 119. The variable-length decoding means 110, the inverse quantization means 111, the inverse DCT means 112, the switches 113 and 114, the frame memory 115, the blocking artifact eliminating means 116 and the adder 119 are the same as those used in Embodiment 1, and hence, like reference numerals are used to omit the description. In this case, the blocking artifact detecting means 230 works as a noise detector.

Figure 14:
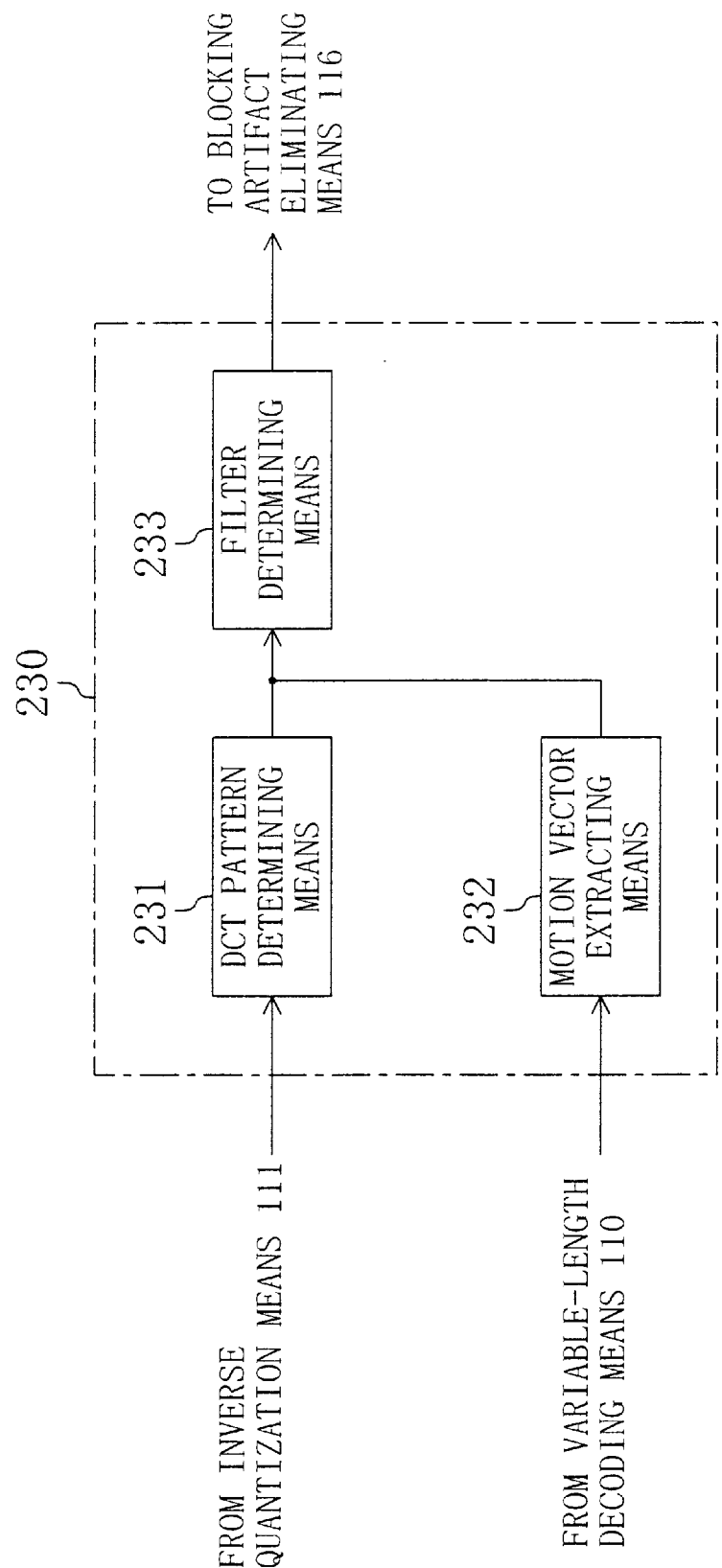
FIG. 14 is a block diagram for showing the structure of blocking artifact detecting means of the image decoding apparatus of FIG. 13.

FIG. 14 is a block diagram for showing the structure of the blocking artifact detecting means 230. The blocking artifact detecting means 230 of FIG. 14 includes DCT pattern determining means 231, motion vector extracting means 232 and filter determining means 233. The blocking artifact detecting means 230 receives DCT coefficients from the inverse quantization means 111 and a motion vector from the variable-length decoding means 110.

The DCT pattern determining means 231 receives a DCT coefficient block from the inverse quantization means 111. The DCT pattern determining means 231 determines according to the frequency component distribution of the DCT coefficient block whether or not the input DCT coefficient block includes a high frequency component.

FIGS. 15(*a*) and 15(*b*) are diagrams for illustrating DCT patterns used in classification of a block. The DCT pattern determining means 231 determines whether or not the input DCT coefficient block satisfies the DCT pattern of FIG. 15(*a*), and outputs the result of the determination to the filter determining means 233. This determination is made in the same manner as described in Embodiment 1.

It is herein assumed, for convenience of explanation, that the DCT pattern determining means 231 outputs to the filter determining means 233 "Yes" when the DCT coefficient block satisfies the DCT pattern and "No" when not as the result of the determination. Furthermore, since the DCT pattern is used to determine whether or not a block includes a high frequency component, the DCT pattern of FIG. 15(*a*) can be replaced with, for example, the DCT pattern of FIG. 15(*b*).

The motion vector extracting means 232 extracts a motion vector from the coding information output by the variable-length decoding means 110 and obtains the size of the motion vector to be output to the filter determining means 233. The size of the motion vector can be obtained by any of various methods, for example, by obtaining the sum of squares of the horizontal component and the vertical component of the motion vector, by obtaining the absolute sum of the horizontal component and the vertical component of the motion vector, or by obtaining a larger absolute value between the horizontal component and the vertical component of the motion vector.

The filter determining means 233 determines a filter to be applied to each block boundary by using the result of the determination output by the DCT pattern determining means 231 and the size of the motion vector output by the motion vector extracting means 232. Now, a method of determining a filter will be described.

It is herein assumed that pixel blocks 501, 503, 505 and 506 are arranged as is shown in FIG. 6, and together form a pixel macroblock. In this embodiment, a filter to be applied to each boundary of the pixel macroblock will be determined.

Figure 16:
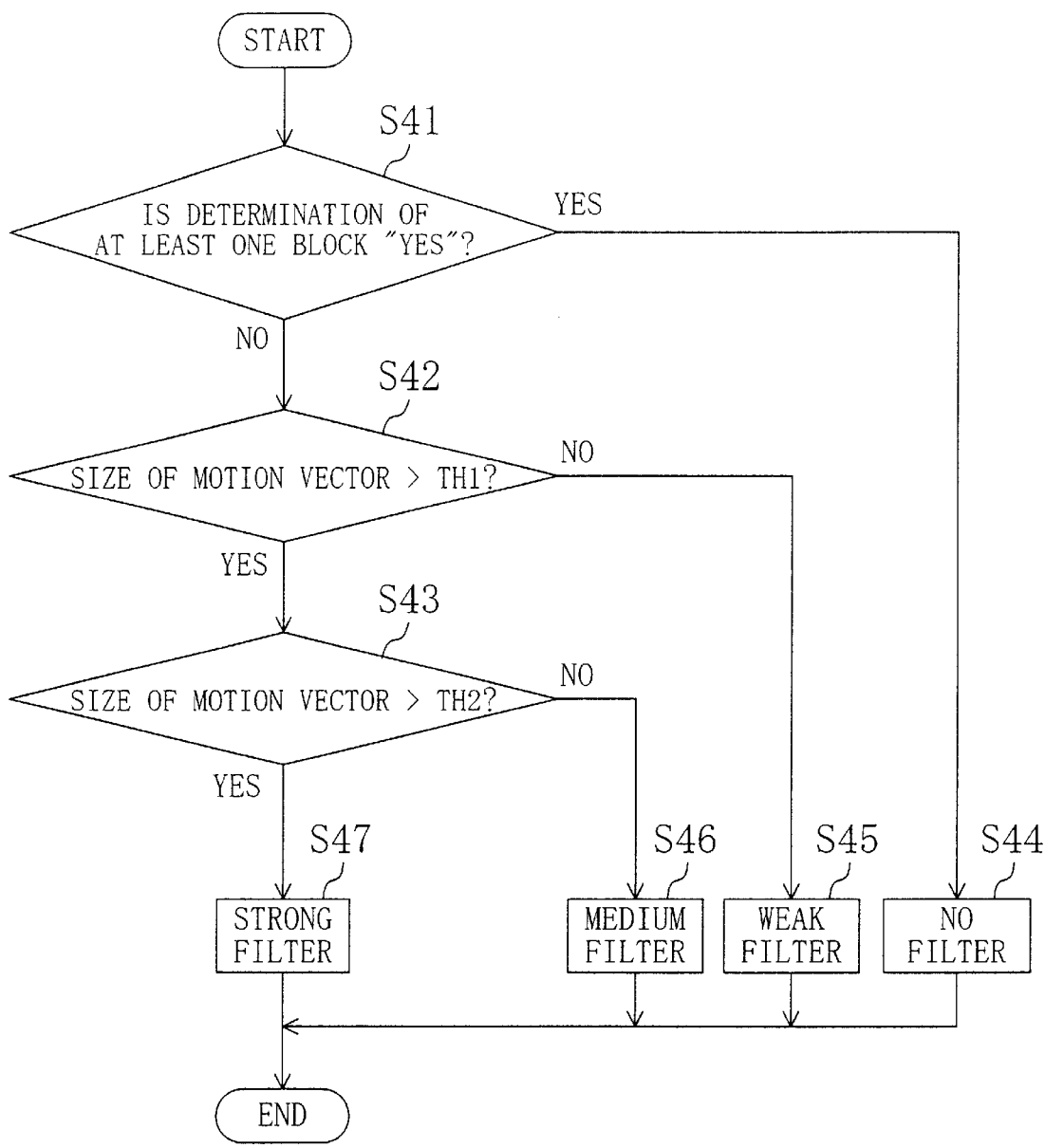
FIG. 16 is a flowchart for showing procedures in the classification of a block.

FIG. 16 is a flowchart for showing procedures in classification of a block. The filter determining means 233 determines the type of filter in accordance with the procedures shown in FIG. 16. This embodiment exemplifies the determination of a filter to be applied to a block boundary 511 between the pixel block 501 and the pixel block 502.

First, in step S41 of FIG. 16, the outputs of the DCT pattern determining means 231 with respect to the two blocks sandwiching the block boundary, namely, the pixel blocks 501 and 502, are checked. When at least one of the blocks is determined as "Yes", it is determined to apply no filter to the block boundary (step S44). In other cases, the procedure proceeds to step S42.

In step S42, the size of the motion vector output from the motion vector extracting means 232 is compared with a predetermined threshold value TH1, and when the size of the motion vector is smaller than the threshold value TH1, it is determined to apply a weak filter (step S45). In other cases, the procedure proceeds to step S43. In step S43, the size of the motion vector is compared with a predetermined threshold value TH2, which is larger than the threshold value TH1. When the size of the motion vector is smaller than the threshold value TH2, it is determined to apply a medium filter (step S46). In other cases, it is determined to apply a strong filter (step S47).

In the comparison of the size of the motion vector in steps S42 and S43, the sizes of the motion vectors of both the blocks, namely, the pixel blocks 501 and 502, may be used, or the size of merely one of the motion vectors may be used. For example, in the case where the sizes of the motion vectors of both the blocks are used, it may be determined that the condition of step S42 or S43 is satisfied when one of the sizes is larger than the threshold value or when both the sizes are larger than the threshold value. At this point, the strength of a filter accords with the cut-off frequency of the filter when the filter is, for example, a low-pass filter. In this case, a filter with a lower cut-off frequency is stronger.

Similarly, the filter determining means 233 determines the type of filter to be applied to each of the other macroblock boundaries, and outputs the determined types of filters to the blocking artifact eliminating means 116.

Figure 17:
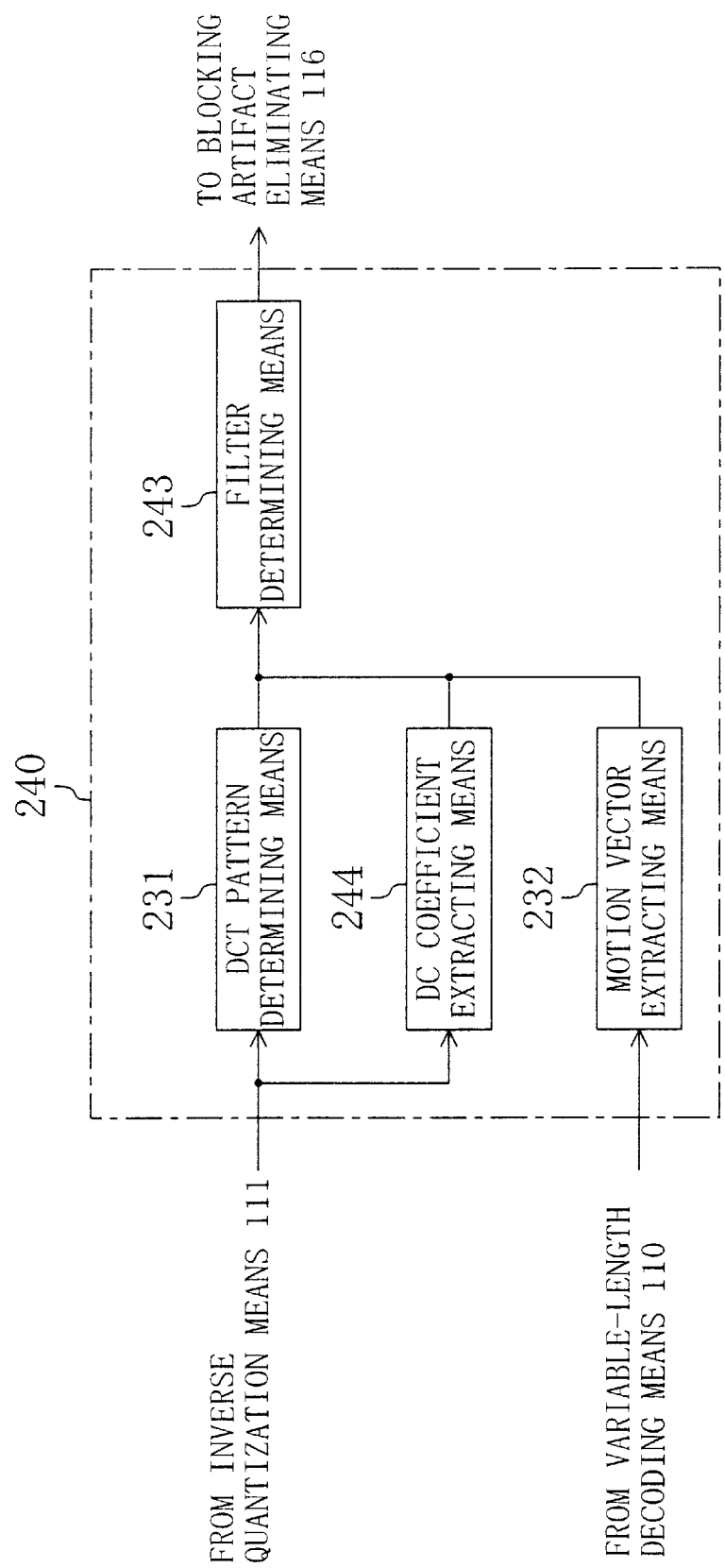
FIG. 17 is a block diagram for showing another exemplified structure of the blocking artifact detecting means of FIG. 14.

FIG. 17 is a block diagram for showing another exemplified structure of the blocking artifact detecting means of FIG. 14. The blocking artifact detecting means 240 of FIG. 17 includes DCT pattern determining means 231, motion vector extracting means 232, filter determining means 243 and DC coefficient extracting means 244. The DCT pattern determining means 231 and the DC coefficient extracting means 244 receive DCT coefficients from the inverse quantization means 111, and the motion vector extracting means 232 receives a motion vector from the variable-length decoding means 110.

The DCT pattern determining means 231 and the motion vector extracting means 232 are the same as those described with reference to FIG. 14, and hence, the description is omitted.

The DC coefficient extracting means 244 extracts a DC coefficient (DC coefficient) alone from the DCT coefficient block output by the inverse quantization means 111, and outputs the extracted DC coefficient to the filter determining means 243.

The filter determining means 243 determines a filter to be applied to each block boundary by using the result of the determination output by the DCT pattern determining means 231, the size of the motion vector output by the motion vector extracting means 232 and the DC coefficient output by the DC coefficient extracting means 244. The operation of the filter determining means 243 will now be described.

Figure 18:
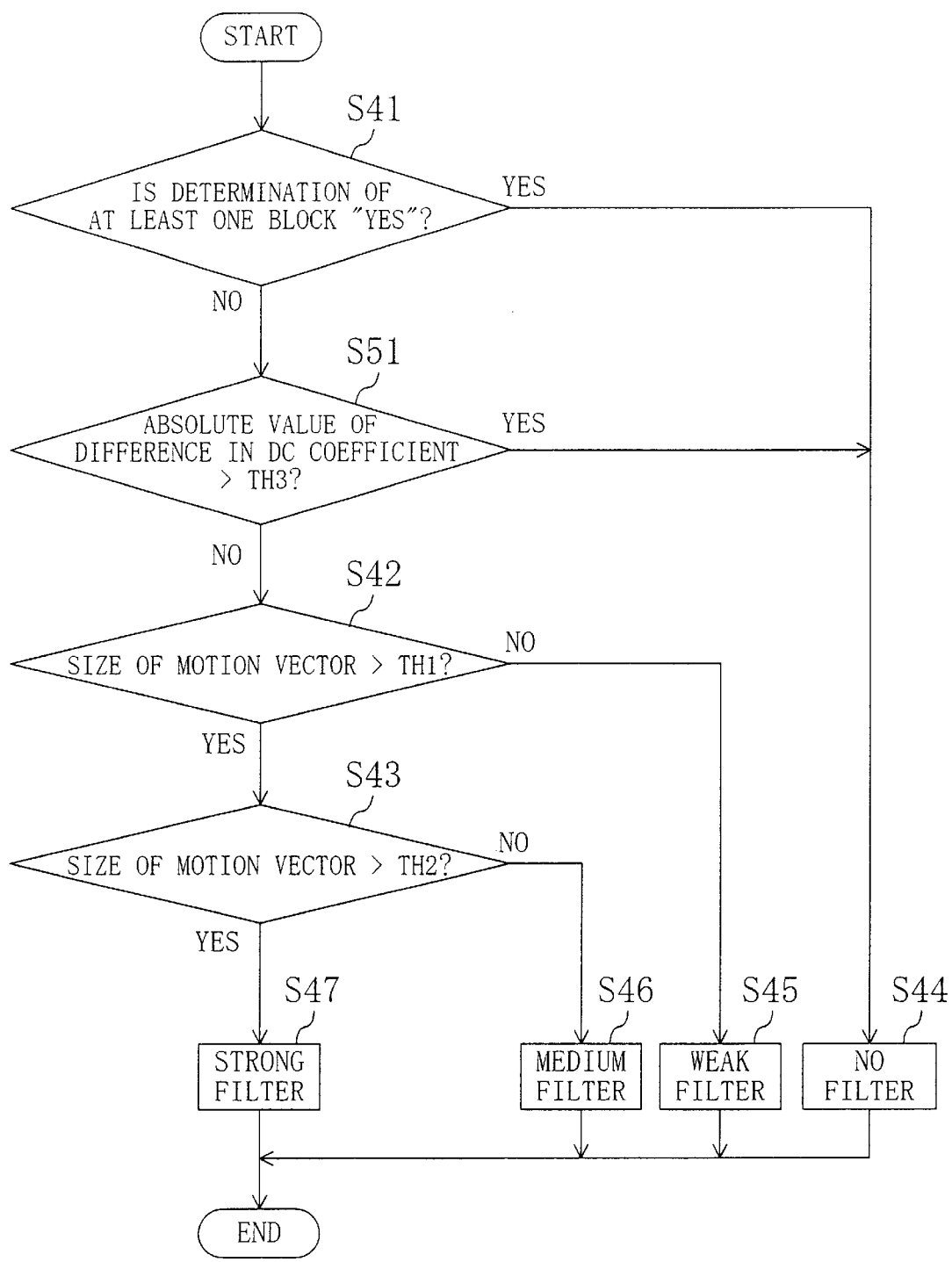
FIG. 18 is a flowchart for showing procedures in classifying a block by using DC components.

FIG. 18 is a flowchart for showing procedures in the classification of a block by using the DC coefficient. The filter determining means 243 determines the type of filter in accordance with the procedures shown in FIG. 18. The procedures of FIG. 18 are different from those of FIG. 16 in a procedure of step S51 added between steps S41 and S42. Therefore, the procedure of step S51 alone will be described.

In step S51, an absolute value of a difference in the DC coefficient between the adjacent two blocks is obtained, and it is determined whether or not the absolute value is larger than a predetermined threshold value TH3. When the absolute value of the difference is larger than the threshold value TH3, it is determined to apply no filter to the block boundary 511 (step S44). In other cases, the procedure proceeds to step S42.

The filter determining means 243 outputs the type of filter thus determined to the blocking artifact eliminating means 116.

Figure 19:
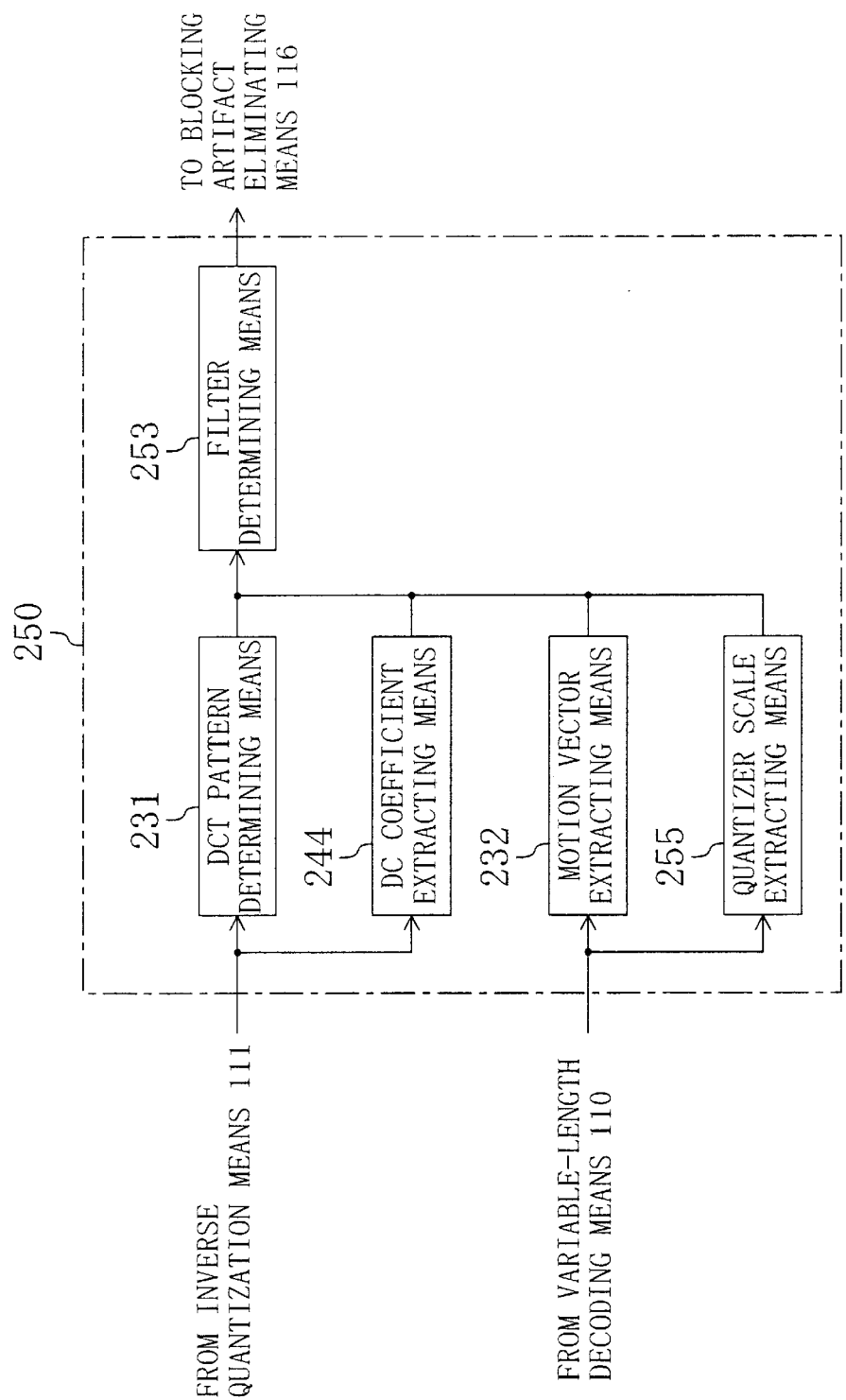
FIG. 19 is a block diagram for showing still another exemplified structure of the blocking artifact detecting means of FIG. 14.

FIG. 19 is a block diagram for showing still another exemplified structure of the blocking artifact detecting means of FIG. 14. The blocking artifact detecting means 250 of FIG. 19 includes DCT pattern determining means 231, motion vector extracting means 232, filter determining means 253, DC coefficient extracting means 244 and quantizer scale extracting means 255.

The DCT pattern determining means 231, the motion vector extracting means 232 and the DC coefficient extracting means 244 are the same as those described with reference to FIGS. 14 and 17, and hence, the description is omitted.

The quantizer scale extracting means 255 extract a quantizer scale from the coding information input from the variable-length decoding means 110, and outputs the extracted quantizer scale to the filter determining means 253.

The filter determining means 253 determines a filter to be applied to each block boundary by using the result of the determination output by the DCT pattern determining means 231, the size of the motion vector output by the motion vector extracting means 232, the DC coefficient output by the DC coefficient extracting means 244 and the quantizer scale output by the quantizer scale extracting means 255. The operation of the filter determining means 253 will now be described.

The filter determining means 253 carries out substantially the same procedures as those shown in FIG. 18, whereas the filter determining means 253 uses, as the threshold value TH3 in step S51 of FIG. 18, a value obtained multiplying the quantizer scale output by the quantizer scale extracting means 255 by a constant. The filter determining means 253 outputs the type of filter thus determined to the blocking artifact eliminating means 116.

The blocking artifact eliminating means 116 carries out substantially the same procedures as those described in Embodiment 1, whereas a medium filter corresponds to the filter F2 and a strong filter corresponds to the filter F3 of Embodiment 1. Furthermore, in the case where the type of filter thus determined is a weak filter, the blocking artifact eliminating means 116 applies the filter to pixels in a range equivalent to or smaller than the range of pixels to which a medium filter is applied. In the case where a low-pass filter is used, the cut-off frequency of a weak filter is set to be higher than that of a medium filter as is shown as the frequency characteristic L1 of FIG. 9. Herein, it can be said that the type of filter thus determined corresponds to the magnitude of detected blocking artifact.

A filter is applied in the same manner in the vertical direction. In an interlaced image, a filter in the vertical direction is applied within the same field.

As described above, in the image decoding apparatus of Embodiment 3, it is determined whether or not each block includes a high frequency component according to the frequency distribution of orthogonal transformation coefficients such as DCT coefficients obtained from a bitstream. Then, a filter to be applied to a block boundary is determined by using the results of the determination of the frequency distribution of the orthogonal transformation coefficients, the sizes of the motion vectors, the DC coefficients and the quantizer scales of adjacent blocks sandwiching the block boundary. At this point, the type of filter is determined so as to apply no filter to a block having a high frequency component. In the case where a block does not include a high frequency component, a stronger filter is applied to a block with a larger motion vector. When the DC coefficient is used, no filter is applied if the absolute value of a difference in the DC coefficient between the adjacent blocks is larger than a predetermined value. The predetermined value used in this case may be a value in accordance with the quantizer scale. By applying the thus determined filter to pixels in the vicinity of the block boundary of the decoded image, blocking artifact is eliminated.

In this manner, in the image decoding apparatus of Embodiment 3, a block boundary where blocking artifact occurs can be definitely detected by the sizes of the motion vectors of the adjacent blocks. In addition, no filter is applied to a block including a high frequency component. Therefore, erroneous detection can be avoided so as to prevent the degradation in picture quality. Moreover, since the absolute value of a difference in the DC coefficients is checked, it is possible to prevent erroneous detection that a blocking artifact is detected on a block boundary between blocks with a large luminance difference. Furthermore, when a value in accordance with the quantizer scale is used as the threshold value in checking the absolute value of the difference in the DC coefficients, the absolute value is suitably checked in accordance with the picture quality. Since a plurality of filters having different strength are selectively used in accordance with the size of a motion vector, pixels can be filtered according to the magnitude of blocking artifact. As a result, blocking artifact can be definitely eliminated with blur of the image minimized and without making any erroneous detection.

Figure 15A:
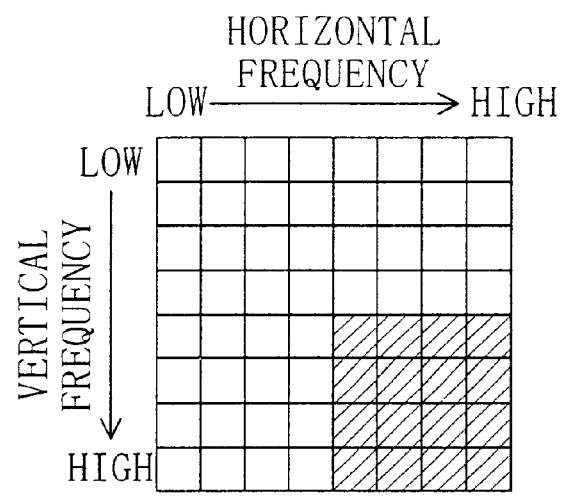
FIGS. 15(a) and 15(b) are diagrams of DCT patterns used in classification of blocks.
Figure 15B:
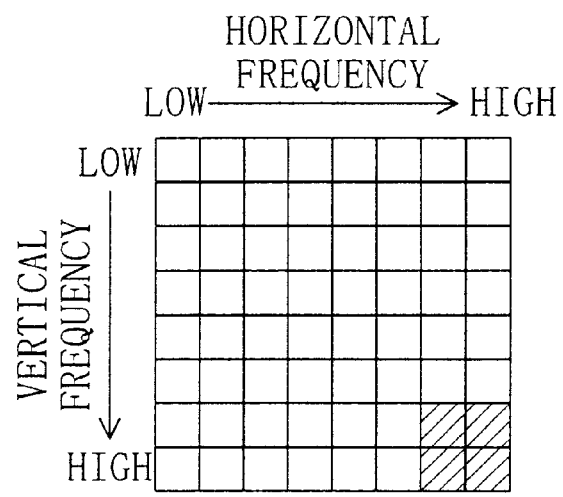

Although the two DCT patterns of FIGS. 15(a) and 15(b) are described as examples of the DCT pattern, the frequency distribution of the DCT pattern is not limited to them.

Furthermore, although the three types of filters are used in the blocking artifact eliminating means 116, the number of types of filters is not limited to three.

In addition, the two threshold values TH1 and TH2 are used with respect to the size of a motion vector in this embodiment, the number of the threshold values is not limited to two.

Moreover, although the filter used in the blocking artifact eliminating means 116 is described as a low-pass filter, any other filter such as a median filter and a non-linear filter may be used instead as far as it can eliminate blocking artifact.

EMBODIMENT 4

In an image decoding apparatus of Embodiment 4, the strength of a filter for eliminating blocking artifact as coding noise is determined according to not only DCT coefficients and the size of a motion vector of a target block but also parameters of a reference area of the target block.

The image decoding apparatus of Embodiment 4 uses blocking artifact detecting means 260 instead of the blocking artifact detecting means 130 of the image decoding apparatus of FIG. 1. In the image decoding apparatus of this embodiment, variable-length decoding means 110, inverse quantization means 111, inverse DCT means 112, switches 113 and 114, a frame memory 115, blocking artifact eliminating means 116, parameter memory means 118 and an adder 119 are the same as those described in Embodiment 1 and like reference numerals are used to omit the description. In this case, the blocking artifact detecting means 260 works as a noise detector. The blocking artifact detecting means 260 receives DCT coefficients from the inverse quantization means 111 and a motion vector from the variable-length decoding means 110.

Figure 20:
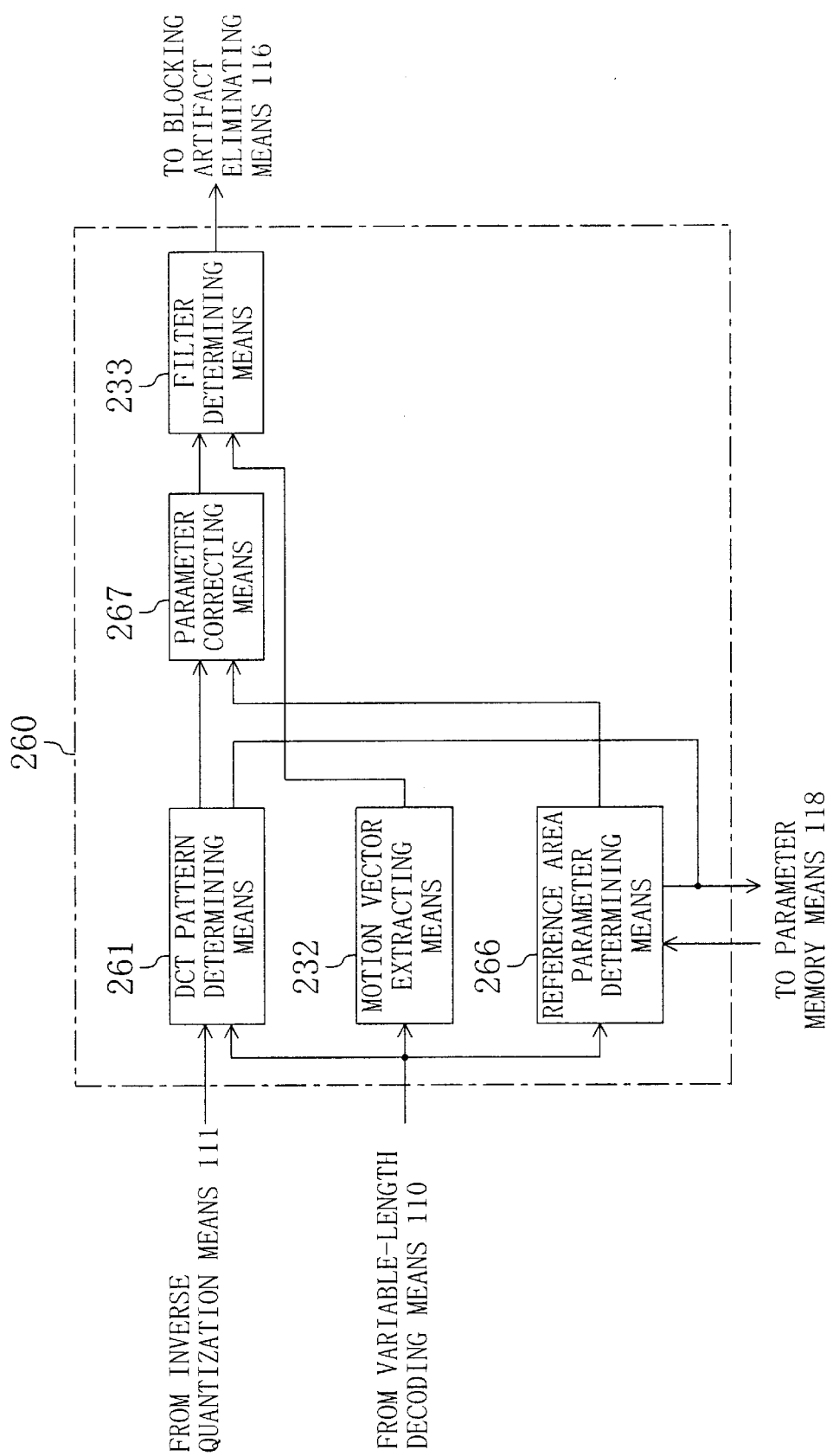
FIG. 20 is a block diagram for showing the structure of blocking artifact detecting means according to Embodiment 4 of the invention.

FIG. 20 is a block diagram for showing the structure of the blocking artifact detecting means 260. The blocking artifact detecting means 260 of FIG. 20 includes DCT pattern determining means 261, motion vector extracting means 232, filter determining means 233, reference area parameter determining means 266 and parameter correcting means 267. The DCT pattern determining means 261 receives DCT coefficients from the inverse quantization means 111, and the motion vector extracting means 232 and the reference area parameter determining means 266 receive a motion vector from the variable-length decoding means 110. Also, the DCT pattern determining means 261 receives coding information from the variable-length decoding means 110.

The motion vector extracting means 232 is the same as that described in Embodiment 3 with reference to FIG. 14, and hence, the description is omitted.

The DCT pattern determining means 261 receives a DCT coefficient block from the inverse quantization means 111. The DCT pattern determining means 261 determines according to the frequency component distribution of the DCT coefficient block whether or not the input DCT coefficient block includes a high frequency component. This determination is made in the same manner as described in Embodiment 3 and hence the description is omitted. The DCT pattern determining means 261 outputs the result of the determination to the parameter correcting means 267, and if a currently decoded frame is referred to in decoding another frame (for example, in the case of an I picture or a P picture in the MPEG-2), the DCT pattern determining means 261 outputs the result of the determination also to the parameter memory means 118.

The reference area parameter determining means 266 refers to the result of the determination on the DCT pattern of a block including pixels of a reference area by using the motion vector output by the variable-length decoding means 110.

As described in Embodiment 2 referring to FIG. 12, the reference area parameter determining means 266 obtains a reference area 526 and blocks 522 through 525 overlapping the reference area 526 within a reference frame that is referred to in decoding the target block 521. The reference area parameter determining means 266 reads the results of the determination on the DCT pattern of the blocks 522 through 525 from the parameter memory means 118, obtains the result of the determination of the reference area 526 by using these results of the blocks, and outputs the obtained result of the reference area 526 to the parameter correcting means 267 and the parameter memory means 118.

The determination result of the reference area 526 can be obtained by using the determination result of the blocks 522 through 525 by any of various methods. For example, the determination result of a block including the largest number of pixels in an overlapping area with the reference area 526 may be determined as the determination result of the reference area 526; in the case where the determination result on the DCT pattern of at least one of the blocks 522 through 526 is "Yes", the determination result of the reference area 526 may be also determined as "Yes"; or the determination result of the reference area 526 may be determined by majority of the determination result of the blocks 522 through 525.

The parameter correcting means 267 receives, as its inputs, the result of the determination on the DCT pattern output by the DCT pattern determining means 261 and the result of the determination on the DCT pattern of the reference area output by the reference area parameter determining means 266. The parameter correcting means 267 corrects the determination made by the DCT pattern determining means 261 by using the determination made by the reference area parameter determining means 266. In this case, when at least one of the determination results is "Yes", the parameter correcting means 267 outputs "Yes" to the filter determining means 233.

The filter determining means 233 receives, as its inputs, the result of the determination output by the parameter correcting means 267 and the size of the motion vector output by the motion vector extracting means 232, and determines the type of filter to be applied to each block boundary by using these inputs. The filter determining means 233 determines the type of filter in the same manner as described with respect to the filter determining means 233 of FIG. 14. The type of filter determined by the filter determining means 233 is output to the blocking artifact eliminating means 116.

The blocking artifact eliminating means 116 applies the determined type of filter to a block boundary of the image output by the frame memory 115 in the same manner as described in Embodiment 3, so as to eliminate blocking artifact. The blocking artifact eliminating means 116 outputs an image from which the noise has been eliminated as an output image.

Figure 21:
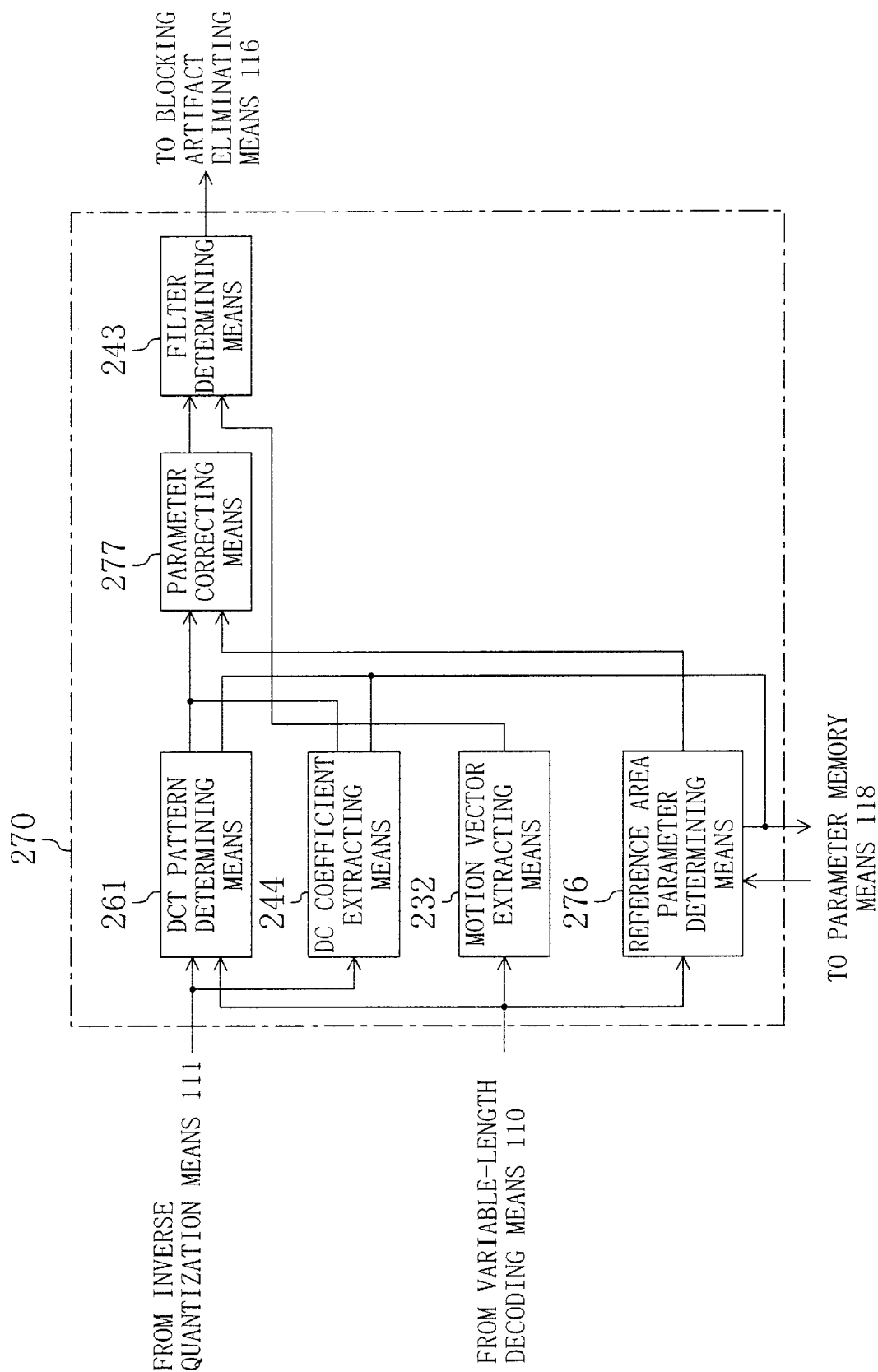
FIG. 21 is a block diagram for showing another exemplified structure of the blocking artifact detecting means of FIG. 20.

FIG. 21 is a block diagram for showing another exemplified structure of the blocking artifact detecting means of FIG. 20. The blocking artifact detecting means 270 of FIG. 21 includes DCT pattern determining means 261, motion vector extracting means 232, filter determining means 243, DC coefficient extracting means 244, reference area parameter determining means 276 and parameter correcting means 277. The DCT pattern determining means 261 and the DC coefficient extracting means 244 receive DCT coefficients from the inverse quantization means 111, and the motion vector extracting means 232 and the reference area parameter determining means 276 receive a motion vector from the variable-length decoding means 110. Also, the DCT pattern determining means 261 receives the coding information from the variable-length decoding means 110.

The DCT pattern determining means 261 and the motion vector extracting means 232 are the same as those described with reference to FIG. 20 and the DC coefficient extracting means 244 is the same as that described with reference to FIG. 17, and hence, the description is omitted.

The outputs of the DCT pattern determining means 261 and the DC coefficient extracting means 244 are input to the parameter correcting means 277. Furthermore, in the case where a currently decoded frame is a frame referred to in decoding another frame, the outputs of the DCT pattern determining means 261 and the DC coefficient extracting means 244 are also input to the parameter memory means 118. Furthermore, the output of the motion vector extracting means 232 is input to the filter determining means 243.

The reference area parameter determining means 276 obtains the determination result on the DCT pattern and the DC coefficient of the reference frame from the parameter memory means 118 by using the motion vector output by the variable-length decoding means 110. The method of obtaining these pieces of information of the reference frame and the method of obtaining the determination result on the DCT pattern of the reference area are the same as those described with respect to the reference area parameter determining means 266 of FIG. 20. Also, for obtaining the DC coefficient of the reference area, an average value of the DC coefficients of blocks including pixels of the reference area can be used or a mean weighted by the overlapping areas of the blocks can be used.

The reference area parameter determining means 276 outputs the determination result on the DCT pattern and the DC coefficient of the reference area thus obtained to the parameter correcting means 277 and the parameter memory means 118.

The parameter correcting means 277 receives, as its inputs, the determination result on the DCT pattern output by the DCT pattern determining means 261, the DC coefficient output by the DC coefficient extracting means 244, and the determination result on the DCT pattern and the DC coefficient of the reference area output by the reference area parameter determining means 276. Then, the parameter correcting means 277 corrects the determination made by the DCT pattern determining means 261 by using the determination made by the reference area parameter determining means 276. This correction is made in the same manner as described with respect to the parameter correcting means 267 of FIG. 20.

Next, the parameter correcting means 277 corrects the DC coefficient output by the DC coefficient extracting means 244 by using the DC coefficient output by the reference area parameter determining means 276. This correction is made by adding the DC coefficient output by the reference area parameter determining means 276 to the DC coefficient output by the DC coefficient extracting means 244. The determination result on the DCT pattern and the DC coefficient corrected by the parameter correcting means 277 are input to the filter determining means 243.

The filter determining means 243 determines the type of filter to be applied to each block boundary by using the result of the determination and the DC coefficient output by the parameter correcting means 277 and the size of the motion vector output by the motion vector extracting means 232. The type of filter is determined in the same manner as described with respect to the filter determining means 243 of FIG. 17. The type of filter determined by the filter determining means 243 is output to the blocking artifact eliminating means 116.

Figure 22:
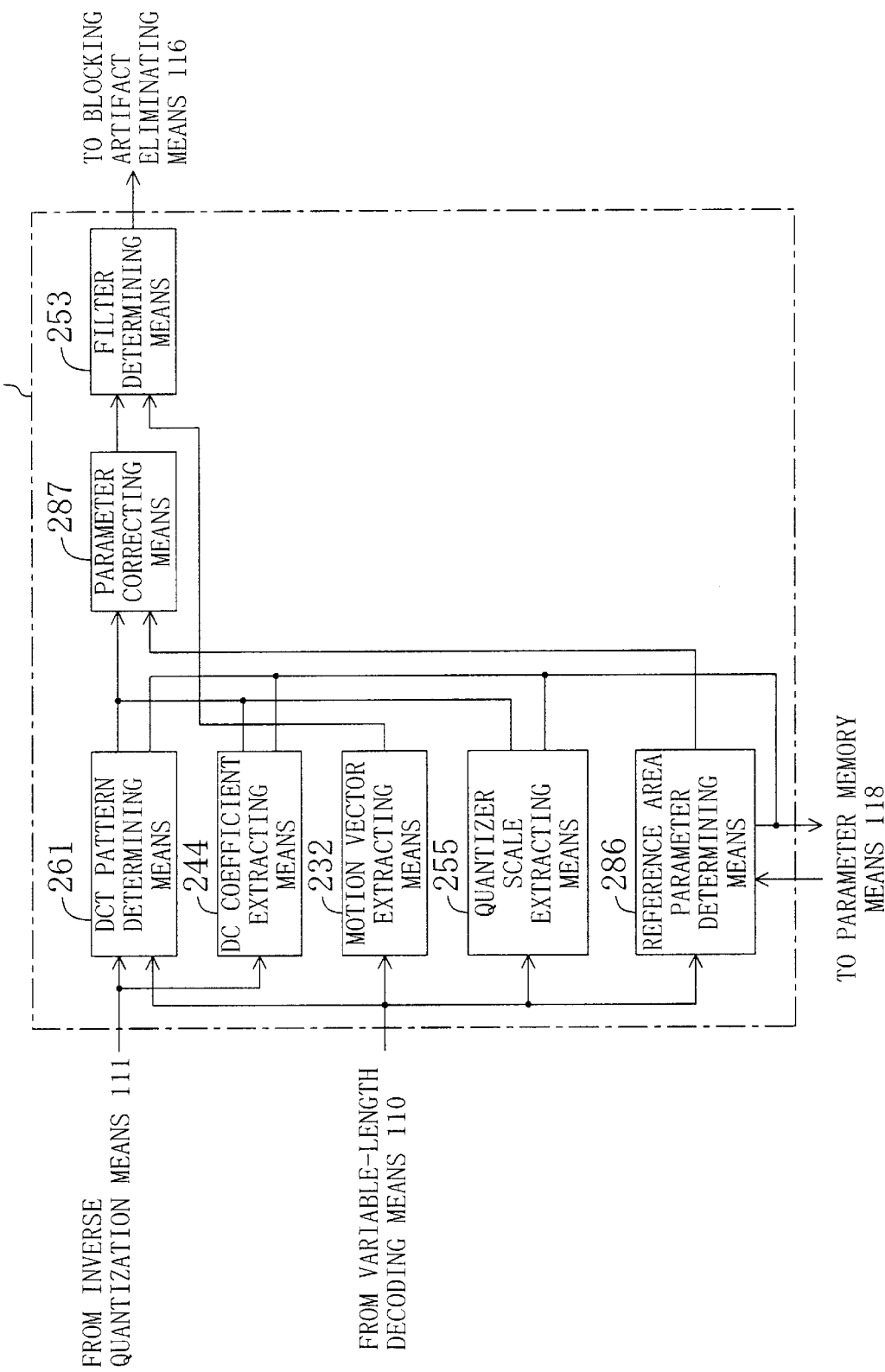
FIG. 22 is a block diagram for showing still another exemplified structure of the blocking artifact detecting means of FIG. 20.

FIG. 22 is a block diagram for showing still another exemplified structure of the blocking artifact detecting means of FIG. 20. The blocking artifact detecting means 280 of FIG. 22 includes DCT pattern determining means 261, motion vector extracting means 232, filter determining means 253, DC coefficient extracting means 244, quantizer scale extracting means 255, reference area parameter determining means 286, and parameter correcting means 287. The DCT pattern determining means 261 and the DC coefficient extracting means 244 receive DCT coefficients from the inverse quantization means 111, and the motion vector extracting means 232 and the reference area parameter determining means 286 receive a motion vector from the variable-length decoding means 110. Also, from the variable-length decoding means 110, the quantizer scale extracting means 255 receives a quantizer scale and the DCT pattern determining means 261 receives the coding information.

The DCT pattern determining means 261 and the motion vector extracting means 232 are the same as those described with reference to FIG. 20, the DC coefficient extracting means 244 is the same as that described with reference to FIG. 17, and the quantizer scale extracting means 255 is the same as that described with reference to FIG. 19, and hence, the description is omitted.

The outputs of the DCT pattern determining means 261, the DC coefficient extracting means 244 and the quantizer scale extracting means 255 are input to the parameter correcting means 287. Furthermore, in the case where a currently decoded frame is a frame referred to in decoding another frame, the outputs of the DCT pattern determining means 261, the DC coefficient extracting means 244 and the quantizer scale extracting means 255 are input also to the parameter memory means 118. Furthermore, the output of the motion vector extracting means 232 is input to the filter determining means 253.

The reference area parameter determining means 286 obtains the determination result on the DCT pattern, the DC coefficient and the quantizer scale of a reference frame from the parameter memory means 118 by using the motion vector output by the variable-length decoding means 110. The method of obtaining these pieces of information and the method of obtaining the determination result on the DCT pattern and the DC coefficient of the reference area are the same as those described with respect to the reference area parameter determining means 266 of FIG. 20. Furthermore, the quantizer scale of the reference area can be obtained by any of various methods. For example, an average value of the quantizer scales of blocks including pixels of the reference area may be obtained as the quantizer scale of the reference area, a mean weighted by the overlapping areas of the blocks may be obtained, or the minimum or maximum value of the quantizer scales of these blocks may be obtained.

The reference area parameter determining means 286 outputs the determination result on the DCT pattern, the DC coefficient and the quantizer scale of the reference area thus obtained to the parameter correcting means 287 and the parameter memory means 118.

The parameter correcting means 287 receives, as its inputs, the determination result on the DCT pattern output by the DCT pattern determining means 261, the DC coefficient output by the DC coefficient extracting means 244, the quantizer scale output by the quantizer scale extracting means 255, and the determination result on the DCT pattern, the DC coefficient and the quantizer scale of the reference area output by the reference area parameter determining means 286. Then, the parameter correcting means 287 corrects the determination made by the DCT pattern determining means 261 by using the determination made by the reference area parameter determining means 286. This correction is made in the same manner as described with respect to the parameter correcting means 267 of FIG. 20.

Next, the parameter correcting means 287 corrects the DC coefficient output by the DC coefficient extracting means 244 by using the DC coefficient output by the reference area parameter determining means 286. This correction is made in the same manner as described with respect to the parameter correcting means 277 of FIG. 21.

Subsequently, the parameter correcting means 287 corrects the quantizer scale output by the quantizer scale extracting means 255 by using the quantizer scale output by the reference area parameter determining means 286. This correction is made by obtaining an average value of the quantizer scale output by the quantizer scale extracting means 255 and the quantizer scale output by the reference area parameter determining means 286. Alternatively, the minimum or maximum value of these quantizer scales may be obtained. Further alternatively, the quantizer scale output by the quantizer scale extracting means 255 may be output without correction. The determination result on the DCT pattern, the DC coefficient and the quantizer scale corrected by the parameter correcting means 287 are input to the filter determining means 253.

The filter determining means 253 determines the type of filter to be applied to each block boundary by using the result of the determination, the DC coefficient and the quantizer scale output by the parameter correcting means 287 and the size of the motion vector output by the motion vector extracting means 232. The filter is determined in the same manner as described with respect to the filter determining means 253 of FIG. 19. The type of filter determined by the filter determining means 253 is output to the blocking artifact eliminating means 116. Herein, it can be said that the type of filter thus determined corresponds to the magnitude of detected blocking artifact.

As described above, in the image decoding apparatus of this embodiment, it is determined according to the frequency distribution of orthogonal transformation coefficients (such as DCT coefficients) obtained from a bitstream whether or not each block includes a high frequency component. Furthermore, the frequency distribution, the DC coefficient and the quantizer scale of a reference area are obtained by using the frequency distributions, the DC coefficients and the quantizer scales of blocks overlapping the reference area within a reference frame obtained by using a motion vector. By using these values, the frequency distribution, the DC coefficient and the quantizer scale of the target block obtained from the information of the bitstream are corrected. Then, the type of filter to be applied to a block boundary is determined by using the result of determination on the frequency distribution of the orthogonal transformation coefficients, the sizes of the motion vectors, the DC coefficients and the quantizer scales of adjacent blocks sandwiching the block boundary. In this case, no filter will be applied to a block with a high frequency component in orthogonal transformation coefficient distribution. Alternatively, as for a block with no high frequency components in its orthogonal transformation coefficient distribution, a filter for that block should have its cutoff frequency decreased as the motion vector of the block increases its magnitude. Furthermore, in using the DC coefficient, no filter is applied when the absolute value of a difference in the DC coefficient between the adjacent blocks is larger than a predetermined value. In this case, the quantizer scale may be used as the predetermined value. Blocking artifact is eliminated by applying the thus determined type of filter to pixels in the vicinity of the block boundary of the decoded image.

Owing to this operation, in the image decoding apparatus of this embodiment, a block boundary where blocking artifact occurs can be definitely detected by the size of a motion vectors of adjacent blocks sandwiching the block boundary, and no filter is applied to a block including a high frequency component so as to prevent the degradation in the picture quality without erroneous detection of the noise. Furthermore, when the absolute value of a difference in the DC coefficient is checked, the erroneous detection can be more definitely avoided, and when the quantizer scale is used as the threshold value, the check can accord with the picture quality. Moreover, since the result of determination on the DCT pattern, the DC coefficient and the quantizer scale of a reference frame are used in determining the type of filter when motion compensation is carried out, and blocking artifact can be detected more precisely in accordance with the characteristic of the decoded image after the motion compensation. In addition, by selectively using a plurality of filters having different strengths in accordance with the size of the motion vector, blocking artifact can be definitely eliminated with blur of the images minimized.

EMBODIMENT 5

In an image decoding apparatus of Embodiment 5, blocking artifact as coding noise is detected and eliminated in decoding an intra coded frame from a bitstream obtained by encoding an interlaced image.

In the image decoding apparatus of Embodiment 5, blocking artifact detecting means 330 is used instead of the blocking artifact detecting means 130 of the image decoding apparatus of FIG. 1. Variable-length decoding means 110, inverse quantization means 111, inverse DCT means 112, switches 113 and 114, a frame memory 115, parameter memory means 118 and an adder 119 are the same as those used in Embodiment 1, and hence, like reference numerals are used to omit the description. In this case, the blocking artifact detecting means 330 works as a noise detector.

Figure 23:
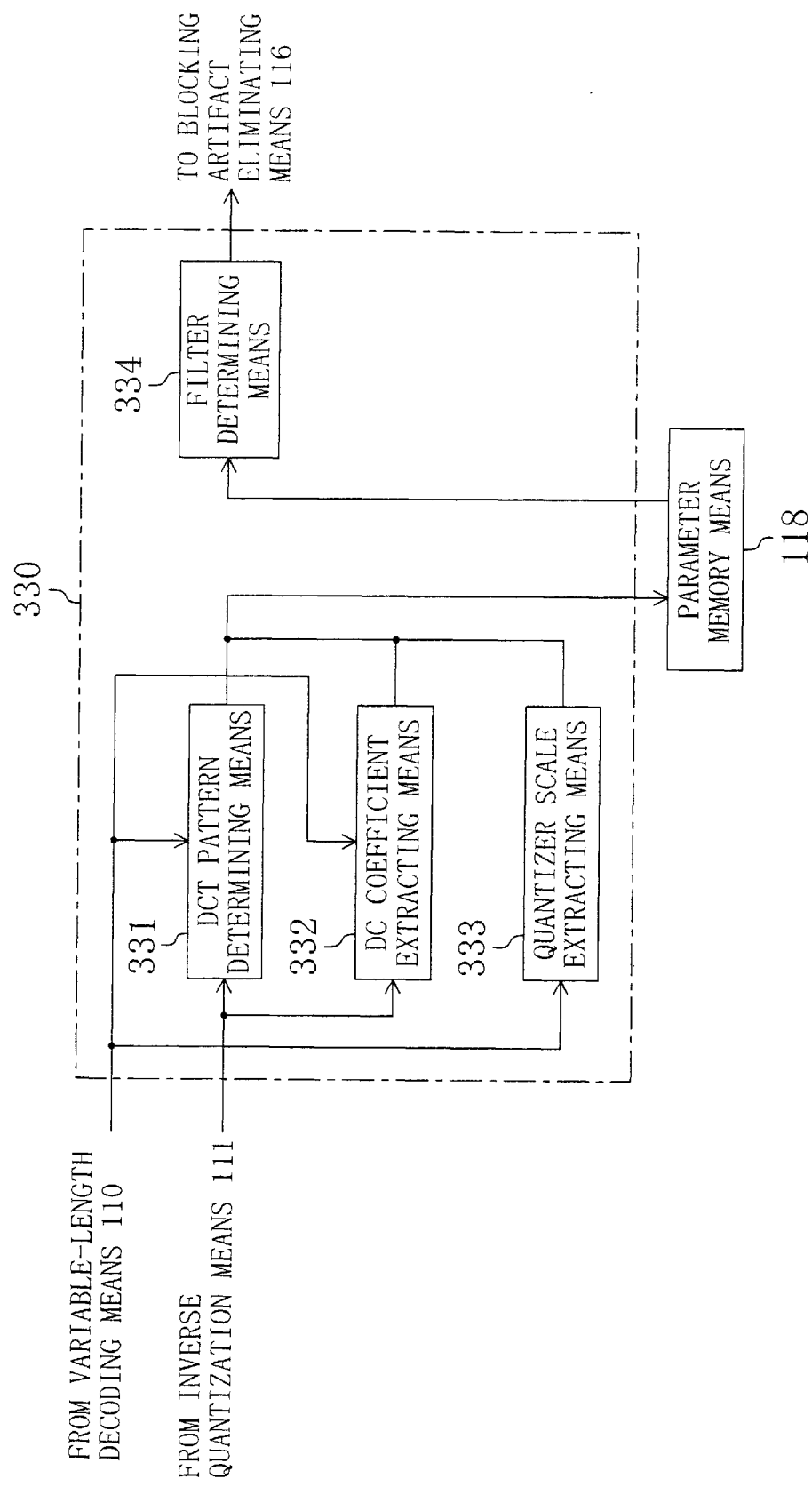
FIG. 23 is a block diagram for showing the structure of blocking artifact detecting means according to Embodiment 5 of the invention.

FIG. 23 is a block diagram for showing the structure of the blocking artifact detecting means of Embodiment 5. The blocking artifact detecting means 330 of FIG. 23 includes DCT pattern determining means 331, DC coefficient extracting means 332, quantizer scale extracting means 333 and filter determining means 334. The blocking artifact detecting means 330 receives DCT coefficients from the inverse quantization means 111, and a quantizer scale, a macroblock coding mode and a DCT mode from the variable-length decoding means 110.

The DCT pattern determining means 331 receives, as its inputs, a DCT coefficient block from the inverse quantization means 111 and the DCT mode from the variable-length decoding means 110. The DCT pattern determining means 331 classifies the DCT coefficient block according to the frequency component distribution thereof. The classification of the DCT coefficient block is carried out in the same manner as described in Embodiment 1, so that each DCT coefficient block can be classified into any of the DCT classes I1, I2 and I3.

The DCT class thus determined is allocated to each field of each block. For simplifying the explanation, description is herein given on a luminance signal block alone.

FIGS. 24(a) through 24(c) are diagrams for illustrating the relationship, in the case where the DCT mode is the field mode, between a DCT coefficient macroblock and each field of a pixel block. FIG. 24(a) shows DCT coefficient blocks, in which it is assumed that DCT coefficient blocks 601 through 604 together form a DCT coefficient macroblock. Since the DCT mode is the field mode, the DCT coefficient blocks 601 and 603 indicate the DCT coefficients of a first field and the DCT coefficient blocks 602 and 604 indicate the DCT coefficients of a second field in the DCT coefficient macroblock of FIG. 24(a). Accordingly, the inverse DCT of the DCT coefficient macroblock of FIG. 24(a) results in a pixel macroblock shown in FIG. 24(b).

FIG. 24(b) shows the pixel macroblock as a frame structure, and the pixel macroblock includes pixel blocks 605 through 608. For example, in the pixel block 605, the first field consists of pixels obtained by subjecting the DCT block 601 to the inverse DCT and the second field consists of pixels obtained by subjecting the DCT block 602 to the inverse DCT.

FIG. 24(c) shows the respective fields of the pixel blocks 605 through 608. In the following description, among pixels included in one pixel block, a group of pixels (8×4 pixels) belonging to one field is regarded as one unit and designated as a field block. For example, field blocks 609 and 610 are groups of pixels of the first and second fields of the pixel block 605, respectively. Similarly, field blocks 611 and 612 are groups of pixels of the first and second fields of the pixel block 606, respectively. Accordingly, the DCT class determined with respect to the DCT block 601 is allocated to the field blocks 609 and 611. Similarly, the DCT class determined with respect to the DCT block 602 is allocated to the field blocks 610 and 612, the DCT class determined with respect to the DCT block 603 is allocated to field blocks 613 and 615, and the DCT class determined with respect to the DCT block 604 is allocated to field blocks 614 and 616.

FIGS. 25(a) through 25(c) are diagrams for showing the relationship, in the case where the DCT mode is the frame mode, between a DCT coefficient macroblock and each field of a pixel block. FIG. 25(a) shows DCT coefficient blocks, in which it is assumed that DCT coefficient blocks 651 through 654 together form a DCT coefficient macroblock. Since the DCT mode is the frame mode, the inverse DCT of the DCT coefficient macroblock of FIG. 25(a) results in a pixel macroblock of FIG. 25(b).

FIG. 25(b) shows the pixel macroblock as a frame structure, and the pixel macroblock includes pixel blocks 655 through 658. For example, the pixel block 655 consists of pixels obtained by subjecting the DCT block 651 to the inverse DCT, and the pixel block 656 consists of pixels obtained by subjecting the DCT block 652 to the inverse DCT.

FIG. 25(c) shows the respective fields of the pixel blocks 655 through 658. For example, field blocks 659 and 660 are groups of pixels of the first and second fields of the pixel block 655, respectively. Similarly, field blocks 661 and 662 consist of pixels of the first and second fields of the pixel block 656, respectively. Accordingly, the DCT class determined with respect to the DCT block 651 is allocated to the field blocks 659 and 660. Similarly, the DCT class determined with respect to the DCT block 652 is allocated to the field blocks 661 and 662, the DCT class determined with respect to the DCT block 653 is allocated to field blocks 663 and 664, and the DCT class determined with respect to the DCT block 654 is allocated to field blocks 665 and 666.

The DC coefficient extracting means 332 receives the DCT coefficient block and the DCT mode as its inputs, extracts a DC coefficient alone from the DCT coefficients, and outputs the extracted DC coefficient to the parameter memory means 118. The DC coefficient is allocated to each field block in the same manner as in the DCT pattern determining means 331.

The quantizer scale extracting means 333 extracts a quantizer scale from the coding information output by the variable-length decoding means 110, and outputs the extracted quantizer scale to the parameter memory means 118. The quantizer scale is allocated to each field block in the same manner as in the DCT pattern determining means 331.

Blocking artifact parameters, namely, the DCT class output by the DCT pattern determining means 331, the DC coefficient output by the DC coefficient extracting means 332 and the quantizer scale output by the quantizer scale extracting means 333, of each field block are input to the parameter memory means 118. The parameter memory means 118 stores the input blocking artifact parameters of each field block.

When the blocking artifact parameters of field blocks included in one frame are completed to be stored, the filter determining means 334 determines the type of filter to be applied to each boundary of the field blocks with reference to the blocking artifact parameters. The operation of the filter determining means 334 will now be described.

Figure 26A:
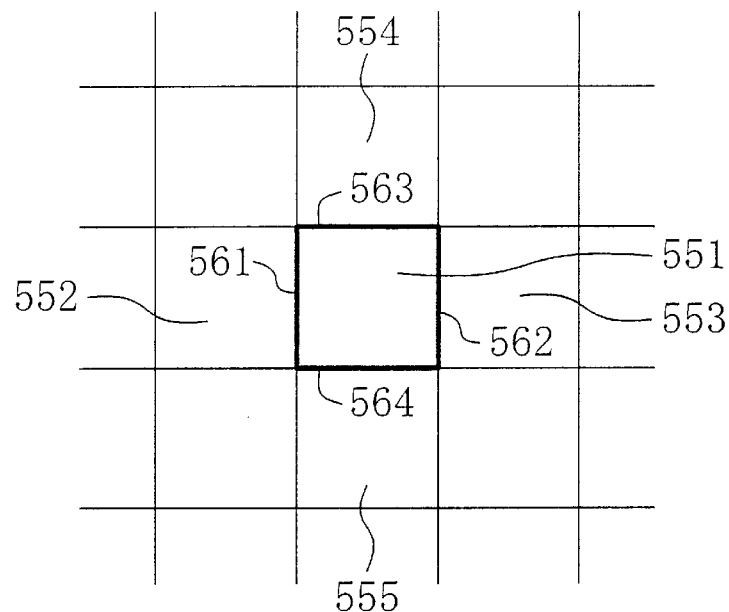
FIGS. 26(a), 26(b) and 26(c) are diagrams for illustrating arrangement of field blocks.
Figure 26B:
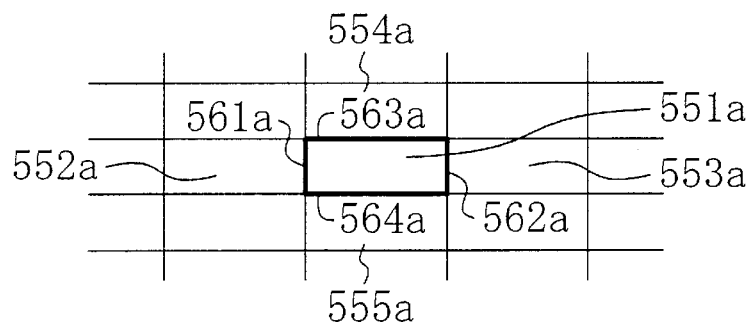
Figure 26C:
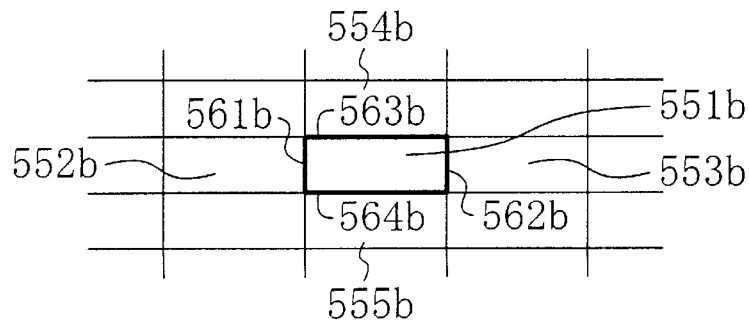

FIGS. 26(a) through 26(c) are diagrams for showing arrangement of field blocks. It is herein assumed that blocks are arranged as is shown in FIG. 26(a). FIG. 26(a) shows the arrangement as a frame structure, and one square corresponds to one block. Also, FIGS. 26(b) and 26(c) show arrangements of field blocks of the first and second fields of FIG. 26(a), respectively. For example, a block 551 is divided into a field block 551a consisting of pixels of the first field and a field block 551b consisting of pixels of the second field.

The type of filter to be applied to a boundary is determined with respect to each field block. For example, with respect to the field block 551a, filters for boundaries 561a, 562a, 563a and 564a are determined, and with respect to the field block 551b, filters for boundaries 561b, 562b, 563b and 564b are determined. The types of filters are determined in the same manner as described in Embodiment 1. For example, in determining the type of filter for the boundary 561a, the blocking artifact parameters of the field blocks 551a and 552a are used. The types of filters determined by the filter determining means 334 are output to the blocking artifact eliminating means 116. Herein, it can be said that the type of filter thus determined corresponds to the magnitude of detected blocking artifact.

The blocking artifact eliminating means 116 receives the types of filters to be applied to the respective block boundaries from the blocking artifact detecting means 330, and applies the determined types of filters to the block boundaries of the image output from the frame memory 115. The horizontal filtering process is the same as that described in Embodiment 1 and hence is omitted. The vertical filtering process carried out by the blocking artifact eliminating means 116 will now be described.

FIGS. 27(a) through 27(e) are diagrams for illustrating the vertical filtering process on a block boundary. These drawings show the pixels of the blocks 551 and 555 of FIG. 26(a), and one square corresponds to one pixel. Herein, a filter to be applied to a boundary 564 between the blocks 551 and 555 will be described. In the case where a filter to be applied to the boundary 564 is determined as the filter F1 by the blocking artifact detecting means 330, the blocking artifact eliminating means 116 applies no filter to the boundary 564. In the case where a filter to be applied to the boundary 564 is determined as the filter F2 by the blocking artifact detecting means 330, the blocking artifact eliminating means 116 applies a filter to pixels in the vicinity of the boundary 564.

For example, with respect to pixels on the fourth and fifth vertical lines from the left in FIG. 27(a), pixels c, d, c' and d' are filtered. In this case, with respect to the pixels of the first field (namely, the pixels c and d), the filter is applied by using the pixels of the first field alone, and with respect to the pixels of the second field (namely, the pixels c' and d'), the filter is applied by using the pixels of the second field alone. Furthermore, a low-pass filter or the like can be used as the filter.

By thus applying the filter, the pixel values shown in FIG. 27(b) are changed to those shown in FIG. 27(c), and blocking artifact is thus eliminated. In FIGS. 27(b) and 27(c), the abscissa indicates the pixel value and the ordinate indicates the position of pixel. This position of pixel corresponds to the position of pixel shown in FIG. 27(a).

In the case where a filter to be applied to the boundary 564 is determined as the filter F3 by the blocking artifact detecting means 330, the blocking artifact eliminating means 116 applies the filter to pixels in the vicinity of the boundary 564 in a wider range than in the case where the filter F2 is applied. With respect to the pixels on the fourth and fifth vertical lines from the left, for example, pixels b, c, d and e are filtered in the first field, and pixels b', c', d' and e' are filtered in the second field. As the filter, a low-pass filter or the like can be used as in the case of the filter F2. Also, as is shown in the examples of the frequency characteristic of the filter of FIG. 9, the cut-off frequency is lower in the filter F3 (as the characteristic L3) than in the filter F2 (as the characteristic L2), and the capability of eliminating blocking artifact is accordingly larger. By thus filtering, the pixel values shown in FIG. 27(d) are changed to those shown in FIG. 27(e), and blocking artifact is thus eliminated.

In the case where the filter is a one-dimensional filter, a method of determining the number of taps of the filter will be exemplified as follows: In using a one-dimensional filter, pixels belonging to one field block and pixels belonging to another adjacent field block are together used but pixels belonging to a field block other than the two adjacent blocks are not used for the filtering process. This will be described with reference to FIG. 27(a).

For example, when the tap length of the filter is assumed as 5, in order to filter the pixel c, the value of the pixel c is obtained by using the pixels a, b, c, d and e. These pixels belong to any of the blocks 551 and 555 and do not belong to a block other than these blocks. When the pixel a is to be filtered, however, since pixels of the block 555 are not used, a filter with a tap length of 5 cannot be applied to the pixel a. Specifically, in using a filter with a tap length of 5, among the pixels a through f, the filter can be applied to the pixels b, c, d and e. Similarly, when a filter with a tap length of 7 is used, among the pixels a through f, the filter can be applied to the pixels c and d.

The frame thus filtered by the blocking artifact eliminating means 116 is output as an output image.

As described above, in the image decoding apparatus of this embodiment, each block is classified into any of a plurality of DCT classes by using DCT coefficients obtained from a bitstream. The classification into the DCT classes is carried out on each field block obtained by dividing each block into fields. The type of filter to be applied to each field block boundary is determined by using the DCT classes, the quantizer scales and the DC coefficients of adjacent field blocks sandwiching the boundary. In determining a filter, as DCT coefficients greater than a predetermined value are distributed in a lower region, a stronger filter is applied.

In this manner, in the image decoding apparatus of this embodiment, a block boundary where blocking artifact occurs can be definitely detected according to the DCT coefficient distribution, and erroneous detection of blocking artifact can be avoided by checking the absolute value of a difference in the DC coefficient. By selectively using a plurality of filters having different strengths in accordance with the magnitude of blocking artifact, blocking artifact can be definitely eliminated with blur of the image minimized. Furthermore, since blocking artifact is detected with respect to a filed block, blocking artifact can be more precisely detected in an interlaced image. Moreover, since blocking artifact is detected with respect to each field block, blocking artifact can be eliminated without harmfully affecting the image. In addition, in applying a filter for elimination of blocking artifact, pixels belonging to one field block and pixels belonging to another adjacent field block are together used but pixels belonging to a block other than the two adjacent blocks are not used for filtering, so that the capability of eliminating blocking artifact can be improved.

In this embodiment, two pixels in the vicinity of a block boundary are filtered when the type of filter is determined as F2 and four pixels in the vicinity of the block boundary are filtered when the type of filter is determined as F3. However, the range of pixels to be filtered may be different.

Also, although the range of pixels for applying the filter F2 is different from the range of pixels for applying the filter F3 in this embodiment, these ranges may be the same.

Furthermore, although the filter determining means 334 determines a filter when the blocking artifact parameters of one frame are completed to be stored in the parameter memory means 118 in this embodiment, the filter may be determined at another timing.

EMBODIMENT 6

In an image decoding apparatus of Embodiment 6, blocking artifact as coding noise is detected and eliminated in decoding a non-intra coded frame from a bitstream obtained by encoding an interlaced image.

In the image decoding apparatus of this embodiment, blocking artifact detecting means 340 is used instead of the blocking artifact detecting means 130 of the image decoding apparatus of FIG. 1. Variable-length decoding means 110, inverse quantization means 111, inverse DCT means 112, switches 113 and 114, a frame memory 115, blocking artifact eliminating means 116, parameter memory means 118 and an adder 119 are the same as those described in Embodiment 1, and hence, like reference numerals are used to omit the description. In this case, the blocking artifact detecting means 340 works as a noise detector.

Figure 28:
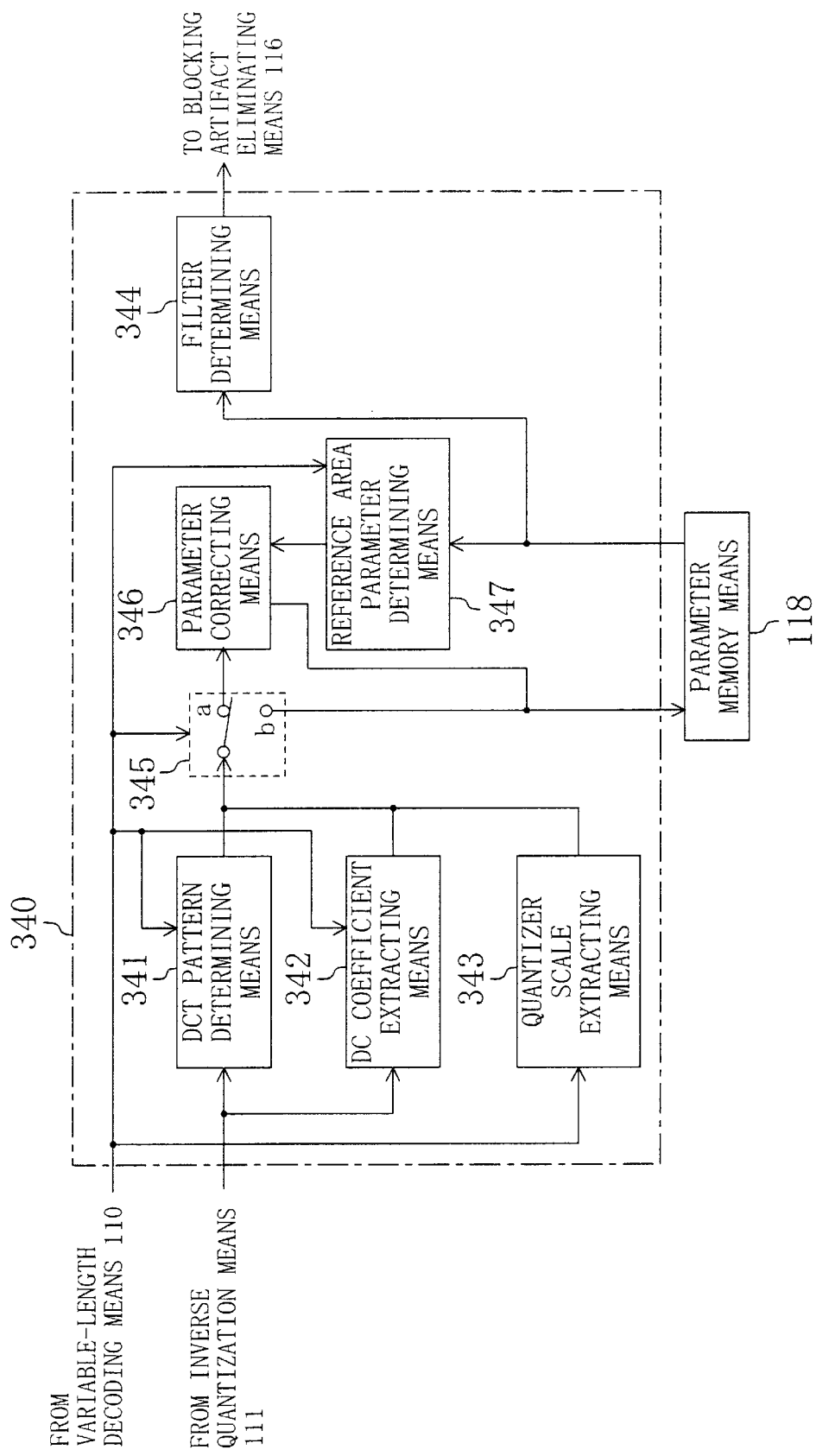
FIG. 28 is a block diagram for showing the structure of blocking artifact detecting means according to Embodiment 6 of the invention.

FIG. 28 is a block diagram for showing the structure of the blocking artifact detecting means of Embodiment 6. The blocking artifact detecting means 340 of FIG. 28 includes DCT pattern determining means 341, DC coefficient extracting means 342, quantizer scale extracting means 343, filter determining means 344, a switch 345, parameter correcting means 346 and reference area parameter determining means 347. The blocking artifact detecting means 340 receives DCT coefficients from the inverse quantization means 111, and a quantizer scale, a macroblock coding mode, a motion vector and a DCT mode from the variable-length decoding means 110. It is herein assumed that the parameter memory means 118 stores blocking artifact parameters of a previously decoded frame obtained as described in Embodiment 5.

The DCT pattern determining means 341 receives a DCT coefficient block, the DCT mode and the macroblock coding mode, classifies the DCT coefficient block into any of the DCT classes according to the frequency component distribution thereof, and outputs the result of the classification to the switch 345.

The classification of the block is carried out, as described in Embodiments 1 and 2, by using the DCT patterns with the frequency distributions as shown in FIGS. 4(a) through 4(d). In the case where the DCT coefficient block is an intra coded block, it is classified as described in Embodiment 1 into any of the DCT classes I1, I2 and I3. In the case where the DCT coefficient block is a non-intra coded block, it is classified as described in Embodiment 2 into any of the DCT classes N1, N2 and N3. The DCT class thus determined is allocated to each field block in the same manner as described in Embodiment 5.

The DC coefficient extracting means 342 receives the DCT coefficient block and the DCT mode. The DC coefficient extracting means 342 extracts a DC coefficient alone from the DCT coefficients, and outputs the extracted DC coefficient to the switch 345. The DC coefficient extracting means 342 allocates the extracted DC coefficient to each field block in the same manner as in the DCT pattern determining means 341.

The quantizer scale extracting means 343 extracts a quantizer scale from the coding information output by the variable-length decoding means 110, and outputs the extracted quantizer scale to the switch 345. The quantizer scale extracting means 343 allocates the extracted quantizer scale to each field block in the same manner as in the DCT pattern determining means 341.

The switch 345 switches connection in accordance with the macroblock coding mode output by the variable-length decoding means 110. When the macroblock coding mode indicates the intra coding, the switch 345 is connected to a terminal b. In this case, the operation is the same as that described in Embodiment 5. When the macroblock coding mode indicates the non-intra coding, the switch 345 is connected to a terminal a. Accordingly, the blocking artifact parameters (namely, the DCT class, the DC coefficient and the quantizer scale) are input to the parameter correcting means 346.

The reference area parameter determining means 347 refers to the blocking artifact parameters of a reference block by using the motion vector output by the variable-length decoding means 110, so as to obtain the blocking artifact parameters of a reference area. The operation of the reference area parameter determining means 347 will now be described in detail.

FIGS. 29(a) through 29(f) are diagrams for showing various methods of obtaining the blocking artifact parameters of a reference area. The reference area parameter determining means 347 obtains the blocking artifact parameters of a reference frame from the parameter memory means 118 by using the motion vector output by the variable-length decoding means 110. The blocking artifact parameters of the reference frame are obtained with respect to each field block.

Figure 29A:
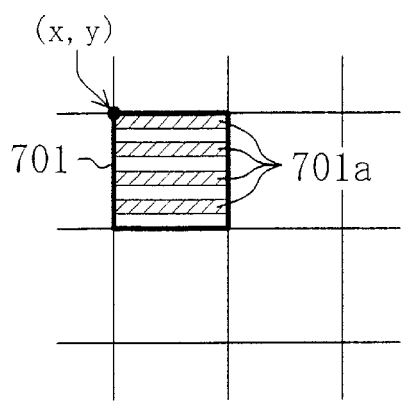
FIGS. 29(a), 29(b), 29(c), 29(d), 29(e) and 29(f) are diagrams for illustrating a method of obtaining blocking artifact parameters of a reference area.

FIG. 29(a) shows a frame currently being decoded. Herein, a block 701 will be exemplified. A field block 701a consists of pixels of the first field of the block 701. FIGS. 29(b) through 29(f) are frames referred to in decoding the frame of FIG. 29(a), and blocks 702 through 705 are included in the reference frame. Now, a method of obtaining the blocking artifact parameters of a reference frame for the field block 701a will be described.

Figure 29B:
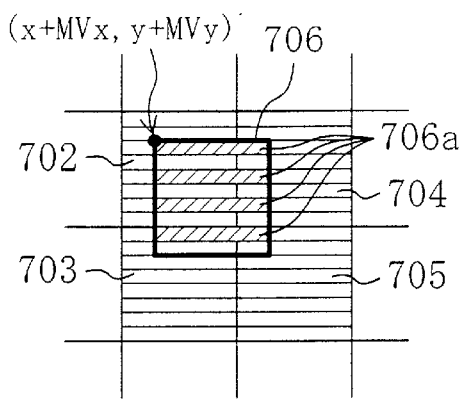

FIG. 29(b) is a diagram for showing a first example of the method employed in the case where the motion vector is in the frame mode. When the address of the block 701 within the frame is indicated as (x, y) and the motion vector is indicated as (MVx, MVy), the block 701 refers to a reference area 706. When the first field of the reference area 706 is indicated as 706 a, the area referred to by the field block 701 a is the area 706 a. Also, the address of the reference area 706 is (x+MVx, y+MVy). The reference area parameter determining means 347 searches for a block overlapping the area 706 a using the address of the reference area 706. In FIG. 29(b), the area 706a overlaps the first fields of the blocks 702 through 705. Therefore, among the blocking artifact parameters of field blocks consisting of pixels of the first fields of the blocks 702 through 705, DCT classes are obtained from the parameter memory means 118.

Figure 29C:
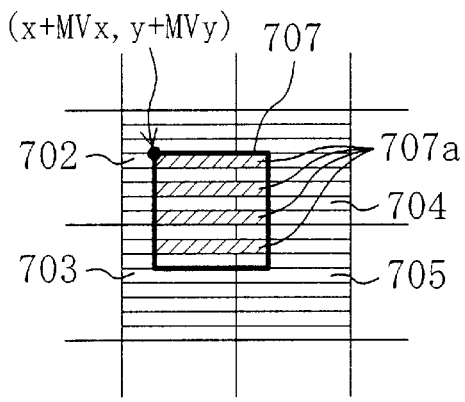

FIG. 29(c) is a diagram for showing a second example of the method employed in the case where the motion vector is in the frame mode. An area referred to by the block 701 is indicated as a reference area 707. In this case, when the first field of the reference area 707 is indicated as 707 a, the area referred to by the field block 701a is the area 707a. The reference area parameter determining means 347 searches for a block overlapping the area 707a using the address of the reference area 707. In FIG. 29(c), the area 707a overlaps the second fields of the blocks 702 through 705. Therefore, among the blocking artifact parameters of field blocks consisting of pixels of the second fields of the blocks 702 through 705, DCT classes are obtained from the parameter memory means 118.

Figure 29D:
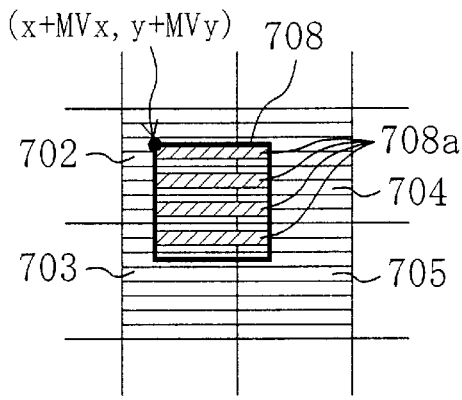
Figure 29E:
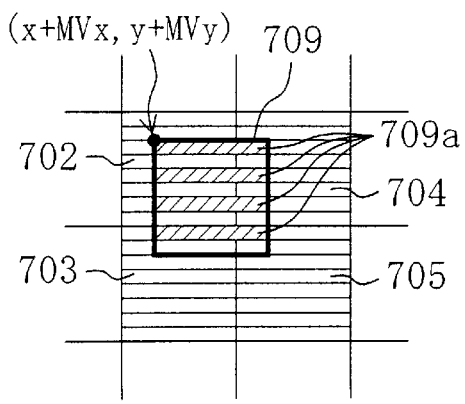
Figure 29F:
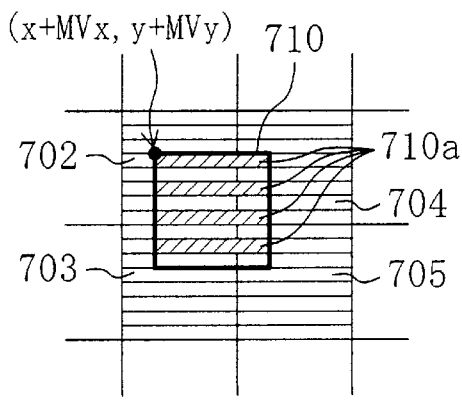

FIG. 29(d) is a diagram for showing a third example of the method employed in the case where the motion vector is in the frame mode. An area referred to by the block 701 is indicated as a reference area 708. In this case, when the first field of the reference area 708 is indicated as 708a, an area referred to by the field block 701a is the area 708a. The reference area parameter determining means 347 searches for a block overlapping the area 708a using the address of the reference area 708. In FIG. 29(d), the vertical motion vector has a size measured by using ½ of a pixel as a unit, and an average value of the pixel values of the first and second fields of the reference area 708 corresponds to a pixel value to be referred to. Therefore, among the blocking artifact parameters of field blocks consisting of pixels of the first fields of the blocks 702 through 705 and field blocks consisting of pixels of the second fields of the blocks 702 through 705, DCT classes are obtained by the reference area parameter determining means 347 from the parameter memory means 118.

FIG. 29(*e*) is a diagram for showing a first example of the method employed in the case where the motion vector is in the field mode. Herein, the case where the first field is referred to will be described. An area referred to by the block 701 is indicated as a reference area 709. In this case, when the first field of the reference area 709 is indicated as 709*a*, an area referred to by the field block 701*a* is the area 709*a*. The reference area parameter determining means 347 searches for a block overlapping the area 709*a* using the address of the reference area 709. Since the field to be referred to is herein the first field, among the blocking artifact parameters of field blocks consisting of pixels of the first fields of the blocks 702 through 705, DCT classes are obtained by the reference area parameter determining means 347 from the parameter memory means 118.

FIG. 29(*f*) is a diagram for showing a second example of the method employed in the case where the motion vector is in the field mode. Herein, the case where the second field is referred to will be described. An area referred to by the block 701 is indicated as a reference area 710. In this case, when the first field of the reference area 710 is indicated as 710*a*, an area referred to by the field block 701*a* is the area 710*a*. The reference area parameter determining means 347 searches for a block overlapping the area 710*a* using the address of the reference area 710. Since the field to be referred to is herein the second field, among the blocking artifact parameters of field blocks consisting of pixels of the second fields of the blocks 702 through 705, DCT classes are obtained by the reference area parameter determining means 347 from the parameter memory means 118.

A method of obtaining the DCT class of the reference area by using the DCT classes thus obtained from the parameter memory means 118 is the same as that described in Embodiment 2 and hence the description is omitted.

The reference area parameter determining means 347 outputs the DCT class of the reference area thus obtained with respect to each field block to the parameter correcting means 346.

The parameter correcting means 346 receives through the switch 345, as its inputs, the blocking artifact parameters output by the DCT pattern determining means 341, the DC coefficient extracting means 342 and the quantizer scale extracting means 343 and the DCT class of the reference area output by the reference area parameter determining means 347. Then, the parameter correcting means 346 corrects the DCT class of each field block determined by the DCT pattern determining means 341 by using the DCT class determined by the reference area parameter determining means 347. This correction is carried out in the same manner as described in Embodiment 2 and hence the description is omitted, whereas the DCT class is corrected with respect to each field block.

The parameter correcting means 346 outputs, as the blocking artifact parameters, the DCT class thus corrected, the DC coefficient output by the DC coefficient extracting means 342 and the quantizer scale output by the quantizer scale extracting means 343 to the parameter memory means 118. The parameter memory means 118 stores the input blocking artifact parameters with respect to each field block.

When the blocking artifact parameters of blocks included in one frame are completed to be stored, the filter determining means 344 determines the type of filter to be applied to each field block boundary with reference to the blocking artifact parameters. This operation is the same as that of the filter determining means 334 of Embodiment 5. Herein, it can be said that the type of filter thus determined corresponds to the magnitude of detected blocking artifact.

The blocking artifact eliminating means 116 receives the type of filter to be applied to each field block boundary from the blocking artifact detecting means 340, and applies the determined type of filter to each field block boundary of the image output by the frame memory 115. The operation of the blocking artifact eliminating means 116 is the same as that described in Embodiment 5 and hence the description is omitted. Also in this embodiment, in using a filter by the blocking artifact eliminating means 116, the method of determining the tap length of the filter described in Embodiment 5 may be employed.

As described above, in the image decoding apparatus of this embodiment, each block is classified into any of a plurality of DCT classes by using the DCT coefficients obtained from a bitstream. The classification into the DCT classes is carried out with respect to each field block obtained by dividing each block into fields. Furthermore, in the case where the block is a non-intra coded block, the DCT class, the DC coefficient and the quantizer scale of a reference area are obtained by using the DCT classes, the DC coefficients and the quantizer scales of blocks overlapping the reference area within a reference frame obtained by using a motion vector, so as to correct the DCT class, the DC coefficient and the quantizer scale of the target block obtained from the bitstream. Then, the type of filter to be applied to a block boundary is determined by using the DCT classes, the quantizer scales and the DC coefficients of adjacent blocks sandwiching the block boundary. In determining the type of filter, as DCT coefficients greater than a predetermined value are distributed in a lower region alone, a stronger filter is applied.

Owing to this operation, a block boundary where blocking artifact occurs can be definitely detected according to the DCT coefficient distribution in the image decoding apparatus of this embodiment. At this point, when the block is a non-intra coded block, DCT patterns different from those used for an intra coded block are used so as to classify the block suitably to the characteristic of the non-intra coding. Furthermore, when the absolute value of a difference in the DC coefficient is checked, erroneous detection of blocking artifact can be avoided. Moreover, when the block is a non-intra coded block, the blocking artifact parameters are determined by using the blocking artifact parameters of a reference frame, and hence, blocking artifact can be detected more precisely. By selectively using a plurality of filters having different strengths in accordance with the magnitude of blocking artifact, blocking artifact can be definitely eliminated with blur of the image minimized. In addition, since blocking artifact is detected with respect to each field block, blocking artifact can be more accurately detected in an interlaced image. Moreover, since blocking artifact is eliminated with respect to each field block, blocking artifact can be eliminated without harmfully affecting the image.

Although the filter determining means 344 determines a filter when the blocking artifact parameters of one frame are completed to be stored in the parameter memory means 118 in this embodiment, the filter may be determined at another timing.

EMBODIMENT 7

In an image decoding apparatus of Embodiment 7, ringing artifact is detected and eliminated as coding noise.

FIG. 30 is a block diagram of the image decoding apparatus of Embodiment 7. The image decoding apparatus of FIG. 30 includes variable-length decoding means 110, inverse quantization means 111, inverse DCT means 112, switches 113 and 114, a frame memory 115, ringing artifact eliminating means 126, ringing artifact detecting means 430, parameter memory means 118 and an adder 119. The variable-length decoding means 110, the inverse quantization means 111, the inverse DCT means 112, the switches 113 and 114, the frame memory 115, the parameter memory means 118 and the adder 119 are the same as those described in Embodiment 1, and hence, like reference numerals are used to omit the description. In this case, the ringing artifact detecting means 430 works as a noise detector.

Figure 31:
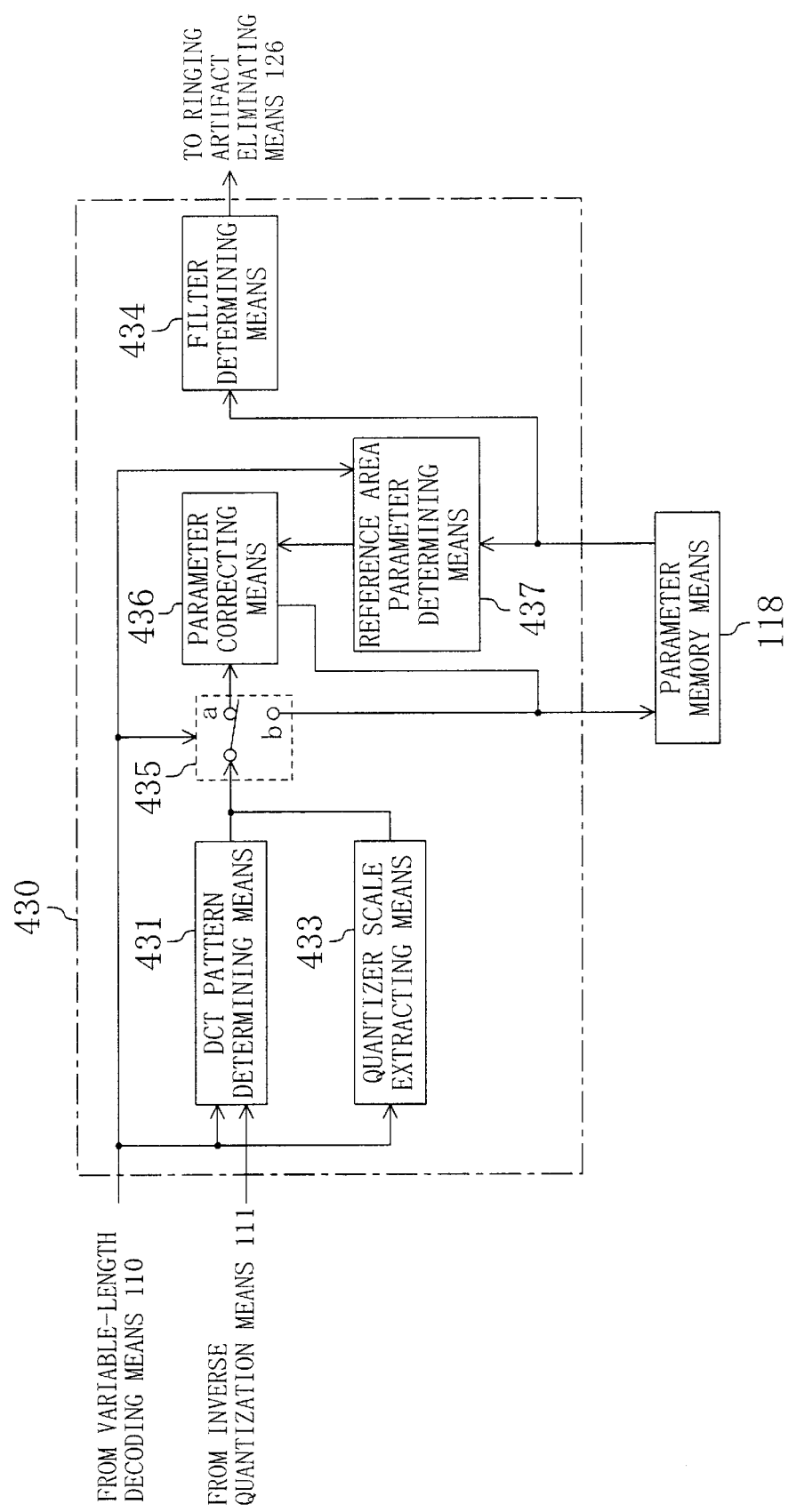
FIG. 31 is a block diagram for showing the structure of ringing artifact detecting means of the image decoding apparatus of FIG. 30.

FIG. 31 is a block diagram for showing the structure of the ringing artifact detecting means 430. The ringing artifact detecting means 430 of FIG. 31 includes DCT pattern determining means 431, quantizer scale extracting means 433, filter determining means 434, a switch 435, parameter correcting means 436 and reference area parameter determining means 437. The ringing artifact detecting means 430 receives DCT coefficients from the inverse quantization means 111, and a quantizer scale, a macroblock coding mode and a motion vector from the variable-length decoding means 110.

First, description will be given on the case where an input block is an intra coded block.

The DCT pattern determining means 431 receives a DCT coefficient block from the inverse quantization means 111. The DCT pattern determining means 431 classifies the block into any of m (wherein m is a natural number) classes M1, M2, . . . and Mm according to the frequency component distribution thereof. In this case, the class M1 is a class where the occurrence probability of ringing artifact is the lowest and the class Mm is a class where the occurrence probability of ringing artifact is the highest.

FIGS. 32(a) through 32(d) are diagrams for illustrating DCT patterns used in the classification of the block. Each of FIGS. 32(a) through 32(d) shows a pattern of an 8×8 DCT coefficient block, and each square corresponds to one coefficient. A coefficient at upper left indicates a DC coefficient, with a horizontal frequency increasing rightward and a vertical frequency increasing downward.

The DCT pattern determining means 431 determines, similarly to the DCT pattern determining means 131 of Embodiment 1, whether or not the input DCT coefficient block satisfies a DCT pattern.

Figure 32A:
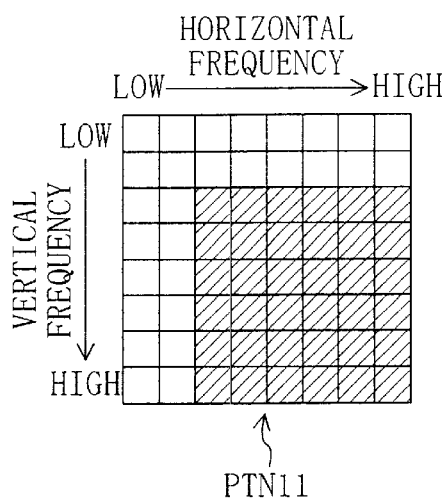
FIGS. 32(a), 32(b), 32(c) and 32(d) are diagrams of DCT patterns used in classification of a block.
Figure 32B:
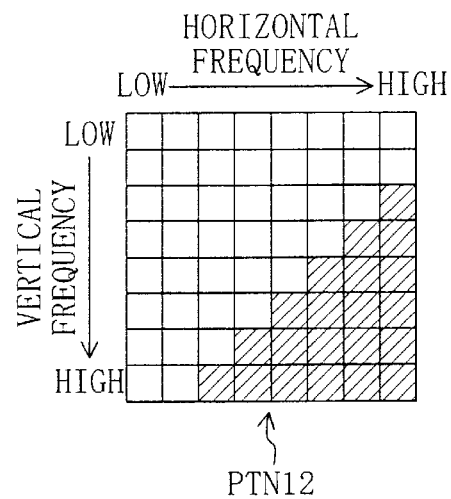

In the case where the macroblock coding mode indicates that the input block is an intra coded block, the DCT pattern determining means 431 uses a DCT pattern PTN11 of FIG. 32(a) and a DCT pattern PTN12 of FIG. 32(b). Since ringing artifact occurs more easily in a block including a higher DCT coefficient, it can be said that ringing artifact is more easily caused in a block satisfying the DCT pattern PTN12 than in a block satisfying the DCT pattern PTN11.

Figure 33:
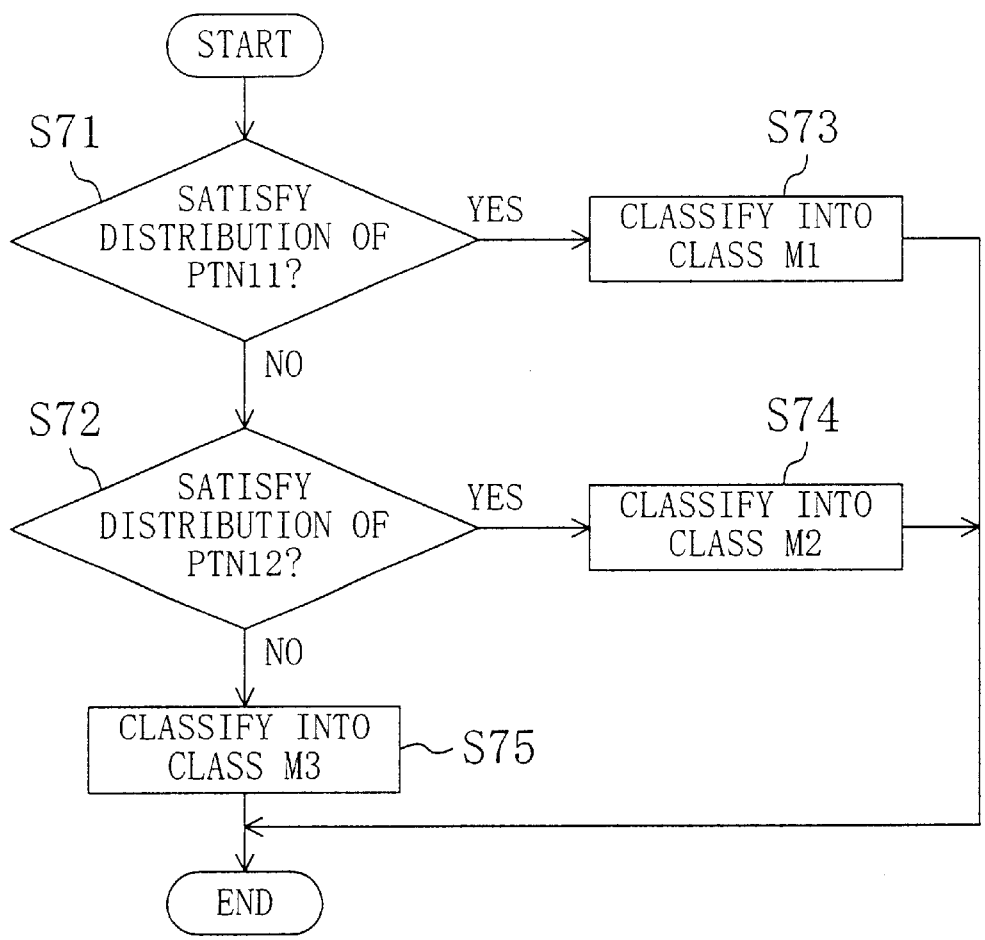
FIG. 33 is a flowchart for showing procedures in the classification of a block.

FIG. 33 is a flowchart for showing procedures in the classification of the block. In the procedures of FIG. 33, each block is classified into any of three classes M1, M2 and M3 by using the DCT patterns PTN11 and PTN12. As is shown in FIG. 33, an input DCT coefficient block is first compared with the DCT pattern PTN11 in step S71. When the input DCT coefficient block does not satisfy the DCT pattern PTN11, namely, when the absolute values of coefficients disposed in hatched area of FIG. 32(a) are all smaller than a predetermined value, the block is classified into the DCT class M1 (step S73). When the input DCT coefficient block satisfies the DCT pattern PTN11, the DCT coefficient block is compared with the DCT pattern PTN12 in step S72. When the input DCT coefficient block does not satisfy the DCT pattern PTN12, the block is classified into the DCT class M2 (step S74). When the input DCT coefficient block satisfies the DCT pattern PTN12, the block is classified into the DCT class M3 (step S75). In this manner, the DCT pattern determining means 431 classifies the block into any of the classes M1, M2 and M3, and outputs the result of the classification.

The quantizer scale extracting means 433 extracts a quantizer scale from the coding information output by the variable-length decoding means 110, and outputs the extracted quantizer scale.

Herein, the DCT class output by the DCT pattern determining means 431 and the quantizer scale output by the quantizer scale extracting means 433 are together designated as ringing artifact parameters. When the macroblock coding mode indicates the intra coding, the switch 435 is connected to a terminal b. Accordingly, the ringing artifact parameters are output to the parameter memory means 118. The parameter memory means 118 stores the input ringing artifact parameters.

By conducting this operation with respect to each macroblock, the ringing artifact parameters of each block are stored in the parameter memory means 118.

Next, the operation conducted when the input block is a non-intra coded block will be described. At this point, it is assumed that the parameter memory means 118 stores the ringing artifact parameters of a previously decoded reference frame obtained as described in this embodiment.

The DCT pattern determining means 431 receives a DCT coefficient block from the inverse quantization means 111. The DCT pattern determining means 431 classifies the DCT coefficient block according to the frequency component distribution thereof.

Figure 32C:
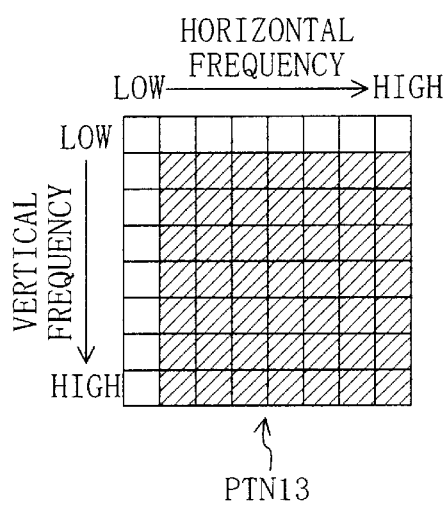
Figure 32D:
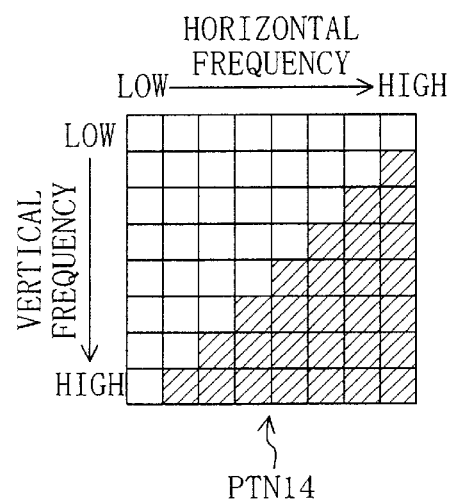

When the macroblock coding mode indicates that the input block is a non-intra coded block, the DCT pattern determining means 431 uses a DCT pattern PTN13 of FIG. 32(c) and a DCT pattern PTN14 of FIG. 32(d).

Figure 34:
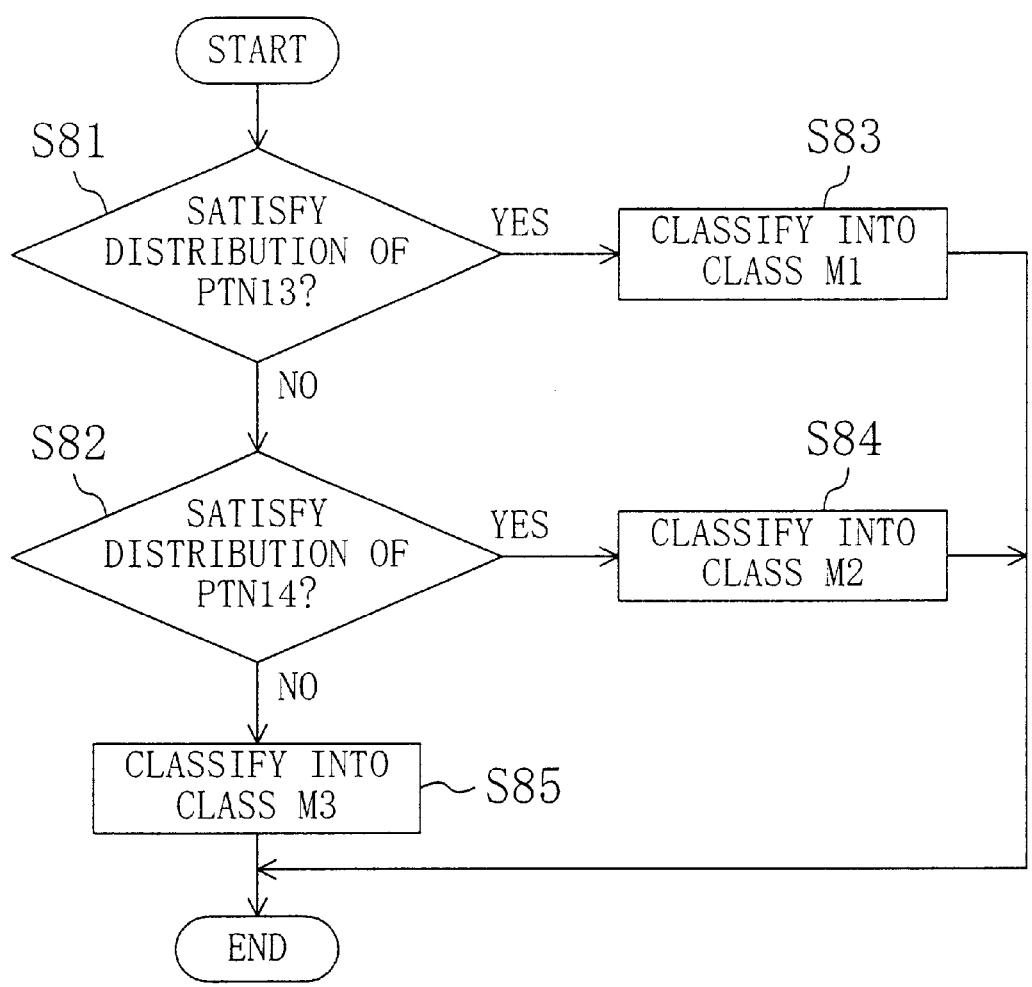
FIG. 34 is a flowchart for showing procedures in classification of a non-intra coded block.

FIG. 34 is a flowchart for showing procedures in the classification of a non-intra coded block. In the procedures of FIG. 34, each block is classified into any of the three classes M1, M2 and M3 by using the DCT patterns PTN13 and PTN14. As is shown in FIG. 34, an input DCT block is first compared with the DCT pattern PTN13 in step S 81. When the input DCT block does not satisfy the DCT pattern PTN13, the block is classified into the DCT class M1 (step S83). When the input DCT block satisfies the DCT pattern PTN13, the input DCT block is compared with the DCT pattern PTN14 in step S82. When the input DCT block does not satisfy the DCT pattern PTN14, the block is classified into the DCT class M2 (step S84). When the input DCT block satisfies the DCT pattern PTN14, the block is classified into the DCT class M3 (step S85). In this manner, the DCT pattern determining means 431 classifies the block into any of the DCT classes M1, M2 and M3, and outputs the result of the classification.

The quantizer scale extracting means 433 extracts a quantizer scale from the coding information output by the variable-length decoding means 110, and outputs the extracted quantizer scale.

The DCT class output by the DCT pattern determining means 431 and the quantizer scale output by the quantizer scale extracting means 433 are input to the switch 435.

When the macroblock coding mode output by the variable-length decoding means 110 indicates the non-intra coding, the switch 435 is connected to a terminal a. Accordingly, the ringing artifact parameters are input to the parameter correcting means 436.

The reference area parameter determining means 437 obtains, by using the motion vector output by the variable-length decoding means 110, a reference area of a target block from which noise is to be eliminated, refers to the ringing artifact parameters of reference blocks overlapping the reference area, and determines the ringing artifact parameters of the reference area.

The reference area parameter determining means 437 obtains the ringing artifact parameters of the reference blocks in the same manner as described with reference to FIG. 12 with respect to the operation of the reference area parameter determining means 147 for obtaining the blocking artifact parameters of the reference blocks 522 through 525, and hence, the description is omitted.

The reference area parameter determining means 437 obtains the ringing artifact parameters of the reference area using the thus obtained ringing artifact parameters of the reference blocks as follows:

First, the DCT class (M1, M2 or M3) among the ringing artifact parameters of the reference area is obtained in the same manner as the DCT class (I1, I2 or I3) of the reference area 526 described in Embodiment 2, and hence, the description is omitted.

Figure 12A:
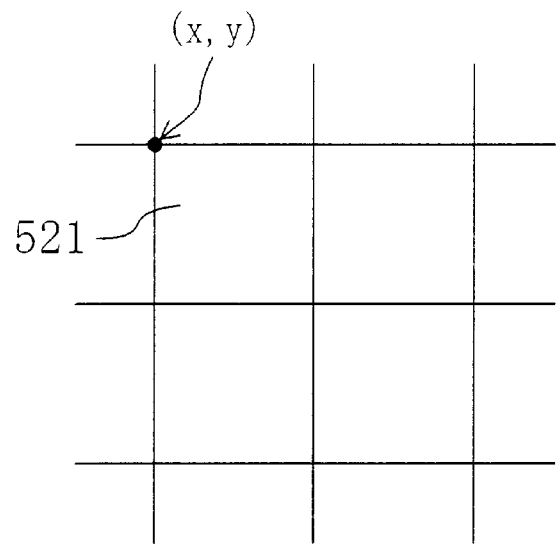
FIGS. 12(a) and 12(b) are diagrams for illustrating a target block and its reference area.
Figure 12B:
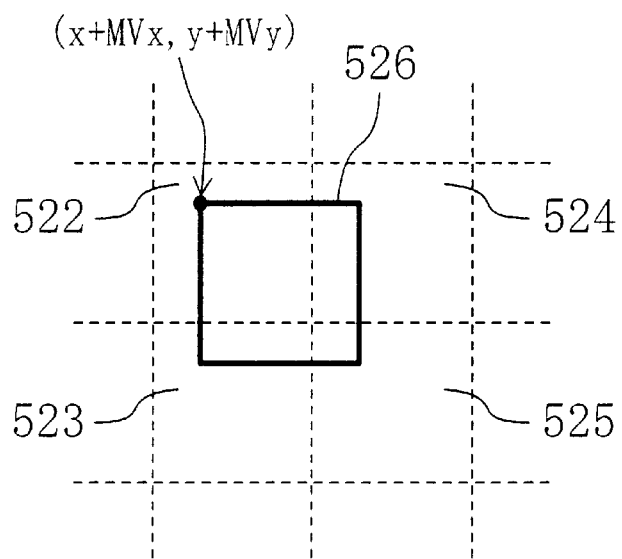

Next, a method of obtaining the quantizer scale among the ringing artifact parameters of the reference area is described with reference to FIGS. 12(a) and 12(b).

As a method of obtaining the quantizer scale of a reference area 526, a mean value of the quantizer scales of reference blocks 522 through 525 weighted by the numbers of pixels included in overlapping areas between the reference area 526 and these reference blocks can be obtained as the quantizer scale of the reference area 526.

Alternatively, the minimum or maximum value of the quantizer scales of the reference blocks 522 through 525 may be obtained as the quantizer scale of the reference area 526.

Further alternatively, the minimum value, the maximum value or the average value of the quantizer scales of reference blocks whose DCT class is a predetermined class may be obtained as the quantizer scale of the reference area 526. For example, using the quantizer scales of the reference blocks whose DCT classes are M2 or M3, the quantizer scale of the reference area 526 may be obtained.

The reference area parameter determining means 437 outputs the thus obtained ringing artifact parameters of the reference area to the parameter correcting means 436.

The parameter correcting means 436 receives through the switch 435, as its inputs, the ringing artifact parameters output by the DCT pattern determining means 431 and the quantizer scale extracting means 433 and the ringing artifact parameters of the reference area output by the reference area parameter determining means 437. First, the DCT class determined by the DCT pattern determining means 431 is corrected by the DCT class determined by the reference area parameter determining means 437. An example of this correction is shown in Table 4 below:

TABLE 4

| | | Output of reference area parameter determining means 437 | | |
|---|---|---|---|---|
| | | M1 | M2 | M3 |
| Output of DCT pattern determining means 431 | M1 | M1 | M2 | M3 |
| | M2 | M2 | M2 | M3 |
| | M3 | M3 | M3 | M3 |

In the correction shown in Table 4, a DCT class where the occurrence probability of ringing artifact is higher is chosen between the DCT class determined by the DCT pattern determining means 431 and the DCT class determined by the reference area parameter determining means 437.

Another example of the correction is shown in Table 5 below.

TABLE 5

| | | Output of reference area parameter determining means 437 | | |
|---|---|---|---|---|
| | | M1 | M2 | M3 |
| Output of DCT pattern determining means 431 | M1 | M1 | M2 | M2 |
| | M2 | M2 | M2 | M3 |
| | M3 | M2 | M3 | M3 |

In the correction shown in Table 5, a DCT class as an average of the DCT class determined by the DCT pattern determining means 431 and the DCT class determined by the reference area parameter determining means 437 is chosen.

Next, the quantizer scale extracted by the quantizer scale extracting means 433 is corrected by using the quantizer scale determined by the reference area parameter determining means 437. As an example of this correction, a smaller quantizer scale between the quantizer scale extracted by the quantizer scale extracting means 433 and the quantizer scale determined by the reference area parameter determining means 437 can be chosen. Alternatively, the average or the maximum value of these quantizer scales may be obtained.

As still another example of the correction of the quantizer scale, it can be determined whether or not the quantizer scale is corrected depending upon the DCT class of the reference area. For example, when the DCT class of the reference area is M1, the quantizer scale extracted by the quantizer scale extracting means 433 is output without correction, and when the DCT class of the reference area is M2 or M3, the quantizer scale is corrected as described above, so as to output the corrected quantizer scale.

The parameter correcting means 436 outputs the thus corrected ringing artifact parameters to the parameter memory means 118. The parameter memory means 118 stores the input ringing artifact parameters.

Next, the operation of the filter determining means 434 will be described. The filter determining means 434 is operated in the same manner with respect to an intra coded block and a non-intra coded block.

The filter determining means 434 determines the type of filter to be applied to each block with reference to the DCT class among the ringing artifact parameters. The type of filter is determined in accordance with Table 6 below.

TABLE 6

| DCT class | Type of filter |
|---|---|
| M1 | F1 |
| M2 | F2 |
| M3 | F3 |

Table 6 shows an exemplified case where the filter is selected from three types of filters F1, F2 and F3. In this case, the strength of the filter (the capability of eliminating ringing artifact) is the lowest in the filter F1 and the highest in the filter F3. The type of filter determined by the filter determining means 434 is output to the ringing artifact eliminating means 126. Herein, it can be said that the type of filter thus determined corresponds to the magnitude of detected ringing artifact.

The ringing artifact eliminating means 126 receives the type of filter to be applied to each pixel block from the ringing artifact detecting means 430, and applies the filter to the image output by the frame memory 115. An example of the operation of the ringing artifact eliminating means 126 will now be described.

Figure 35:
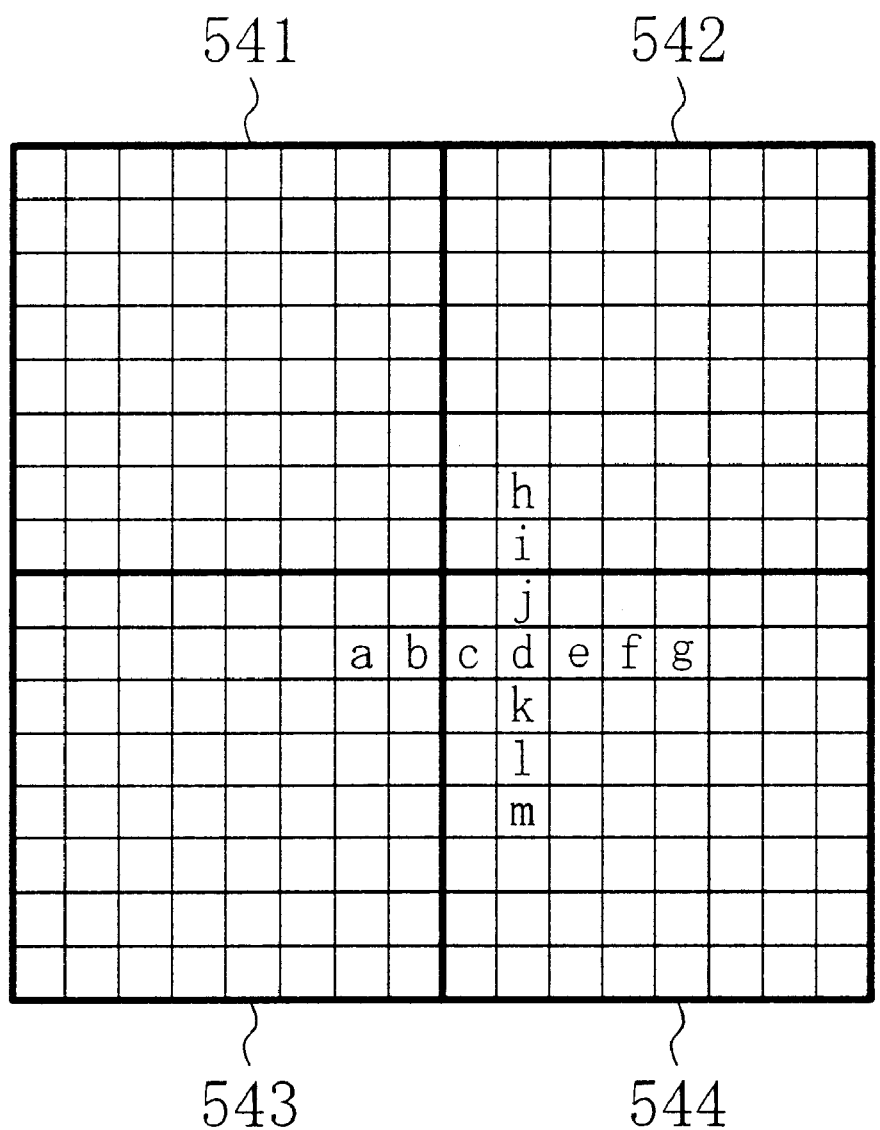
FIG. 35 is a diagram for illustrating an example of pixels used in a filtering process.

FIG. 35 is a diagram for showing an example of pixels used in the filtering process, in which one square corresponds to one pixel. It is herein assumed that the filter determining means 434 determines that the filter F2 is to be applied to a pixel block 544. In this case, all the pixels of the block 544 are filtered.

Description will be given on the case where a pixel d is to be filtered. In this case, edge pixels are detected on the upper, lower, right and left sides of the pixel d. In order to detect an edge pixel, an absolute value of a difference in the pixel value between the pixel d and another pixel is obtained, so that the pixel can be detected as an edge pixel when the absolute value is larger than a predetermined value. As the predetermined value, a value obtained by multiplying the quantizer scale, that is, one ringing artifact parameter of each block, by a predetermined coefficient can be used. For example, in detecting an edge pixel on the left side of the pixel d, the absolute values of the differences in the pixel value between the pixel d and the pixels c, b and a are obtained so as to be compared with the predetermined value. Similarly, the edge detection is carried out on pixels j, i and h on the upper side of the pixel d, pixels k, l and m on the lower side and pixel e, f and g on the right side.

It is assumed that the pixels a, b, f and i are thus detected as the edge pixels. In this case, the pixels c, d, e, g, h, j, k, l and m other than the edge pixels are used for filtering the pixel d. As the filter, for example, a low-pass filter can be used.

FIGS. 36(a) through 36(e) are diagrams for showing example of the filtering process for eliminating ringing artifact. Herein, the filtering process on a pixel d of FIG. 36(a) by using pixels a through g will be described.

Figure 36A:
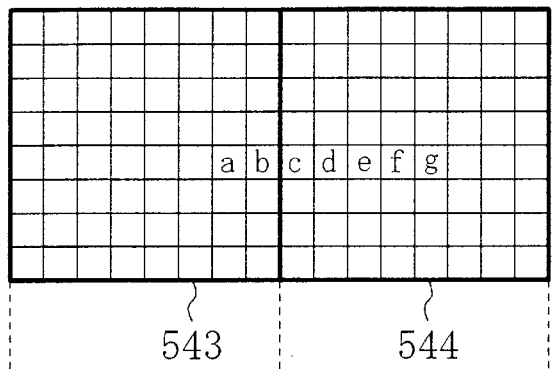
FIGS. 36(a), 36(b), 36(c), 36(d) and 36(e) are diagrams for illustrating an example of the filtering process for eliminating ringing artifact.
Figure 36B:
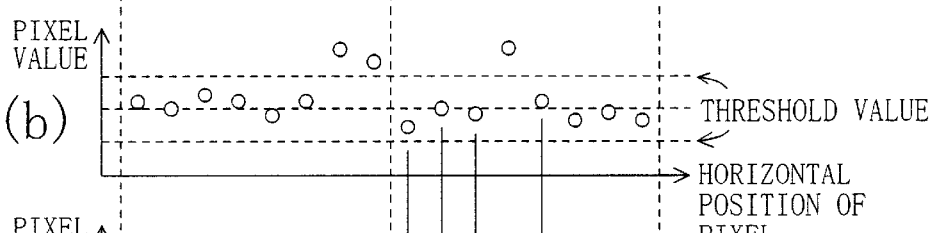
Figure 36C:
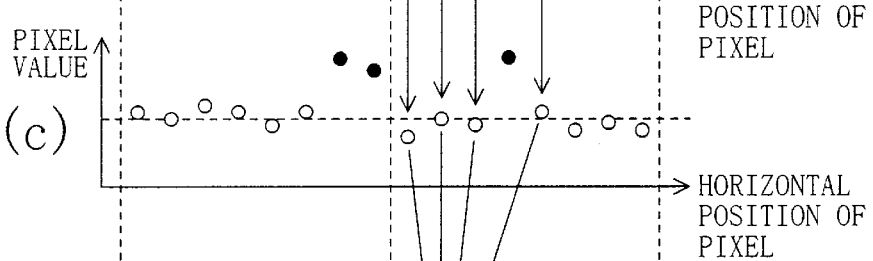

FIG. 36(b) shows pixel values of the pixels a through g. In this case, among the pixels a through g, pixels having an absolute value of a difference from the pixel value of the pixel d larger than a predetermined value, namely, pixels disposed between two lines indicating the threshold values for the pixel d in FIG. 36(b), are used for the filtering process. Accordingly, the pixels a, b and f shown with black circles in FIG. 36(c) are not used but the pixels c, d, e and g shown with white circles alone are used for the filtering process for the pixel d. Herein, the pixels a, b and f shown with the black circles are the edge pixels.

Figure 36D:
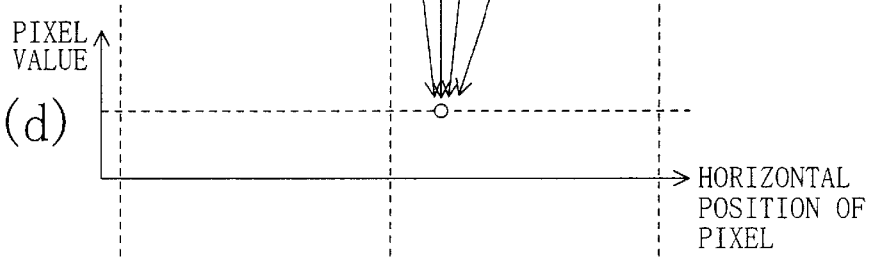
Figure 36E:
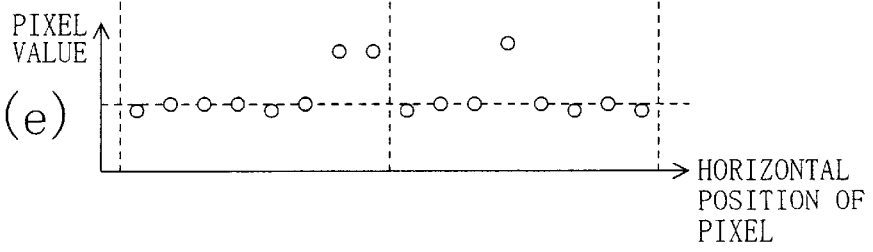

FIG. 36(d) shows the pixel d after the filtering process. FIG. 36(e) shows the pixel values resulting from the filtering process similarly conducted on other pixels. Although the filtering process using pixels on the same line is described above, the filtering process can be similarly carried out when pixels not disposed on the same line are used as in FIG. 35.

Alternatively, pixels on inside of the edge pixels (namely, closer than the edge pixels) from the pixel d can be used for the filtering process. In this case, the pixel d is filtered by using the pixels c, d, e, j, k, l and m.

Furthermore, the pixel d may be filtered by using the pixels a through m, with the pixel values of the edge pixels a, b, f and i replaced with the pixel value of the pixel d.

In the case where the filter determining means 434 determines that the filter F3 is to be applied to the pixel block 544, a filter with larger strength than the filter F2 is used. For example, in filtering the pixel d in FIG. 35, the strong filter can be applied by using a wider range of pixels on the left side beyond the pixel a, on the upper side beyond the pixel h, on the right side beyond the pixel g and on the lower side beyond the pixel m. Alternatively, when the same pixels are used as in the case for applying the filter F2, a low-pass filter with a filter coefficient for attaining a lower cut-off frequency may be used.

In the case where the filter determining means 434 determines that the weakest filter F1 is to be applied to the pixel block 544, no filter is applied to the pixel block 544 or a filter weaker than the filter F2 is applied.

Figure 37:
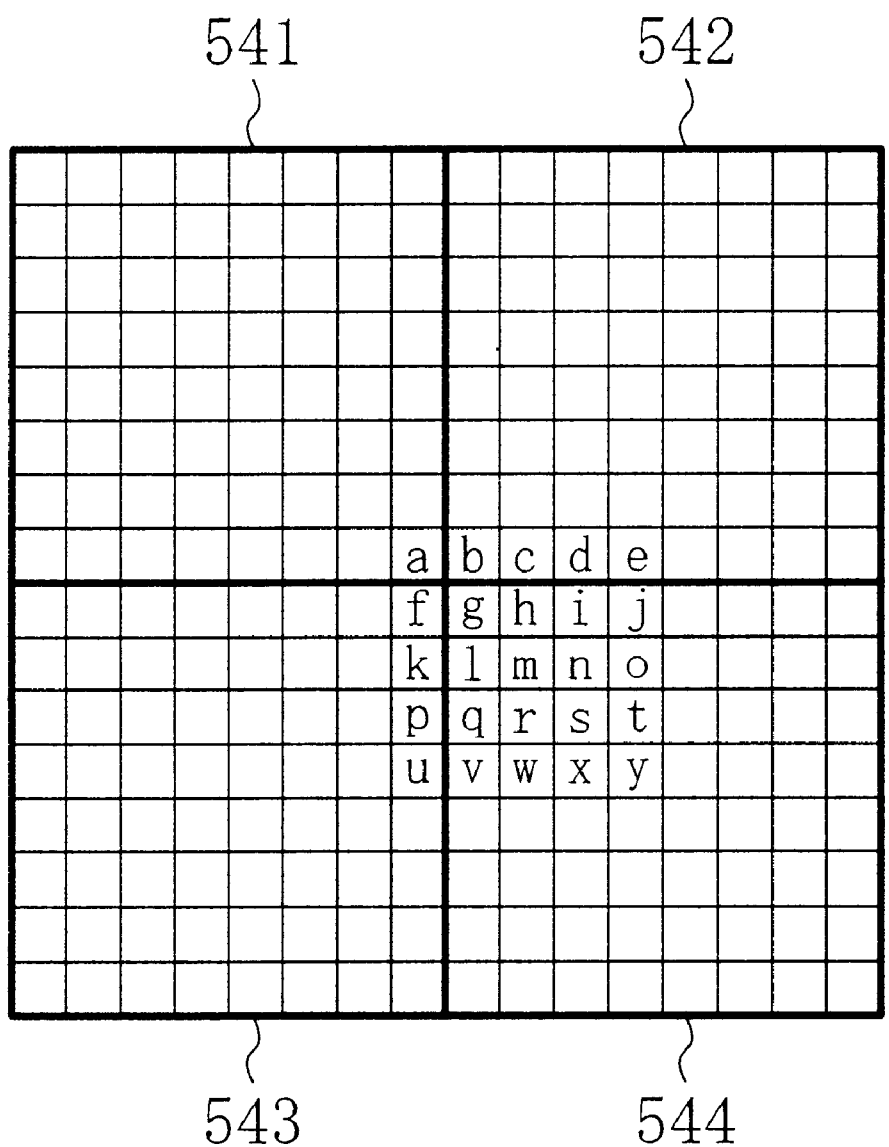
FIG. 37 is a diagram for illustrating another example of pixels used in the filtering process.

FIG. 37 is a diagram for showing another example of pixels used in the filtering process. Not only pixels as shown in FIG. 35 but also pixels as shown in FIG. 37 may be used in the filtering process. Specifically, in filtering a pixel m in FIG. 37, the filtering process is carried out by using pixels a through y in the same manner as described with reference to FIG. 35.

Furthermore, the predetermined value compared with the absolute value of a difference in the pixel value in the edge detection may be a fixed value instead of the value obtained from the quantizer scale. When the quantizer scale is not used in the edge detection, there is no need to deal with the quantizer scale by the quantizer scale extracting means 433, the parameter correcting means 436, the reference area parameter determining means 437 and the parameter memory means 118. In other words, the ringing artifact parameter is the DCT class alone in this case.

As described above, in the image decoding apparatus of this embodiment, with respect to an intra coded block, each block is classified into any of a plurality of DCT classes by using DCT coefficients obtained from a bitstream. Also, with respect to a non-intra coded block, the DCT class and the quantizer scale of a reference area are obtained by using the DCT classes and the quantizer scales of blocks overlapping the reference area within a reference frame obtained by using a motion vector, so as to correct the DCT class and the quantizer scale of the target block obtained from the bitstream. Then, the type of filter to be applied to each block is determined by using the DCT class of the block. In determining the type of filter, a stronger filter is applied as DCT coefficients greater than a predetermined value are distributed in a higher region. According to the thus determined type of filter, the filter is applied to each block of the decoded image. In the filtering process, edge detection is carried out by using the quantizer scale of each block or a predetermined fixed value as a threshold value, and pixels at least excluding the edge pixels are filtered, so as to eliminate ringing artifact.

In this manner, in the image decoding apparatus of this embodiment, a block where ringing artifact occurs and the magnitude of ringing artifact can be definitely detected according to the DCT coefficient distribution of each block. At this point, a non-intra coded block can be classified suitably to the characteristic of the non-intra coding by using DCT patterns different from those used for an intra coded block. Also, with respect to a non-intra coded block, the ringing artifact parameters of a difference image obtained from the DCT coefficients are corrected by using the ringing artifact parameters of a reference area. Thus, even in a non-intra coded block, the ringing artifact parameters of a decoded image can be highly precisely determined so as to determine the magnitude of ringing artifact. Furthermore, the ringing artifact parameters of the reference area are obtained by using ringing artifact parameters of blocks overlapping the reference area, and hence can be highly precisely obtained.

By selectively using a plurality of filters having different strengths in accordance with the magnitude of ringing artifact and by conducting edge detection so as to S filter pixels without using edge pixels, ringing artifact can be definitely eliminated while minimizing blur of the image, in particular, at the edges. Furthermore, when the quantizer scale of each block is used as the threshold value in detecting an edge pixel, the threshold value can be suitably changed with respect to each block, so as to more precisely conduct the edge detection. As a result, ringing artifact can be more definitely detected while minimizing blur of the image particularly at the edges.

In this embodiment, an intra coded block is classified into any of the three DCT classes by using the two DCT patterns of FIGS. 32(*a*) and 32(*b*) and a non-intra coded block is classified into any of the three DCT classes by using the two DCT patterns of FIGS. 32(*c*) and 32(*d*), but neither the number of DCT patterns is limited to two nor the number of DCT classes is limited to three. Furthermore, the frequency distributions of the DCT patterns are not limited to those shown in FIGS. 32(*a*) through 32(*d*). Moreover, the same DCT patterns may be used with respect to an intra coded block and a non-intra coded block.

Also, although the three types of filters are used in the ringing artifact eliminating means 126 of this embodiment, the number of types of filters is not limited to three.

Furthermore, although the filter used in the ringing artifact eliminating means 126 of this embodiment is a low-pass filter, any other filter such as a median filter may be used instead as far as it can eliminate ringing artifact. In addition, the positions of pixels used for filtering are not limited to those exemplified in FIGS. 35 and 37.

Although several methods of determining the ringing artifact parameters of a reference area by the reference area parameter determining means 437 are exemplified in this embodiment, the ringing artifact parameters may be determined in a method other than those described above.

Although the ringing artifact parameters are corrected by the parameter correcting means 436 as listed in Table 4 or 5 in this embodiment, the correction method is not limited to those shown in Tables 4 and 5.

Although the DCT class and the quantizer scale are corrected by using the reference area parameter determining means 437 and the parameter correcting means 436 in this embodiment, either parameter may not be corrected.

In the edge detection carried out by the ringing artifact eliminating means 126, for example, in filtering the pixel d of FIG. 35, differences in the pixel value between the pixel d and other pixels are used in this embodiment. The method of conducting the edge detection is, however, not limited to that described above but the edge detection can be carried out by using, for example, a difference in the pixel value between adjacent pixels.

EMBODIMENT 8

In an image decoding apparatus of Embodiment 8, ringing artifact as coding noise is detected and eliminated in decoding a bitstream obtained by encoding an interlaced image.

The image decoding apparatus of Embodiment 8 uses ringing artifact detecting means 440 instead of the ringing artifact detecting means 430 of the image decoding apparatus of FIG. 30. In this image decoding apparatus, variable-length decoding means 110, inverse quantization means 111, inverse DCT means 112, switches 113 and 114, a frame memory 115, parameter memory means 118 and an adder 119 are the same as those described in Embodiment 1, and hence like reference numerals are used to omit the description. In this case, the ringing artifact detecting means 440 works as a noise detector.

Figure 38:
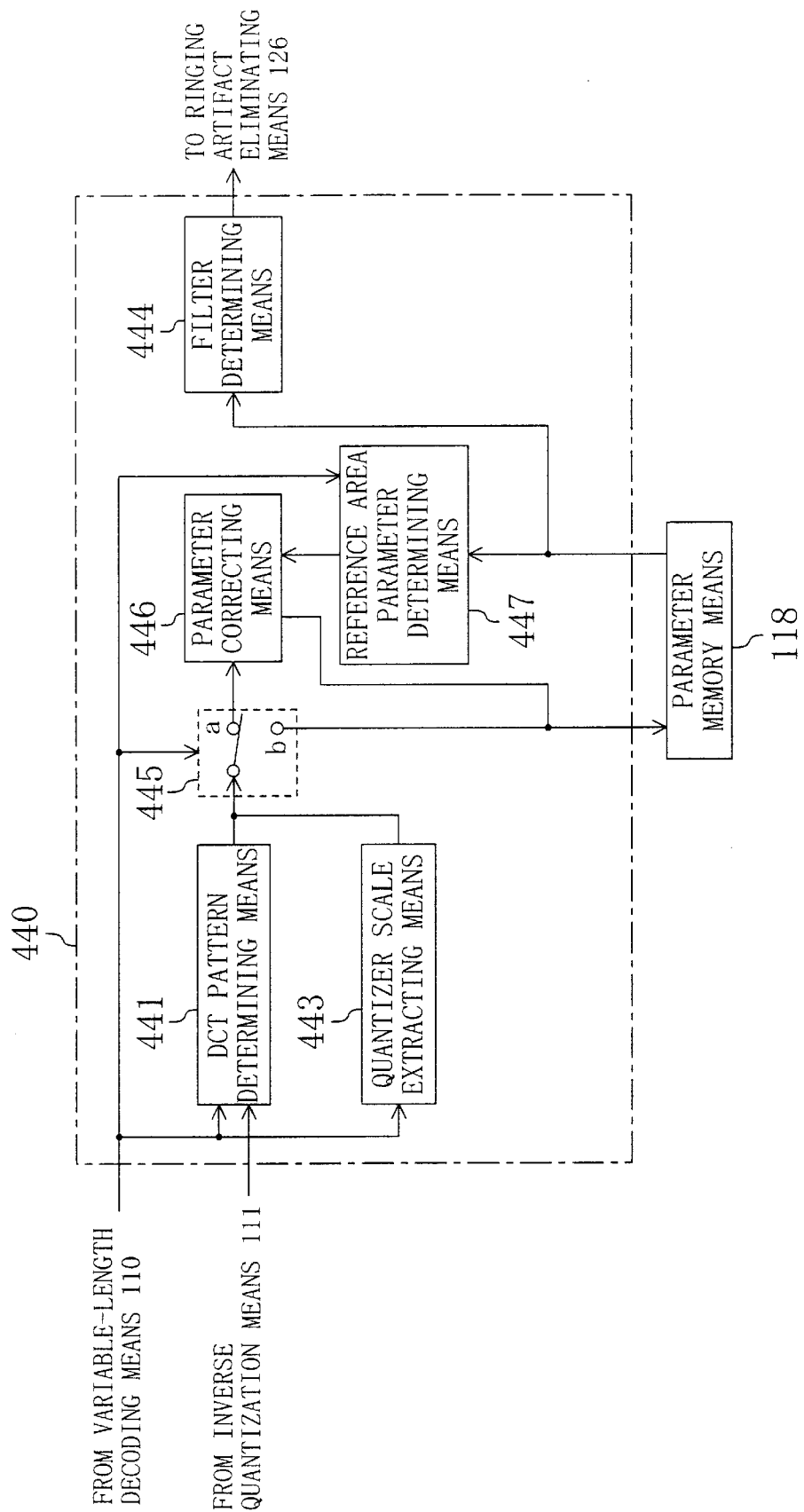
FIG. 38 is a block diagram for showing the structure of ringing artifact detecting means according to Embodiment 8 of the invention.

FIG. 38 is a block diagram for showing the structure of the ringing artifact detecting means of this embodiment. The ringing artifact detecting means 440 of FIG. 38 includes DCT pattern determining means 441, quantizer scale extracting means 443, filter determining means 444, a switch 445, parameter correcting means 446 and reference area parameter determining means 447. The ringing artifact detecting means 440 receives DCT coefficients from the inverse quantization means 111 and a quantizer scale, a macroblock coding mode and a motion vector from the variable-length decoding means 110.

The DCT pattern determining means 441 receives, as its inputs, a DCT coefficient block from the inverse quantization means 111 and a DCT mode from the variable-length decoding means 110. The DCT pattern determining means 441 classifies the DCT coefficient block according to the frequency component distribution thereof. The classification of the DCT coefficient block is carried out in the same manner as described in Embodiment 7, so that each DCT coefficient block can be classified into any of DCT classes M1, M2 and M3.

The DCT class of the block thus determined is allocated to each field of the block. This allocation is carried out in the same manner as described with reference to FIGS. 24(*a*) through 24(*c*) and 25(*a*) through 25(*c*). In the case where the DCT mode is the field mode, for example, the DCT class of a DCT block 601 is allocated to field blocks 609 and 611 as described with reference to FIGS. 24(*a*) through 24(*c*). In the case where the DCT mode is the frame mode, for example, the DCT class of a DCT block 651 is allocated to field blocks 659 and 660 as described with reference to FIGS. 25(*a*) through 25(*c*).

The quantizer scale extracting means 443 extracts a quantizer scale from the coding information output by the variable-length decoding means 110, and outputs the extracted quantizer scale. The quantizer scale is also allocated to each field as in the DCT pattern determining means 441.

The switch 445 switches connection in accordance with the macroblock coding mode output by the variable-length decoding means 110. When the macroblock coding mode indicates the intra coding, the switch 445 is connected to a terminal b. In this case, the DCT class output by the DCT pattern determining means 441 and the quantizer scale output by the quantizer scale extracting means 443, namely, the ringing artifact parameters, are output to the parameter memory means 118 with respect to each field block. Alternatively, when the macroblock coding mode indicates the non-intra coding, the switch 445 is connected to a terminal a. In this case, the ringing artifact parameters are input to the parameter correcting means 446.

When the macroblock coding mode indicates the non-intra coding, the reference area parameter determining means 447 refers to the ringing artifact parameters of a reference block, so as to obtain the ringing artifact parameters of a reference area.

The reference area parameter determining means 447 obtains the ringing artifact parameters of each field block of a reference frame from the parameter memory means 118 by using the motion vector output by the variable-length decoding means 110. The ringing artifact parameters of the reference frame are obtained in the same manner as described in Embodiment 6 with reference to FIG. 29, and hence the description is omitted.

Furthermore, the method of obtaining the DCT class and the quantizer scale of the reference area by using the DCT class and the quantizer scale obtained from the parameter memory means 118 is the same as that described in Embodiment 7, and hence the description is omitted.

The reference area parameter determining means 447 outputs the ringing artifact parameters of each field block of the reference area thus obtained to the parameter correcting means 446.

The parameter correcting means 446 corrects the ringing artifact parameters output through the switch 445 by the DCT pattern determining means 441 and the quantizer scale extracting means 443 by using the ringing artifact parameters of the reference area output by the reference area parameter determining means 447. The method of correcting the ringing artifact parameters is the same as that described in Embodiment 7, and hence the description is omitted. The parameter correcting means 446 outputs the corrected ringing artifact parameters to the parameter memory means 118. The parameter memory means 118 stores the input ringing artifact parameters with respect to each field block.

Next, the operation of the filter determining means 444 will be described. The filter determining means 444 is operated in the same manner on an intra coded block and a non-intra coded block. The filter determining means 444 determines the type of filter to be applied to each field block with reference to the DCT class among the ringing artifact parameters. The type of filter is determined in accordance with Table 6 as in Embodiment 7. The type of filter thus determined with respect to each filed block by the filter determining means 444 is output to the ringing artifact eliminating means 126. Herein, it can be said that the type of filter thus determined corresponds to the magnitude of detected ringing artifact.

The ringing artifact eliminating means 126 receives the type of filter to be applied to each block from the ringing artifact detecting means 440, and applies the determined type of filter to a block of the image output from the frame memory 115. An example of the filtering operation of the ringing artifact eliminating means 126 will now be described.

Figure 39:
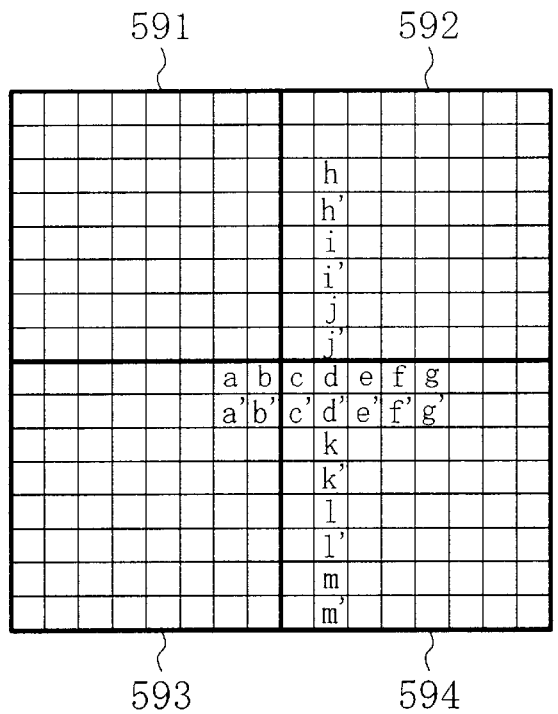
FIG. 39 is a diagram for illustrating an example of pixels used in a filtering process.

FIG. 39 is a diagram for illustrating an example of pixels used in the filtering process, in which one square corresponds to one pixel. It is herein assumed that the filter determining means 444 determines that a filter F2 is to be applied to a pixel block 594. In this case, all the pixels of the block 594 are filtered.

In this embodiment, the case of filtering a pixel d will be exemplified. In this case, edge pixels are detected on the upper, lower, right and left sides of the pixel d within the same field. Since the pixel d belongs to the first field, the edge detection is carried out by using pixels of the first field. In the edge detection, when an absolute value of a difference in the pixel value between the pixel d and another pixel is larger than a predetermined value, the pixel is detected as an edge pixel. As the predetermined value, a value obtained by multiplying the quantizer scale, that is, one ringing artifact parameter of each block, by a predetermined coefficient can be used.

For example, in detecting an edge pixel on the left side of the pixel d, absolute values of differences in the pixel value between the pixel d and pixels c, b and a are obtained to be compared with the predetermined value. Similarly, the edge detection is carried out on pixels j, i and h on the upper side of the pixel d, pixels k, l and m on the lower side and pixels e, f and g on the right side.

It is herein assumed that the pixels a, b, f and i are thus detected as the edge pixels. In this case, the pixel d is filtered by using the pixels c, d, e, g, h, j, k, l and m other than the edge pixels. Specifically, the pixel d is filtered by using the pixels of the first field alone. As the filter, for example, a low-pass filter can be used.

Furthermore, in the case where a pixel d' is to be filtered, the edge detection is carried out by using pixels of the second field because the pixel d' belongs to the second field. Specifically, with respect to the pixel d', the edge detection is carried out by using pixels a' through m'. The edge detection is conducted in the same manner as described above.

It is herein assumed that the pixels a', b', f' and i' are thus detected as the edge pixels. In this case, the pixel d' is filtered by using the pixels c', d', e', g', h', j', k', l' and m' other than the edge pixels. Specifically, the pixel d' is filtered by using the pixels of the second field alone. As the filter, for example, a low-pass filter can be used as in the first field.

Alternatively, merely pixels on inside of the edge pixels (namely, closer than the edge pixels) from the pixel d or d' may be used. In this case, for example, the pixel d is filtered by using the pixels c, d, e, j, k, l and m.

In the case where the filter determining means 444 determines to apply a filter F3 to the pixel block 594, a filter stronger than the filter F2 is applied. For example, in filtering the pixel d in FIG. 39, a stronger filter can be applied by using a wider range of pixels within the same field on the left side beyond the pixel a, on the upper side beyond the pixel h, on the right side beyond the pixel g and on the lower side beyond the pixel m. Alternatively, when the same pixels are used as in the case for applying the filter F2, a low-pass filter with a filter coefficient for attaining a lower cut-off frequency may be used.

In the case where the filter determining means 444 determines to apply the weakest filter F1 to the pixel block 594, no filter is applied to the pixel block 594 or a filter weaker than the filter F2 is applied.

Figure 40:
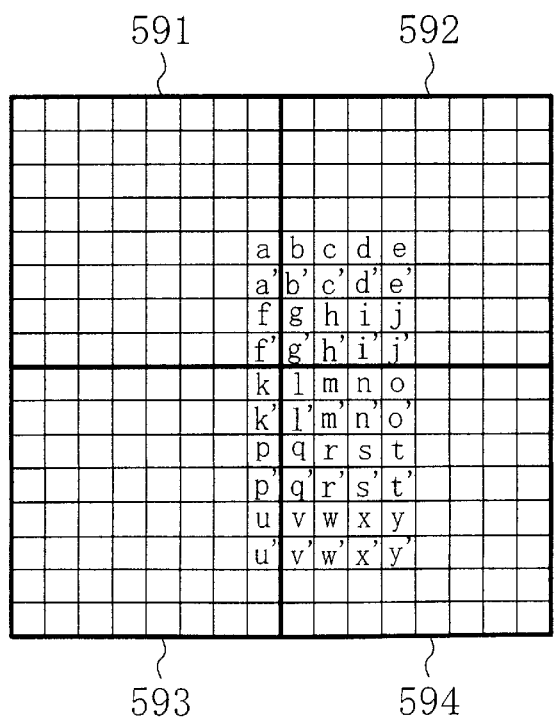
FIG. 40 is a diagram for illustrating another example of pixels used in the filtering process.

FIG. 40 is a diagram for showing another example of pixels used in the filtering process. Not only pixels as shown in FIG. 39 but also pixels as shown in FIG. 40 may be used in the filtering process. Specifically, in FIG. 40, the filtering process is carried out by using pixels a through y in filtering a pixel m and by using pixels a' through y' in filtering a pixel m' in the same manner as described with reference to FIG. 39.

Furthermore, the predetermined value compared with the absolute value of a difference in the pixel value in the edge detection may be a fixed value instead of the value obtained from the quantizer scale. When the quantizer scale is not used in the edge detection, there is no need to deal with the quantizer scale by the quantizer scale extracting means 443, the parameter correcting means 446, the reference area parameter determining means 447 and the parameter memory means 118. In other words, the ringing artifact parameter is the DCT class alone in this case.

The frame thus filtered by the ringing artifact eliminating means 126 is output as an output image.

As described above, in the image decoding apparatus of this embodiment, with respect to an intra coded block, each block is classified into any of a plurality of DCT classes by using DCT coefficients obtained from a bitstream. The classification into the DCT classes is carried out with respect to each field block obtained by dividing each block into fields. With respect to a non-intra coded block, the DCT class and the quantizer scale of a reference area are obtained by using the DCT classes and the quantizer scales of blocks overlapping a reference area within a reference frame obtained by using a motion vector, so as to correct the DCT class and the quantizer scale of the target block obtained from information of the bitstream. Then, the type of filter to be applied to pixels within the field block is determined by using the DCT class and the quantizer scale of each field block. In determining the type of filter, a stronger filter is applied as DCT coefficients greater than a predetermined value are distributed in a higher region. Each field block of the decoded image is filtered according to the determined type of filter. In the filtering process, the edge detection is carried out by using the quantizer scale of the field block or a predetermined fixed value as a threshold value, and pixels excluding at least edge pixels are filtered so as to eliminate ringing artifact.

In this manner, in the image decoding apparatus of this embodiment, a block where ringing artifact occurs and the magnitude of ringing artifact are definitely detected in each field according to the DCT coefficient distribution of each block. At this point, with respect to a non-intra coded block, DCT patterns different from those used for an intra coded block are used so as to classify the non-intra coded block suitably to the characteristic of the non-intra coding. Also, with respect to a non-intra coded block, the ringing artifact parameters of a difference image obtained from the DCT coefficients are corrected by using the ringing artifact parameters of a reference area. Therefore, the ringing artifact parameters of a decoded image can be determined highly precisely even in a non-intra coded block, so as to determine the magnitude of ringing artifact. Furthermore, the ringing artifact parameters of the reference area are obtained by using the ringing artifact parameters of blocks overlapping the reference area, and hence can be highly precisely obtained.

By selectively using a plurality of filters having different strengths in accordance with the magnitude of ringing artifact and by conducting the edge detection so as to apply a filter to pixels without using edge pixels, ringing artifact can be definitely eliminated while minimizing blur of the image, in particular, at the edges. In addition, since ringing artifact is detected and eliminated in each field block, ringing artifact can be more accurately detected in an interlaced image. Furthermore, when the quantizer scale of each block is used as the threshold value in detecting the edge pixels, the threshold value can be suitably changed with respect to each block, so as to more precisely conduct the edge detection. As a result, ringing artifact can be more definitely detected while minimizing blur of the image particularly at the edges. Additionally, since ringing artifact is detected and eliminated with respect to each field block, the detection of ringing artifact can be carried out in a smaller unit, so as to eliminate ringing artifact without harmfully affecting an area where no ringing artifact occurs.

In this embodiment, a DCT coefficient block is classified into any of the three DCT classes and the three types of filters are used in the ringing artifact eliminating means 126, but neither the numbers of the DCT classes nor the types of filters is limited to three.

Furthermore, although the filters used in the ringing artifact eliminating means 126 of this embodiment is a low-pass filter, any other filter such as a median filter may be used instead as far as it can eliminate ringing artifact. In addition, the positions of pixels used for filtering are not limited to those exemplified in FIGS. 39 and 40.

In the edge detection carried out by the ringing artifact eliminating means 126, for example, in filtering the pixel d of FIG. 39, differences in the pixel value between the pixel d and other pixels are used in this embodiment. The method of conducting the edge detection is, however, not limited to that described above but the edge detection can be carried out by using a difference in the pixel value between adjacent pixels.

EMBODIMENT 9

In an image decoding apparatus of Embodiment 9, one of blocking artifact and ringing artifact occurring in one block is chosen as coding noise to be eliminated.

Figure 41:
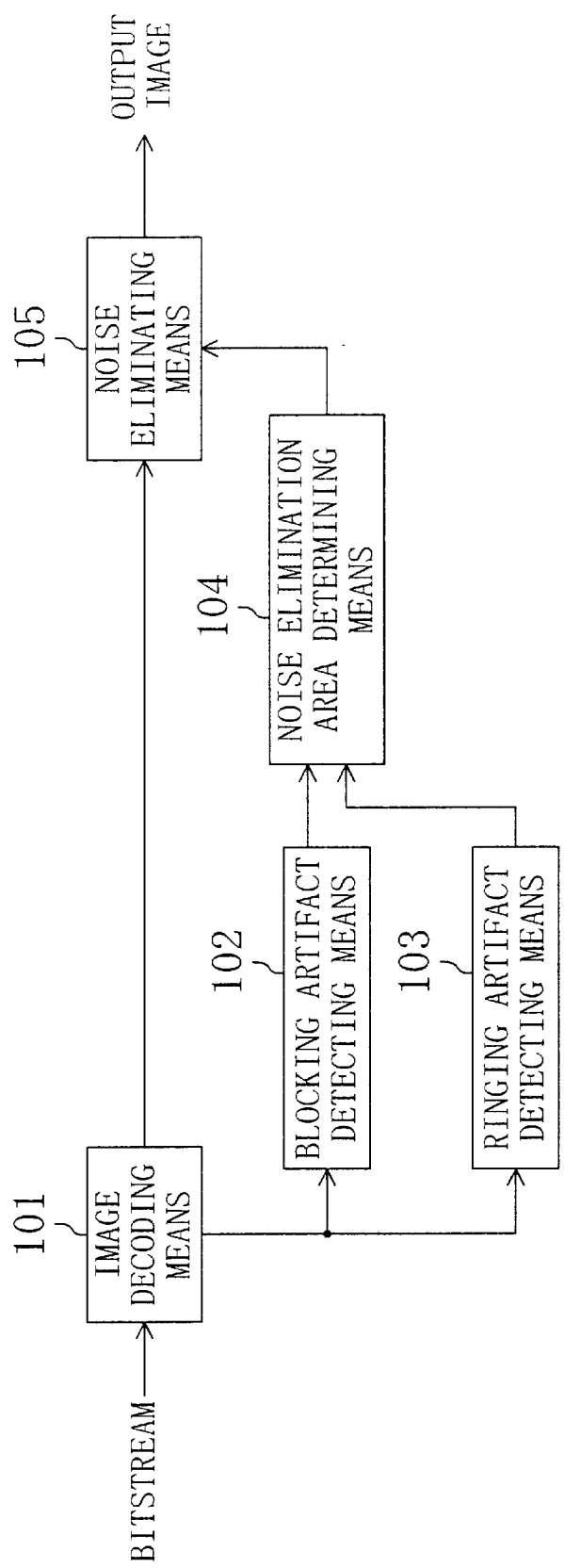
FIG. 41 is a block diagram of an image decoding apparatus according to Embodiment 9 of the invention.

FIG. 41 is a block diagram of the image decoding apparatus of Embodiment 9. The image decoding apparatus of FIG. 41 includes image decoding means 101, blocking artifact detecting means 102, ringing artifact detecting means 103, noise elimination area determining means 104 and noise eliminating means 105. In this case, the blocking artifact detecting means 102, the ringing artifact detecting means 103 and the noise elimination area determining means 104 together work as a noise detector.

The image decoding means 101 receives a bitstream as an input and obtains a decoded image by decoding the bitstream by a method suitable to the bitstream. For example, when an image is encoded by the JPEG (Joint Photographic image coding Experts Group) standard, the image is decoded in accordance with the JPEG, and when an image is encoded by the MPEG, the image is decoded in accordance with the MPEG. The image decoding means 101 outputs the decoded image to the blocking artifact detecting means 102, the ringing artifact detecting means 103 and the noise eliminating means 105.

According to the image data of the decoded image, the blocking artifact detecting means 102 detects a block boundary where blocking artifact occurs, and the ringing artifact detecting means 103 detects a block where ringing artifact occurs. The blocking artifact detecting means 102 and the ringing artifact detecting means 103 may detect noise in accordance with coding information obtained from the bitstream input to the image decoding means 101 instead of the image data of the decoded image.

The detection of blocking artifact by the blocking artifact detecting means 102 and the detection of ringing artifact by the ringing artifact detecting means 103 can be carried out by any of conventional methods. Alternatively, a boundary where blocking artifact occurs may be detected by any of the methods described in Embodiments 1 through 6, and a block where ringing artifact occurs may be detected by any of the methods described in Embodiments 7 and 8.

Figure 42A:
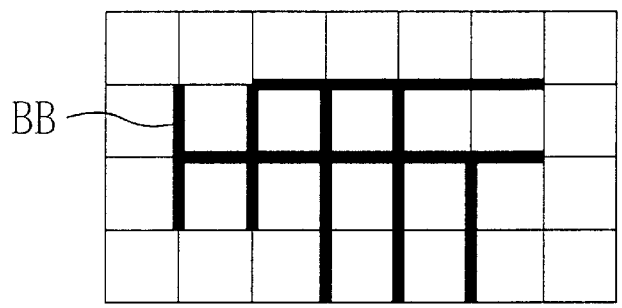
FIGS. 42(a) and 42(b) are diagrams for illustrating exemplified areas where blocking artifact and ringing artifact has occurred.
Figure 42B:
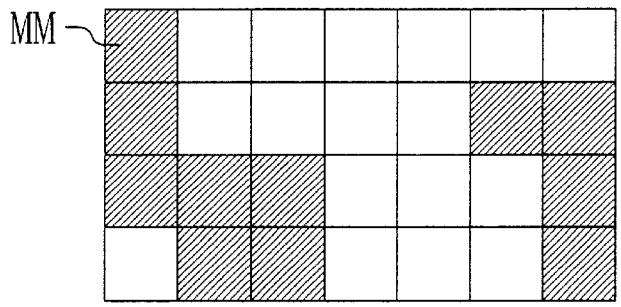

FIGS. 42(a) and 42(b) are diagrams for showing exemplified areas where blocking artifact and ringing artifact have occurred, respectively, wherein one square corresponds to one block. FIG. 42(a) shows block boundaries where occurrence of blocking artifact is detected by the blocking artifact detecting means 102. In FIG. 42(a), block boundaries BB shown with thick solid lines are the boundaries where the occurrence of blocking artifact is detected. Also, FIG. 42(b) shows blocks where occurrence of ringing artifact is detected by the ringing artifact detecting means 103. In FIG. 42(b), hatched blocks MM are the blocks where the occurrence of ringing artifact is detected. The results of the detection by the blocking artifact detecting means 102 and the result of the detection by the ringing artifact detecting means 103 are output to the noise elimination area determining means 104.

The noise elimination area determining means 104 selects noise to be eliminated and determines in which area within the image noise elimination is to be carried out based on the results of the detection of blocking artifact and ringing artifact output by the blocking artifact detecting means 102 and the ringing artifact detecting means 103. An area where the noise elimination is to be carried out corresponds to pixels in the vicinity of a detected block boundary with respect to blocking artifact and to a detected block with respect to ringing artifact. The method of making this determination differs depending upon which noise between blocking artifact and ringing artifact is prioritized.

Figure 43A:
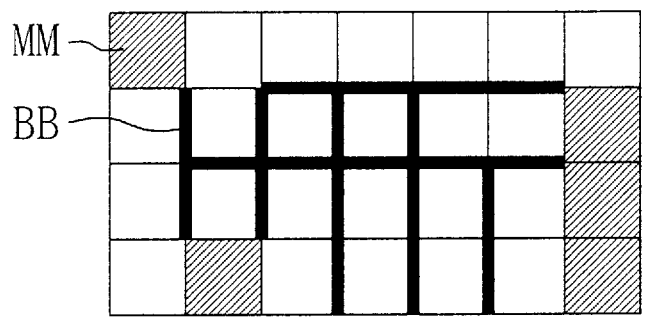
FIGS. 43(a) and 43(b) are diagrams for illustrating areas determined for noise elimination in the case where the noise has occurred as shown in FIGS. 42(a) and 42(b)
Figure 43B:
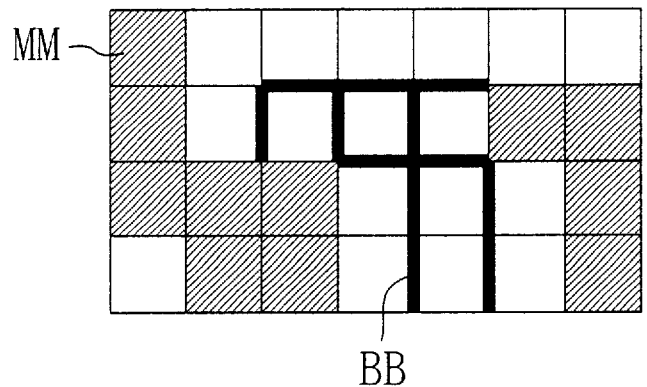

FIGS. 43(a) and 43(b) are diagrams for showing determined areas where noise elimination should be carried out in the case where the noise occurs as is shown in FIGS. 42(a) and 42(b), respectively. The notation of FIGS. 43(a) and 43(b) is the same as that of FIGS. 42(a) and 42(b).

First, the case where elimination of blocking artifact is prioritized will be described. In this case, the noise elimination area determining means 104 determines that blocking artifact should be eliminated on the block boundaries BB where the occurrence of blocking artifact is detected by the blocking artifact detecting means 102. At this point, the noise elimination area determining means 104 determines that ringing artifact should be eliminated in a block not in contact with the block boundaries determined as a processing object of blocking artifact elimination among the blocks MM where the occurrence of ringing artifact is detected by the ringing artifact detecting means 103.

Therefore, in the case where a block MM detected by the ringing artifact detecting means 103 is in contact with any of the block boundaries BB detected by the blocking artifact detecting means 102, ringing artifact is not eliminated in the block MM but blocking artifact on the boundaries BB alone is selected as noise to be eliminated. FIG. 43(a) shows thus determined areas where noise elimination should be carried out in the case blocking artifact is prioritized.

Next, the case where elimination of ringing artifact is prioritized will be described. In this case, the noise elimination area determining means 104 determines that ringing artifact should be eliminated in the blocks MM where the occurrence of ringing artifact is detected by the ringing artifact detecting means 103. At this point, the noise elimination area determining means 104 determines that blocking artifact should be eliminated on a block boundary not in contact with any of the blocks determined as a processing object of ringing artifact elimination among the block boundaries BB where the occurrence of blocking artifact is detected by the blocking artifact detecting means 102.

Therefore, in the case where a block MM detected by the ringing artifact detecting means 103 is in contact with a block boundary BB detected by the blocking artifact detecting means 102, blocking artifact is not eliminated on the block boundary BB but ringing artifact in the block MM alone is selected as noise to be eliminated. FIG. 43(b) shows thus determined areas where noise elimination should be carried out in the case where ringing artifact is prioritized.

Alternatively, the noise elimination area determining means 104 can determine an area where blocking artifact and ringing artifact should be eliminated according to the magnitude of noise. In this case, the blocking artifact detecting means 102 and the ringing artifact detecting means 103 not only detect areas where blocking artifact and ringing artifact occur, respectively, but also obtain the magnitudes. Noise with greater magnitude is more conspicuous.

In order to obtain the magnitude of noise, as described in Embodiments 1 through 8, a block is classified into any of several classes (DCT classes) according to the frequency component distribution of DCT coefficients, and then the type of filter to be applied for noise elimination is obtained to make the type of filter correspond to the magnitude of noise. The magnitude can be obtained by another method. The areas where noise occurs and the magnitudes detected by the blocking artifact detecting means 102 and the ringing artifact detecting means 103 are input to the noise eliminating means 104.

Figure 44A:
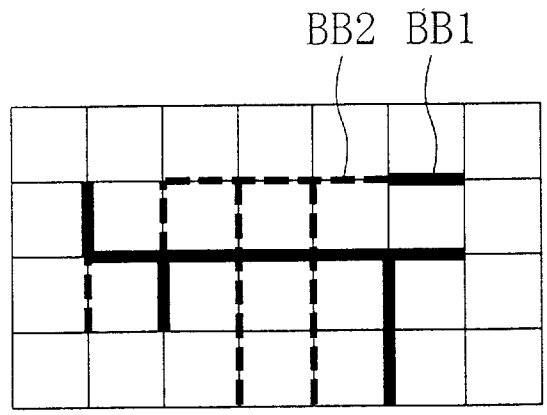
FIGS. 44(a), 44(b) and 44(c) are diagrams for illustrating areas determined for noise elimination in consideration of noise magnitude.
Figure 44B:
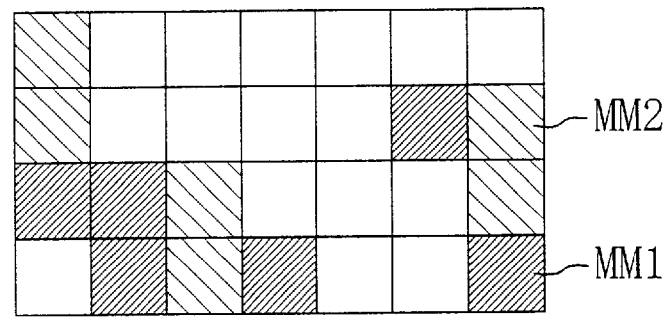
Figure 44C:
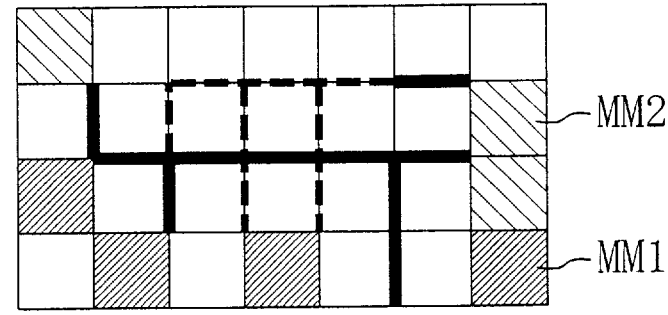

FIGS. 44(a) through 44(c) are diagrams for illustrating determined areas where noise elimination should be carried out in consideration of the magnitudes of noise. The noise elimination area determining means 104 selects noise to be eliminated and determines an area where noise elimination is to be carried out by prioritizing elimination of noise with larger magnitude between blocking artifact and ringing artifact with respect to each block.

FIG. 44(a) shows block boundaries where occurrence of blocking artifact is detected by the blocking artifact detecting means 102. In FIG. 44(a), block boundaries shown with thick lines are the boundaries where the occurrence of blocking artifact is determined, and block boundaries BB1 shown with thick solid lines have greater magnitude than block boundaries BB2 shown with thick broken lines.

FIG. 44(b) shows blocks where occurrence of ringing artifact is detected by the ringing artifact detecting means 103. In FIG. 44(b), hatched blocks are the blocks where the occurrence of ringing artifact is determined, and finely hatched blocks MM1 have greater magnitude than roughly hatched blocks MM2.

In the case where a block detected by the ringing artifact detecting means 103 is in contact with a block boundary detected by the blocking artifact detecting means 102, elimination of noise with larger magnitude is prioritized, and when the magnitudes are the same, elimination of, for example, blocking artifact is prioritized.

FIG. 44(c) shows areas where noise elimination is to be carried out and the kind of noise thus determined by the noise elimination area determining means 104. The noise elimination area determining means 104 outputs information on these areas and the kind of noise, that is, information on noise to be eliminated to the noise eliminating means 105.

The noise eliminating means 105 receives, as its inputs, the decoded image from the image decoding means 101 and the information on the noise to be eliminated from the noise elimination area determining means 104. Then, the noise eliminating means 105 eliminates, from the decoded image, the noise to be eliminated.

For example, with respect to a block boundary where blocking artifact is to be eliminated, the noise eliminating means 105 applies a low-pass filter to pixels in the vicinity of the boundary so as to eliminate blocking artifact. With respect to a block where ringing artifact is to be eliminated, the noise eliminating means 105 applies a low-pass filter to pixels without using edge pixels so as to eliminate the ringing artifact. In accordance with, for example, FIGS. 43(*a*), 43(*b*) and 44(*c*), the noise eliminating means 105 applies a low-pass filter to pixels in the vicinity of the block boundaries BB, BB1 and BB2, or conducts the edge detection on pixels of the blocks MM, MM1 and MM2 so as to apply a filter to pixels without using detected edge pixels. Through this operation, blocking artifact and ringing artifact can be eliminated. The noise eliminating means 105 outputs the decoded image from which blocking artifact and ringing artifact have been eliminated as an output image.

As described above, in the image decoding apparatus of this embodiment, areas where blocking artifact occurs and ringing artifact occurs are specified in a decoded image obtained by decoding a bitstream. Then, a noise elimination area is determined by prioritizing either blocking artifact or ringing artifact, so as not to eliminate both blocking artifact and ringing artifact in one area. By eliminating the noise in accordance with the thus determined noise elimination area and kind of noise, blocking artifact and ringing artifact are eliminated from the decoded image.

In this manner, in the image decoding apparatus of this embodiment, both blocking artifact and ringing artifact are not eliminated from one area, and hence, the operation required for noise elimination and the amount of memory to be used can be reduced. Accordingly, when the noise elimination is realized by software, the operation and the amount of memory can be reduced. Also, when the noise elimination is realized by hardware such as an LSI (large-scale integration), the chip area, the power consumption and the amount of memory can be reduced.

In this embodiment, blocking artifact and ringing artifact are eliminated by applying a low-pass filter to a block boundary where occurrence of blocking artifact is detected and applying a low-pass filter to pixels other than edge pixels in a block where occurrence of ringing artifact is detected, but the noise elimination can be conducted by another method.

Although the MPEG-2, in which DCT is employed as orthogonal transformation, is used as the coding method in the aforementioned embodiments, the coding method can be another method as far as the method uses orthogonal transformation in Embodiments 1, 5 and 9, and can be another coding method as far as the method uses orthogonal transformation and motion compensation in Embodiments 2 through 4 and 6 through 8.

In each of Embodiments 1 through 8, a DCT coefficient block is input from the inverse quantization means 111 to the blocking artifact detecting means 130 or the like or the ringing artifact detecting means 430 or the like. However, since the blocking artifact detecting means 130 or the like or the ringing artifact detecting means 430 or the like uses DCT coefficients for checking the frequency component distribution thereof, the blocking artifact detecting means 130 or the like or the ringing artifact detecting means 430 or the like may receive a block of DCT coefficients prior to inverse quantization from the variable-length decoding means 110.

In this manner, according to the invention, coding minimized, and hence, degradation in picture quality, resulting from noise elimination, can be prevented. With respect to a non-intra coded block, coding noise can be definitely detected because coding information of a reference area is used. With respect to an interlaced image, coding noise can be accurately detected because the detection is carried out in each field. Furthermore, since noise elimination is carried out in accordance with the magnitude of noise, coding noise can be definitely eliminated with the degradation in picture quality minimized.

What is claimed is:

1. A noise detecting method comprising the steps of:
   extracting coding information, including orthogonal transformation coefficients and a motion vector of each of multiple blocks of an image, from a bitstream that has been encoded through motion compensation of the image, orthogonal transformation and quantization, where the orthogonal transformation is performed on each said block;
   obtaining a reference area of each said block from a reference frame using the motion vector of the block; and
   detecting coding noise to be eliminated according to frequency component distributions of the orthogonal transformation coefficients of each said block and another one of the blocks within the reference frame overlapping the reference area of the block,
   said detecting coding noise comprises a sub-step of obtaining new classes of a target one of the blocks and another one of the blocks which is adjacent to the target block, according to classes of the target and adjacent blocks and classes of other ones of the blocks that overlap reference areas of the target and adjacent blocks within the reference frame.

2. The noise detecting method of claim 1, wherein blocking artifact is detected as the coding noise, and
   wherein the coding noise detecting step includes the sub-steps of:
   classifying each said block into any of a plurality of classes according to the frequency component distribution of the orthogonal transformation coefficients of the block; and
   detecting magnitude of blocking artifact occurring between the target and adjacent blocks according to the new classes.

3. The noise detecting method of claim 1, wherein blocking artifact is detected as the coding noise, and
   wherein the coding noise detecting step includes the sub-steps of:
   extracting DC components of the orthogonal transformation coefficients of a target one of the blocks and another one of the blocks that is adjacent to the target block from the coding information; and
   detecting magnitude of blocking artifact occurring between the target and adjacent blocks according to not only the frequency component distribution of the orthogonal transformation coefficients but also an absolute value of a difference in the DC component between the target and adjacent blocks.

4. The noise detecting method of claim 3, wherein the coding noise detecting step includes the sub-steps of:
   extracting a quantizer scale of the target block from the coding information; and
   detecting magnitude of blocking artifact occurring between the target and adjacent blocks according to not only the frequency component distribution of the orthogonal transformation coefficients but also the absolute value of the difference in the DC component and the quantizer scale.

5. The noise detecting method of claim 1, wherein the coding noise to be eliminated is detected according to not only the frequency component distribution of the orthogonal transformation coefficients but also a size of the motion vector of a target one of the blocks or another one of the blocks that is adjacent to the target block.

6. The noise detecting method of claim 5, wherein blocking artifact is detected as the coding noise, and
   wherein the coding noise detecting step includes the sub-steps of:
      extracting DC components of the orthogonal transformation coefficients of the target and adjacent blocks from the coding information; and
      detecting magnitude of blocking artifact occurring between the target and adjacent blocks according to not only the frequency component distribution of the orthogonal transformation coefficients and the size of the motion vector but also an absolute value of a difference in the DC component between the target and adjacent blocks.

7. The noise detecting method of claim 6, wherein the coding noise detecting step includes the sub-steps of:
   extracting a quantizer scale of the target block from the coding information; and
   detecting magnitude of blocking artifact occurring between the target and adjacent blocks according to not only the frequency component distribution of the orthogonal transformation coefficients and the size of the motion vector but also the absolute value of the difference in the DC component and the quantizer scale.

8. The noise detecting method of claim 1, wherein the coding noise detecting step is carried out on each of multiple fields in an interlaced image.

9. A noise detector comprising:
   means for receiving coding information as an input, detecting coding noise to be eliminated and outputting a result of the detection,
   wherein the coding information includes orthogonal transformation coefficients and a motion vector of each of the multiple blocks of an image,
   the coefficients and vector are obtained from a bitstream that has been encoded through motion compensation of the image, orthogonal transformation and quantization, where the orthogonal transformation is performed on each said block,
   the coding noise is detected according to frequency component distributions of the orthogonal transformation coefficients of each said block and another one of the blocks within a reference frame overlapping a reference area of the block, and
   the reference area is obtained from the reference frame using the motion vector of each said block,
   said detecting coding noise means obtains new classes of a target one of the blocks and another one of the blocks, which is adjacent to the target block, according to classes of the target and adjacent blocks and classes of other ones of the blocks that overlap reference areas of the target and adjacent blocks within the reference frame.

* * * * *

UNITED STATES PATENT AND TRADEMARK OFFICE
CERTIFICATE OF CORRECTION

PATENT NO. : 6,748,113 B1
DATED : June 8, 2004
INVENTOR(S) : Satoshi Kondo et al.

It is certified that error appears in the above-identified patent and that said Letters Patent is hereby corrected as shown below:

Title page,
Item [73], Assignee, "Insdustrial" should read -- Industrial. --

Column 52,
Line 26, "of the blocks which is" should be -- of the blocks, which is. --

Signed and Sealed this

Fourth Day of January, 2005

JON W. DUDAS
*Director of the United States Patent and Trademark Office*